United States Patent [19]

Kaul et al.

[11] 4,160,131

[45] Jul. 3, 1979

[54] ELECTRONIC KEY TELEPHONE SYSTEM

[75] Inventors: Pradeep P. Kaul; Thomas H. Scholl, both of Rockville; Deepak R. Muzundar, Gaithersburg; Daniel R. Wendling, Gaithersburg; Bob D. Buschman, Gaithersburg, all of Md.; Michio Ikawa; Akira Miura, both of Tokyo, Japan; David A. Love, Silver Spring, Md.

[73] Assignee: Nippon Electric Company, Ltd., Tokyo, Japan

[21] Appl. No.: 840,451

[22] Filed: Oct. 7, 1977

[51] Int. Cl.² .............................................. H04Q 5/20
[52] U.S. Cl. ................................................. 179/99 M
[58] Field of Search ....................... 179/99, 18 J, 18 F, 179/18 FA, 15 AT, 1 D, 18 BF

[56] References Cited

U.S. PATENT DOCUMENTS

| Re. 29,078 | 12/1976 | Tate | 179/99 |
|---|---|---|---|
| 3,909,550 | 9/1975 | Villadsen | 179/18 BF |
| 3,914,559 | 10/1975 | Knollman | 179/99 |
| 3,935,396 | 1/1976 | Barsellotti et al. | 179/99 |
| 3,967,072 | 6/1976 | Dimmick et al. | 179/99 |
| 3,973,085 | 8/1976 | Shiff | 179/99 |
| 4,024,345 | 5/1977 | Kochem | 179/1 B |
| 4,061,887 | 12/1977 | Kasson et al. | 179/99 |

Primary Examiner—Kathleen H. Claffy
Assistant Examiner—Gerald L. Brigancie
Attorney, Agent, or Firm—Sughrue, Rothwell, Mion, Zinn and Macpeak

[57] ABSTRACT

An electronic key telephone system is disclosed that provides a plurality of telephone features and functions, while only requiring a four-wire line between the central equipment and each key-set telephone (KST) and a two-wire line between the central equipment and each single-line telephone (SLT). Linear delta coding and time division multiplex (TDM) techniques are used to eliminate the multiple pairs required in traditional private business exchange (PBX) systems between the remote key telephones and the control unit. In the present system, a microprocessor controlled TDM controller transmits and receives control signals serially to and from interfaces in the system for control purposes and also for establishing exchange of digitized audio information data between selected interfaces. The system thus exchanges digitized audio information directly between interfaces and provides control signalling between the TDM controller and the interfaces, with all of the exchanges being done in real time. Among other things, the system is compatible with all types of existing central office exchange lines. The system may use combinations of single-line telephones (SLTs) or key-set telephones (KSTs). Specialized functions, such as conference calls, background music, external zone paging and night chime, as well as on-line maintenance, system configuration reprogramming, out-going telephone call control, and recordkeeping are available. To reduce complexity and increase economy, several functions in the system are time-shared, and the system is constructed in modular form to allow its capabilities to be tailored for its intended use.

30 Claims, 36 Drawing Figures

INTERRUPT CYCLE

WORD FORMAT

| CONTROL BITS | C1 | C2 | C1 | C2 | C1 | C2 | C1 | C2 | C1 | C2 | C1 | C2 | C1 | C2 | C1 | C2 |
|---|---|---|---|---|---|---|---|---|---|---|---|---|---|---|---|---|
| PSW | 0 | 1 | 0 | 1 | 0 | 1 | 0 | 1 | 0 | 1 | 0 | 1 | 0 | 1 | 0 | 1 |
| PAW | 1 | $A_7$ | 1 | $A_6$ | 1 | $A_5$ | 1 | $A_4$ | 1 | $A_3$ | 1 | $A_2$ | 1 | $A_1$ | 1 | $A_0$ |
| PRW | 1 | $R_7$ | 1 | $R_6$ | 1 | $R_5$ | 1 | $R_4$ | 1 | $R_3$ | 1 | $R_2$ | 1 | $R_1$ | 1 | $R_0$ |

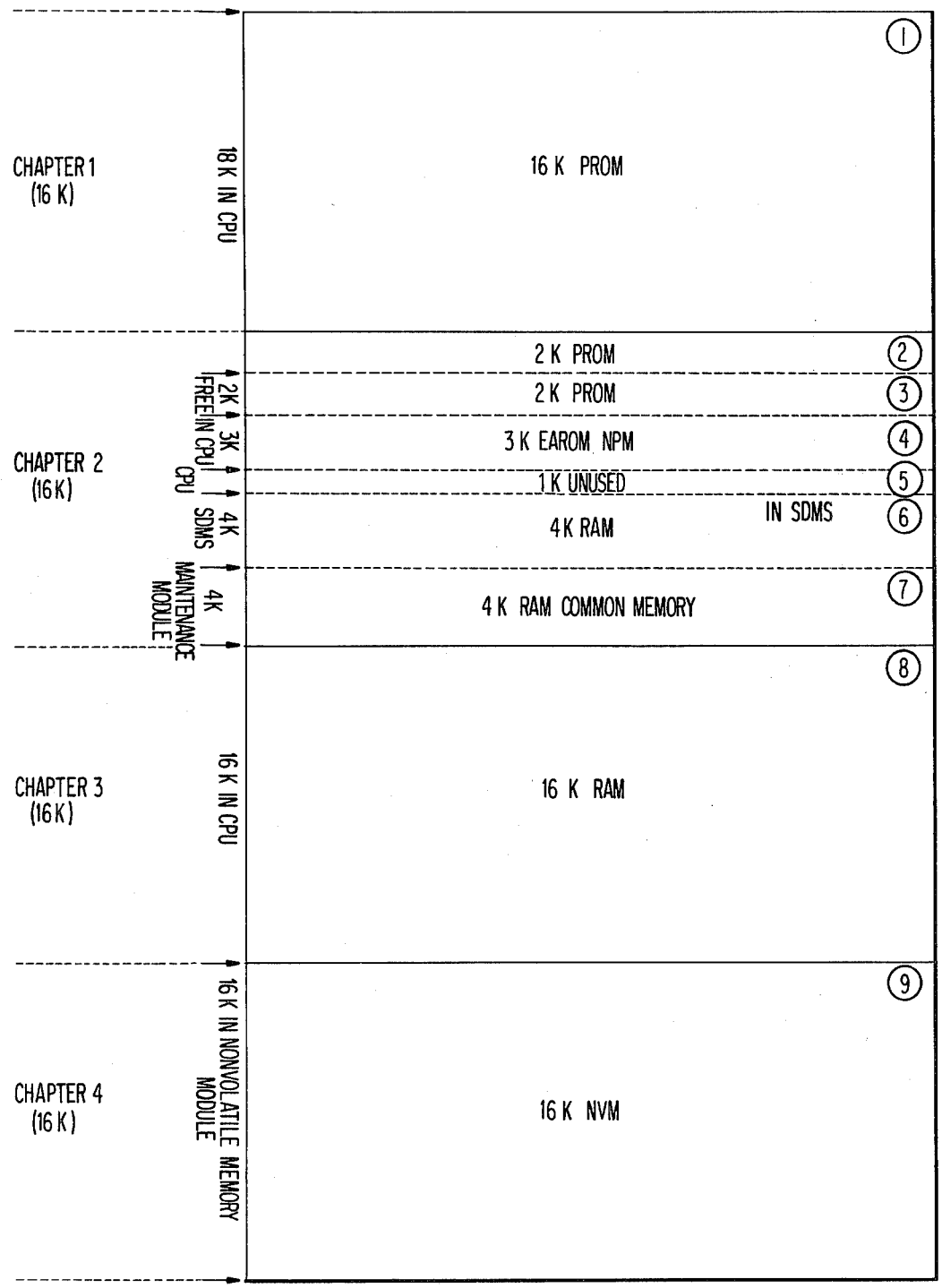

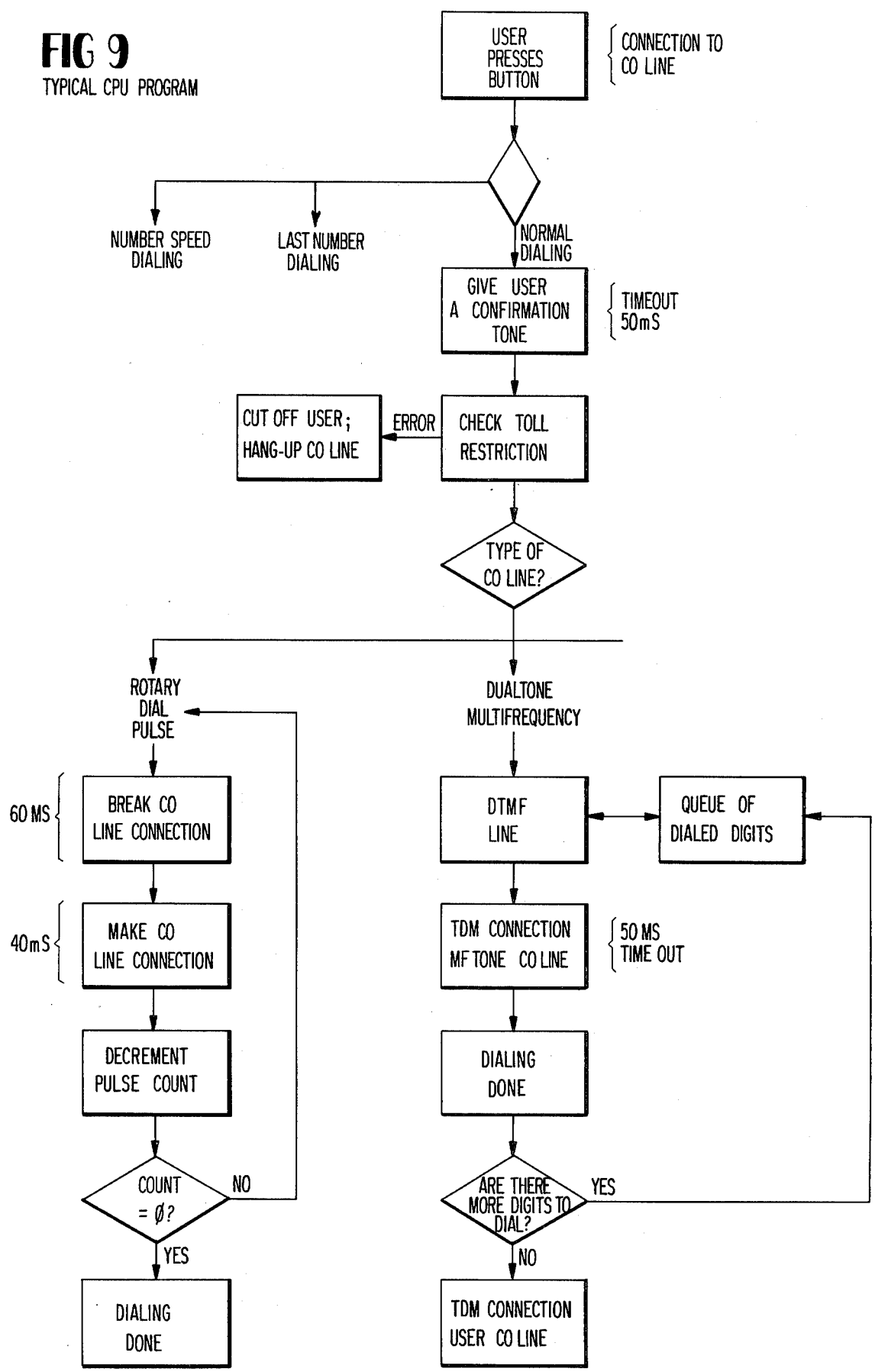

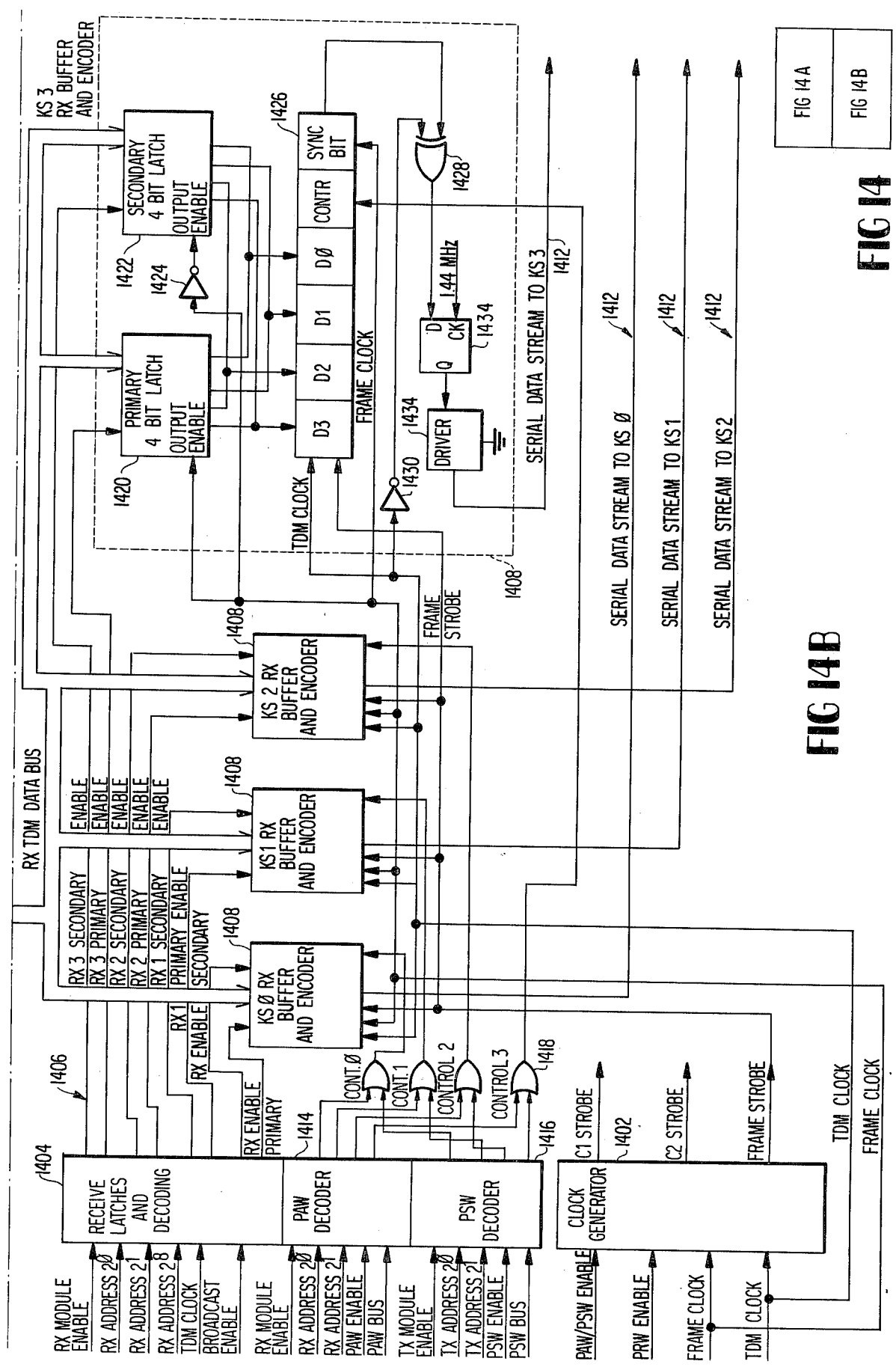

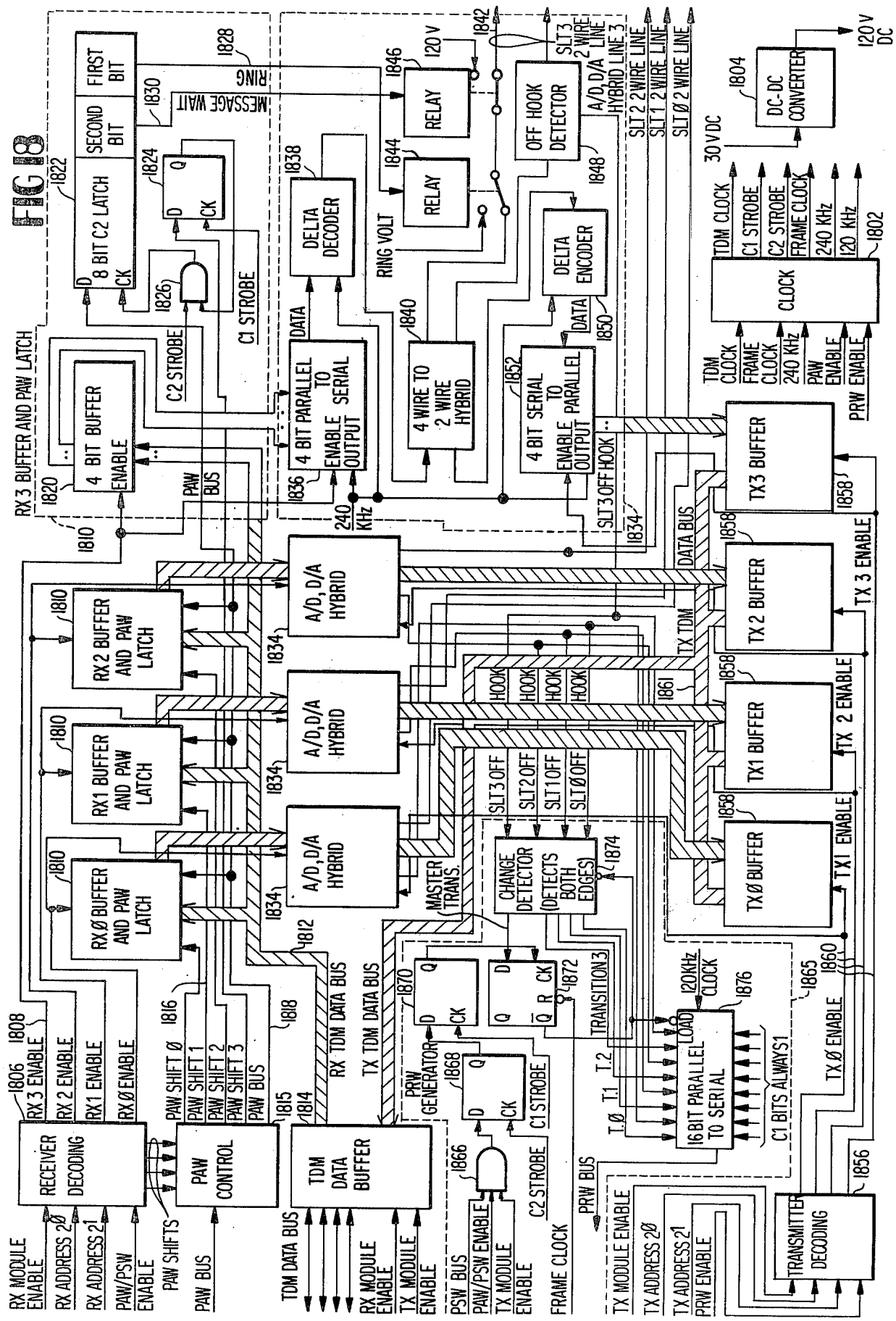

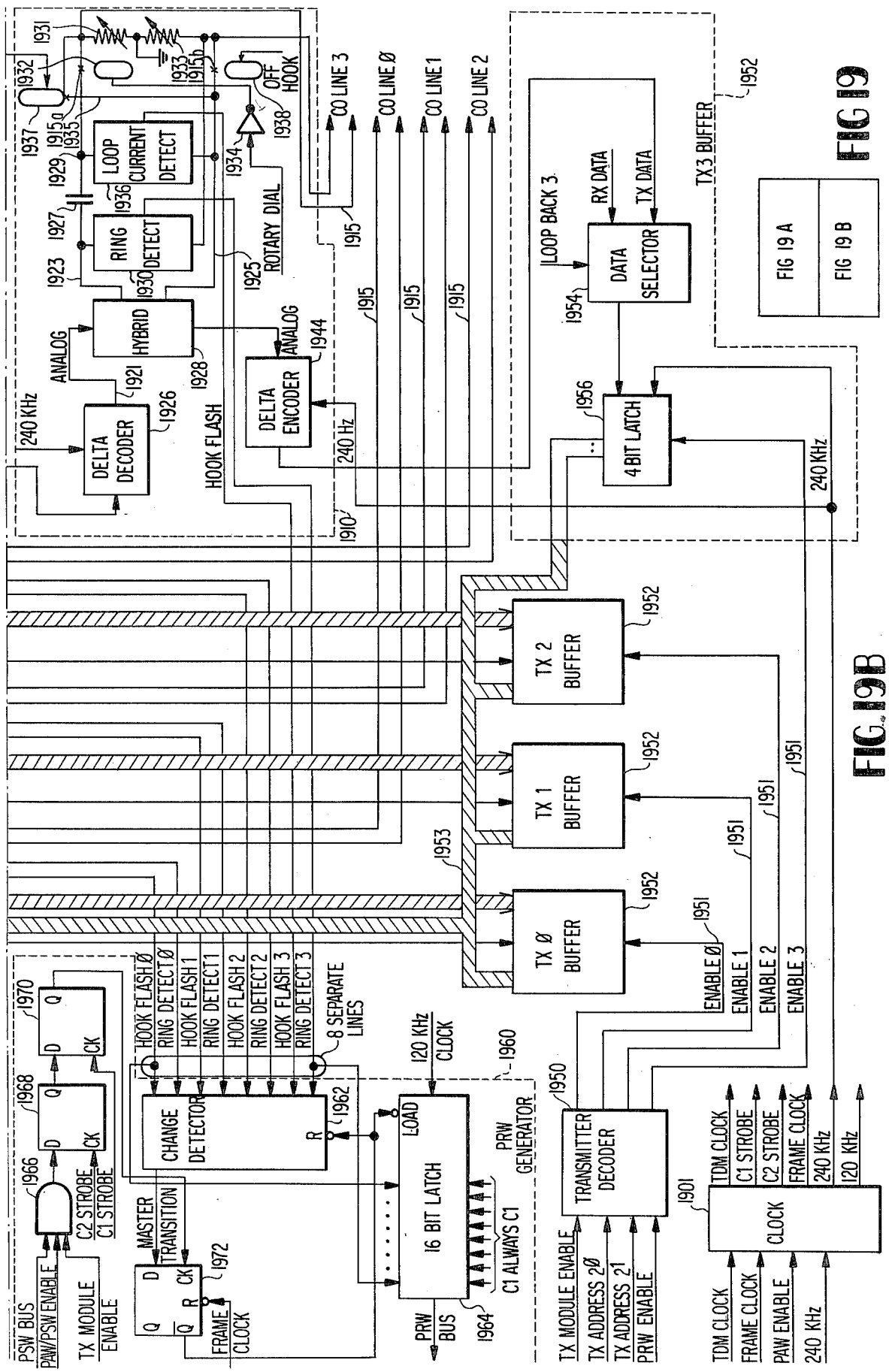

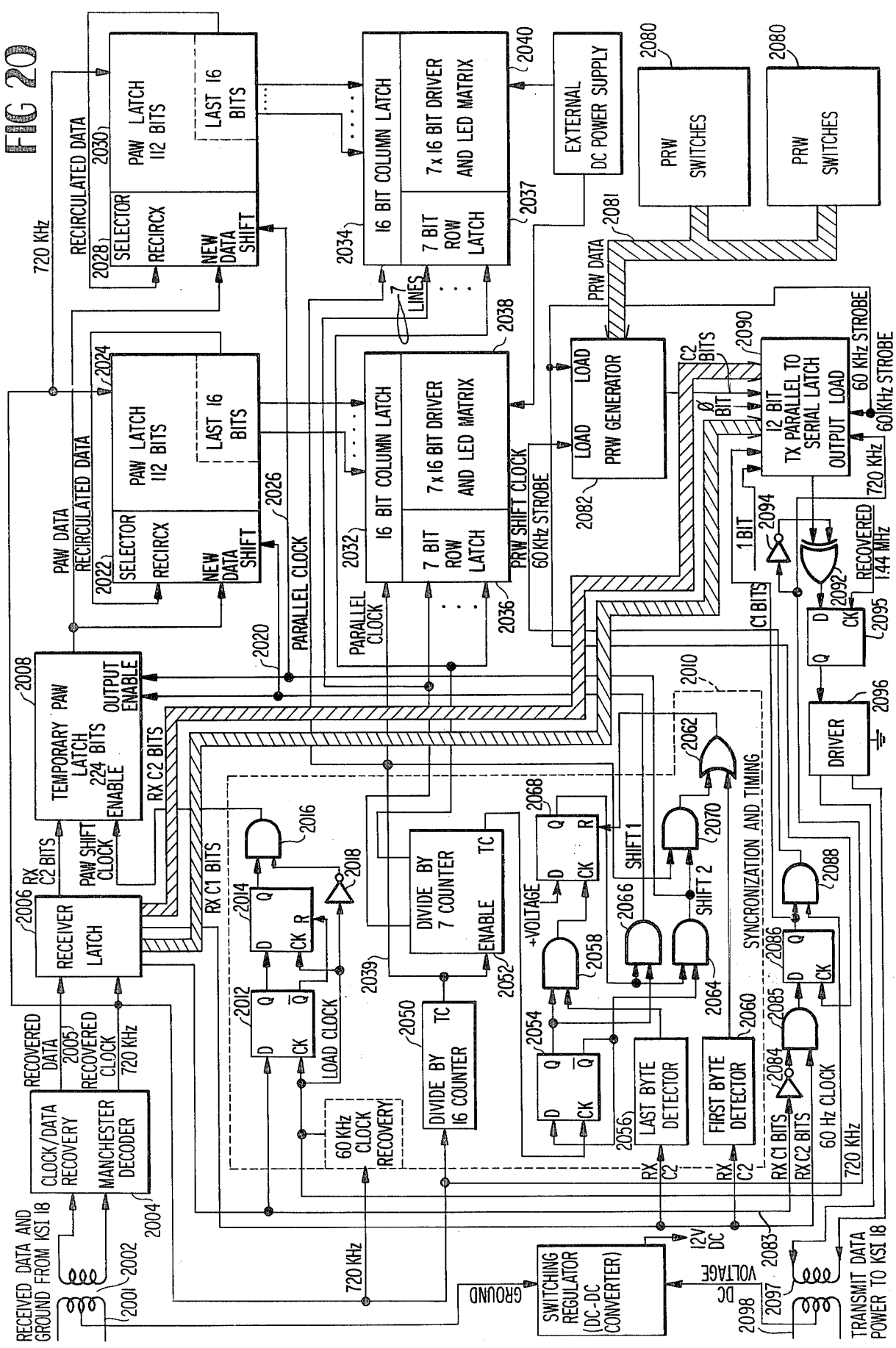

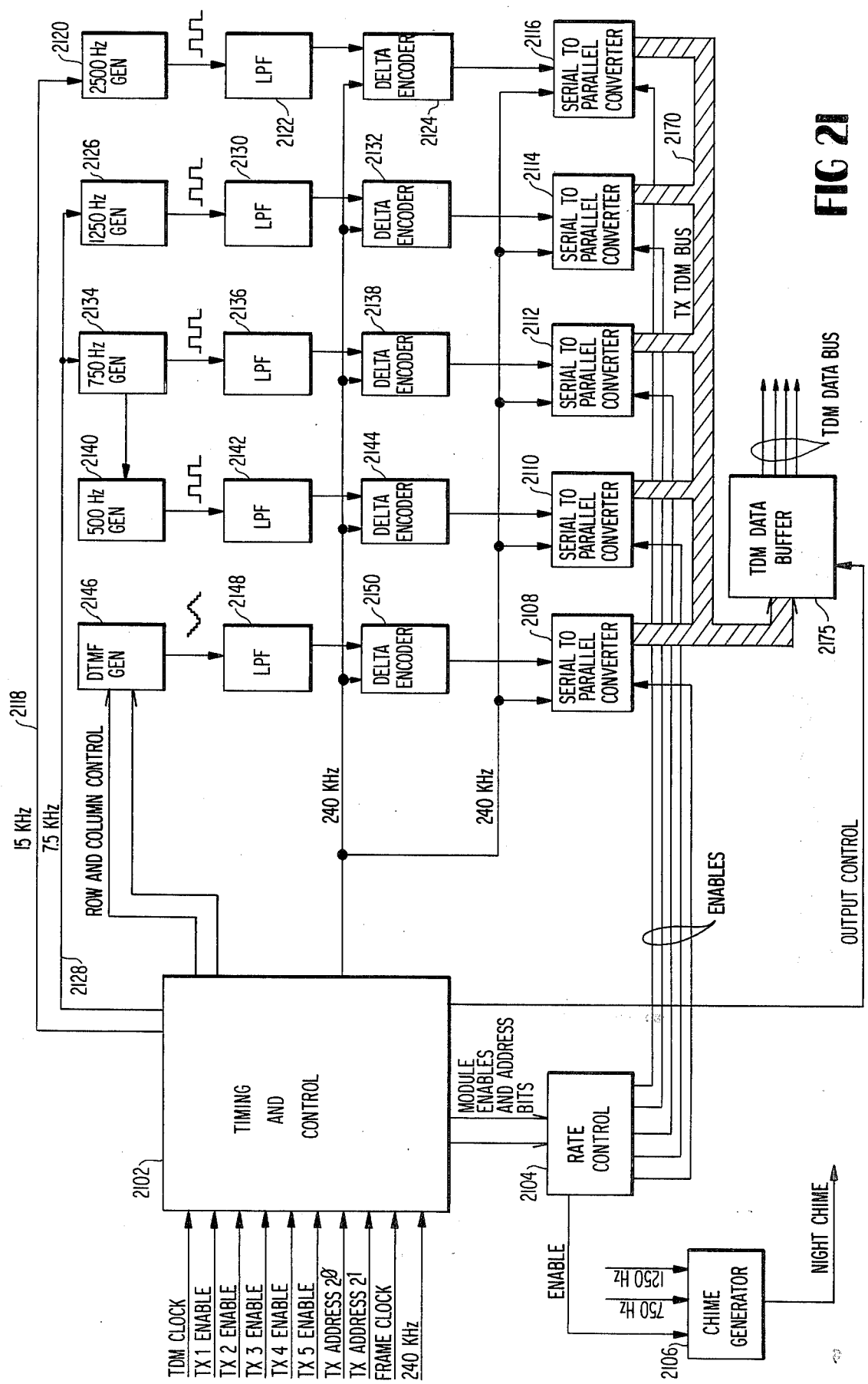

CONFERENCE MODULE

FIG. 24 AUDIO DIGITIZER

ELECTRONIC KEY TELEPHONE SYSTEM

BACKGROUND OF THE INVENTION

This invention relates generally to electronic key telephone (EKT) systems. More particularly, this invention relates to a key telephone system using linear delta modulation and TDM techniques to provide a multiplicity of telephone features and functions to remote telephones, while only requiring a two-wire line between each single-line telephone (SLT) and the central equipment and a four-wire line between each key-set telephone (KST) and the central equipment. The key telephone of the present invention is compatible with all types of existing central office (CO) exchange lines.

Telephone system development has progressed from single-line telephones to key-set telephones which allow the user to select, using push-buttons or keys at the key-set telephone, any one of a plurality of telephone lines connected to the key-set telephone. This capability of customer selection of one of a multiplicity of telephone lines has generated considerable user demand for key telephone systems which provide additional features and functions.

In traditional key telephone systems, each telephone line which may be selected by a user at a key-set must be provided to the key-set telephone, along with associated control and power lines. For example, in a key-set telephone which allows the user to select any one of six telephone lines, it has not been uncommon for such a key-set telephone to require a multi-conductor cable having upwards of 25 conductor pairs. Because such multi-conductor cables are costly to purchase and difficult to install and maintain, considerable effort has been directed towards reducing the number of required cable pairs while maintaining at each key-set telephone the available telephone lines as well as additional telephone features and functions. This reduction in required conductors has led to increasingly sophisticated key telephone systems utilizing modern digital techniques and signal processing.

In U.S. Pat. No. 3,843,845 to Ridley, issued Oct. 22, 1974, and assigned to Northern Electric Company Limited, there is disclosed an electronic key telephone system which requires three two-wire pairs between each electronic key telephone and the central control equipment. This disclosed system allows centralized switching at the central control equipment, which greatly reduces the required conductors between each key-set telephone and the central equipment. The three-pair cable between each key-set telephone and the central equipment has analog speech signals on the first pair, switching and indication data on the second pair, and power to the key-set telephone on the third pair.

In an electronic key telephone system recently announced by the Bell Telephone System, a three-pair cable is also required between each key-set telephone and the central control equipment. In this disclosed system, the first and second pairs are used for transmission and reception of various switching and indication data, and the third pair is used for transmission and reception of speech signals in analog form.

In the International Telephone & Telegraph, Inc. electronic key telephone system of the MKS-100 series, a three-pair cable is required between each key-set telephone and the central control equipment. Specifically, in the MKS-100 series, the first and second pairs are used for transmission and reception of various switching and indication data, and the third pair is used for transmission and reception of speech signals in analog form.

In an electronic key telephone system disclosed by the ROLM Corporation in "Computer Sophisitication Yields New Versatility, Economy in Medium-Size DBX," *Telephony*, Mar. 26, 1975, a 25-pair cable is needed to connect each key-set telephone with the central equipment.

It is therefore apparent that a key telephone system requiring less than a three-pair cable between each key-set telephone and the central equipment would result in substantial cost savings, both for new installations, and for installations utilizing existing building wiring present in traditional single-line telephone systems.

SUMMARY OF THE INVENTION

The present invention is an electronic key telephone system (EKTS) that requires only a four-wire cable between each key-set telephone (KST) and the central equipment and that requires only a two-wire cable between each single-line telephone (SLT) and the central equipment. The reduction in the required cable pairs is the result of using linear delta encoding/decoding of audio data and time division multiplexing (TDM) of digital control and digital audio data between the various interfaces in the system. A TDM controller is connected to each of the several different interfaces via a plurality of dedicated control buses, and each interface is connected to a common TDM bus. The TDM controller uses a time division multiplex (TDM) frame having, for example, 120 slots. Certain of these slots are dedicated to specific control functions between a selected interface and the TDM controller, while the remaining slots in each TDM frame are assigned for transfer of audio digital data between interfaces selected by a CPU via the TDM controller on a demand basis. Thus, the entire telephone system operates in real time.

The present system uses a modular configuration which allows it to be tailored for a specific application. Specifically, the system allows connection of up to 100 telephones of any mixture, in increments of four, of either key-set or single-line telephones. A key-set telephone interface (KSI) allows the TDM controller to communicate with and control up to four key-set telephones. Each key-set telephone is connected to its respective key-set interface by a four-wire cable. The first two wires of the four-wire cable are used as a uni-directional digital signal channel between the key-set interface and the key-set telephone, and the second two wires of the four-wire cable are used as a uni-directional digital signal channel between the key-set telephone and the key-set interface. A first serial bit stream continuously flows between the key-set interface and the key-set telephone via the first two wires, and a second serial bit stream continuously flows between the key-set telephone and the key-set interface on the second two wires. Each key-set telephone effectively has available to it a first and a second digital audio channel and a digital control channel from the key-set interface, as well as a first and a second digital audio channel and a digital control channel to the key-set interface. Since each key-set telephone has a handset, as well as a separate microphone and speaker in the body of the telephone, there can be two separate two-way telephone conversations present simultaneously at each key-set telephone. The separate speaker is also used to perform the ringing function traditionally done in a single-line telephone by a mechanical bell.

A single-line telephone (SLT) interface allows the TDM controller to communicate with and control up to four single-line telephones. Each single-line telephone is connected to its respective single-line telephone interface by a two-wire cable. Analog signals are used for information exchange between the single-line telephone interface and each single-line telephone (SLT). It should be noted that any mixture, in increments of four, of key-set telephones and single-line telephones can be accommodated by the system. A central office line (CO line) interface allows the TDM controller to communicate with and control up to four separate CO lines from the main telephone exchange. Up to five central office line interfaces can be accommodated by the system. A tone generator interface allows the TDM controller to provide appropriate signal tones to all of the telephones in the system, as well as to provide a time-shared dual-tone multi-frequency (DTMF) generator for allowing the key-set telephones to provide DTMF dialing signals on the CO lines via the CO line interface. A dual-tone multi-frequency (DTMF) encoder/decoder interface, on a time-shared basis, allows outgoing DTMF dialed calls from single-line telephones to be digitally encoded for use by the CPU, which digital information is then used by the CPU to start the procedure whereby outgoing DTMF dialing on a CO line is performed. The interfaces just described, as well as the CPU, comprise the required units of the present system.

Several other interfaces, which provide additional features and functions, are available in the present system. A ringing tone generator provides the 90-volt, 20 Hz ringing signal required to ring the bell unit present in each single-line telephone. An audio digitizer interface allows up to four audio sources to be connected to the system for providing background music and the like. An external page interface allows zone paging using external speakers in any one or all of five paging zones. A conference interface provides a conference-call function which allows up to four two-way telephone conversations, either inside or outside the present system, to be in conference communication in which each party can communicate with the other conference parties simultaneously. Up to eight conference interfaces can be accommodated by the system. A Direct Station Selection with Busy Lamp Field Console (DSS/BLF) can be connected to any key-set interface as if it was a key-set telephone. A busy lamp field on the console provides a visual indication of the status of up to 100 telephones (KST and/or SLT) in the system. Moreover, the DSS/BLF console allows a communication path to be created between the telephone at the console and any of the 100 telephones whose status is being monitored. A maximum of two DSS/BLF consoles can be accommodated by the system.

A non-volatile memory unit connected to the CPU allows up to ten numbers per telephone (KST and SLT) to be stored for rapid read-out so as to provide a speed-dial function. A maintenance unit connected to the CPU allows on-line system diagnosis and fault detection, as well as on-line reprogramming of the configuration of the system. A subscriber message detail service (SMDS) connected to the CPU provides a recordkeeping function of all outgoing calls from the system.

It is thus apparent that the present system provides an electronic key telephone system offering many different features and functions, and which requires only a four-wire cable between each key-set telephone and its respective key telephone interface, and which requires only a two-wire cable between each single-line telephone and its respective single-line telephone interface.

BRIEF DESCRIPTION OF THE DRAWINGS

FIG. 8 shows the SYSTEM MEMORY PLAN.

FIG. 9 is a general flow graph of a typical CPU 12 program.

FIG. 18 is a block diagram of the SINGLE-LINE TELEPHONE INTERFACE 22.

FIG. 20 is a block diagram of the DIRECT STATION SELECTION with BUSY LAMP FIELD CONSOLE 36 (DSS/BLF).

FIG. 21 is a block diagram of the TONE GENERATOR 32.

DETAILED DESCRIPTION OF THE PREFERRED EMBODIMENT

Figure 1:
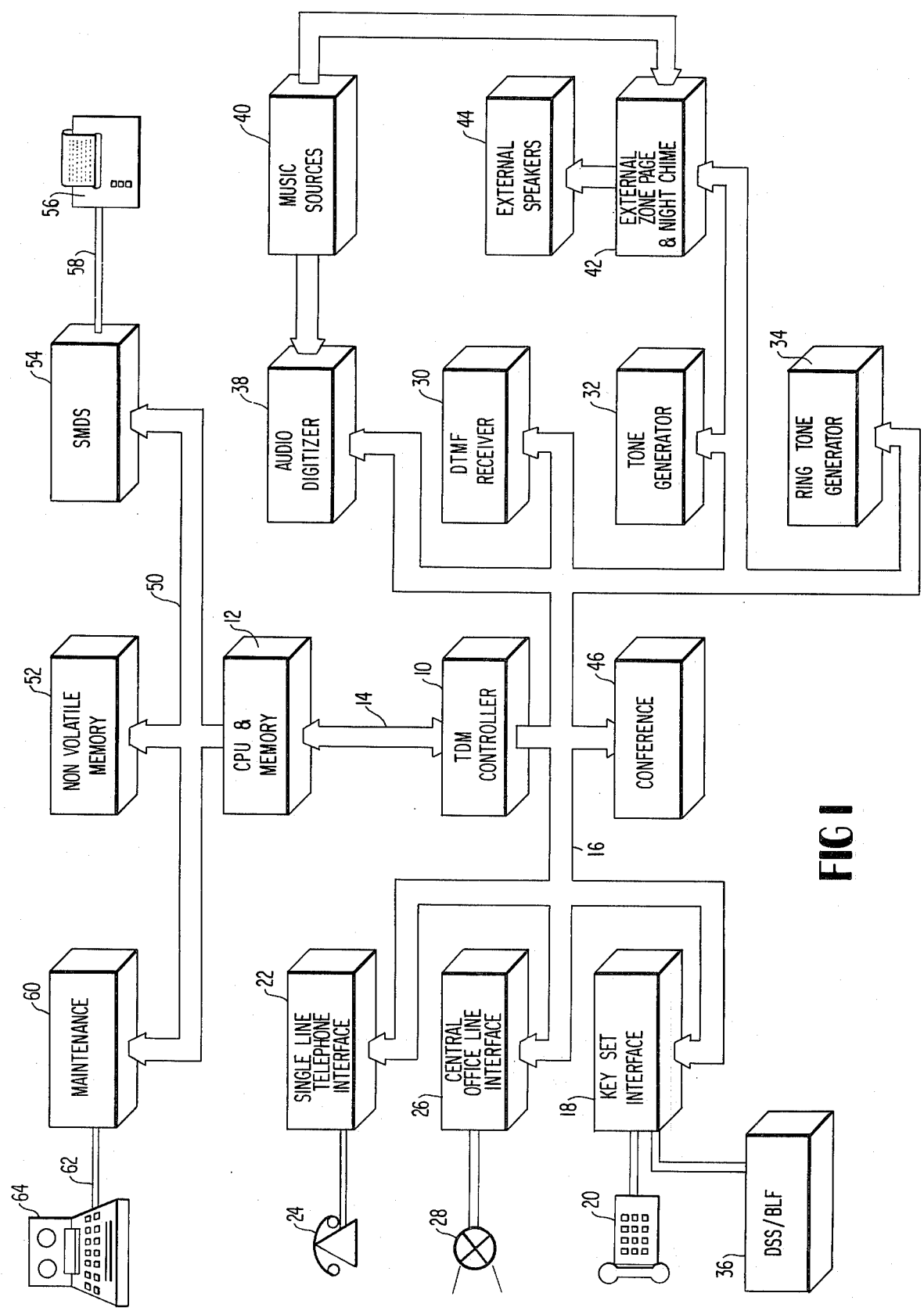
FIG. 1 is a general block diagram of the electronic key telephone system.

Referring to FIG. 1, a general block diagram of the entire system of the present invention is shown. A TDM CONTROLLER 10 connected by a plurality of control buses (found in a common digital control data and a digital audio data bus 16) to each of the various interface units, controls all digital control data and digital audio data transfers in the system. A CPU and MEMORY unit 12 is connected via a data bus 14 for transmitting and receiving control information from the TDM controller 10. The CPU and MEMORY 12 controls the TDM controller 10, which in turn controls the sequence of transfer of digital control data and digital audio data between the various interfaces, as discussed below. The TDM CONTROLLER 10 is connected via the common digital control data and digital audio data bus 16 to each of the plurality of KEY-SET INTERFACES 18. Each KEY-SET INTERFACE 18 can accommodate up to four KEY-SET TELEPHONES 20. Since the system is capable of accommodating up to 100 telephones, there may be up to 26 key-set interfaces 18. Each key-set telephone 20 is connected to a key-set interface 18 via a four-wire cable. Digital information, both control and audio, is sent and received from each key-set telephone 20 to its respective key-set interface 18 via its four-wire cable.

The TDM controller 10 is connected via the common digital control and digital audio bus 16 to a plurality of single-line telephone interfaces 22 (only one of which is shown in FIG. 1). Each single-line telephone interface 22 can accommodate up to four single-line telephones 24. Since the system can accommodate up to 100 telephones, as stated above, there may be up to 26 single-line telephone interfaces 22 in the system. Each single-line telephone 24 transmits and receives analog signals from its respective single-line telephone interface 22 via a two-wire cable.

The TDM controller 10 is connected via the common digital control and digital audio bus 16 to a plurality of central office line interfaces 26 (only one of which is shown in FIG. 1). Each CO-line interface 26 can accommodate up to four CO lines from the main telephone system (not shown). Any type of presently available CO line may be accommodated, for example, TIE, WATS, CO, etc. Since the system can accommodate up to 30 CO lines, up to eight CO line interface units 26 can be present in the system. Each CO-line interface 26 converts the analog control and audio signals from each connected CO line 28 into a digital format appropriate for the present system, and converts all control and audio digital data back to an appropriate analog signal format for transmission out onto the connected CO line 28.

The TDM controller 10 is connected via the common digital control and digital audio bus 16 to a dual-tone multi-frequency (DTMF) receiver 30. The DTMF receiver 30 converts the analog multi-frequency control signals from the dial pad present on each single-line telephones 24 to an appropriate digital control signal for use by the CPU 12. The CPU 12 uses the digital information to have generated corresponding analog DTMF signals for dial signalling on a connected CO line 28. Each DTMF receiver 30 is time-shared by a plurality of single-line telephones 24. Up to five DTMF receivers 30 may be present in the system.

The TDM controller 10 is connected via the common digital control and digital audio bus 16 to a tone generator 32. Tone generator 32 is time-shared and provides all audio signal tones used by the system. The audio tones generated by tone generator 32 are converted to digital form using linear delta encoding (the use of linear delta encoding/decoding of all audio signals in the system is discussed presently), and are provided to the key-set telephones 20 and single-line telephones 24 designated by the TDM controller 10 for producing audio signalling tones for the user. Moreover, separate digital delta-encoded audio tones are generated by tone generator 32 under direction of the TDM controller 10 and are provided to a specified CO line interface 26 for generation of needed audio DTMF dialing tones on an active CO line 28. It should be noted that the tones provided to the telephones 20 are different from those provided to the CO line 28.

The TDM controller 10 is connected via the common digital control and digital audio data bus 16 to a ring-tone generator 34. Ring-tone generator 34, on a line separate from bus 16, provides the 90-volt, 20 Hz ringing voltage to each single-line telephone interface 22 used for ringing the electromechanical bell found in each single-line telephone 24.

The units just described comprise the basic units of the system. The additional units available to perform auxiliary functions in the system are now described.

The TDM controller 10 is connected via bus 16 and a key-set interface 18 to a Direct Station Selection Busy Lamp Field console 36 (DSS/BLF). The DSS/BLF unit 36 allows a system attendant to visually monitor the status of up to 100 telephones in the system, and to create a talk path connection between the attendant's key-set telephone 20 and any one of the monitored 99 telephones. A maximum of two DSS/BLF consoles 36 can be accommodated by the system.

The TDM controller 10 is connected via the common digital control and digital audio bus 16 to an audio digitizer 38. Audio digitizer 38, which is time-shared, may accommodate up to four separate input audio signals from sources 40 (only one of which is shown in FIG. 1). (These music sources 40 do not comprise part of the system.) The audio digitizer 38 converts the analog signals from the music sources 40 into digital linear delta encoded audio data. This encoded audio data is provided to other interfaces in the system, as specified by TDM controller 10. It is apparent that background music can be provided by using the audio digitizer unit 38.

The TDM controller 10 is connected via the common digital control and digital audio bus 16 to an External Zone Page and Night Chime 42. Unit 42 is connected, in turn, to a plurality of external speakers 44. These external speakers are divided into five zones. Unit 42 allows any user via a telephone 20 or telephone 24 to conduct a page in any one or all of the five zones. Unit 42 also allows a night chime to ring after hours, as is well known in the art.

The TDM controller 10 is connected via the common digital control and digital audio bus 16 to a conference interface 46. Conference interface 46 allows up to four two-way conversations in the system to be placed in the conference mode, thus allowing each of the conferences to talk to all other conferences simultaneously. Thus, conference unit 46 allows conference calls between telephones in the system as well as outside CO lines through CO line interface 26.

The CPU and memory unit 12 is connected via a common data bus 50 to a non-volatile memory 52. Non-volatile memory 52 allows storage of specified data, for example, up to ten telephone numbers per telephone in the system. Thus, non-volatile memory 52 can provide a speed-dial feature to the system. Non-volatile memory 52 can provide storage space for critical system data, to prevent against accidental loss thereof in the event of a power outage.

The CPU and memory unit 12 is connected via the common data bus 50 to a Subscriber Message Detail Service (SMDS) 54. The SMDS 54 is connected to an alpha-numeric recording device 56 via line 58. The SMDS unit 54, in conjunction with data device 56, can provide an on-going recordkeeping of all outgoing calls from the system. The SMDS unit 54 can also limit outgoing calls, for example, restricting all outgoing calls to specified telephone areas.

The CPU and memory unit 12 is connected via the common data bus 50 to a Maintenance Processor 60, which in turn is connected via a line 62 to an input/output device 64, for example, a standard ASR33 teletype. Maintenance Processor 60 allows the system to be diagnosed and reprogrammed in an on-line basis while the system is in normal operation.

Before describing the individual blocks of FIG. 1 in greater detail, it is helpful to understand the communications format between (1) the TDM controller 10, the various interfaces and the TDM data bus; (2) the key-set interface and the key-set telephones connected thereto to which they are connected; and (3) the CPU 12 and the TDM controller 10.

COMMUNICATION BETWEEN TDM CONTROLLER, INTERFACES AND TDM DATA BUS

Communications between these three elements of the system takes place on a time division multiplexed (TDM) basis having a frame rate of 60 KHz. A single TDM frame of the system is shown in FIG. 2A. Frames are repetitive and each is divided into 120 equal time slots. Most of the time slots are available for voice communication on an assigned basis (see AUDIO SLOT in FIG. 2A). For example, assume key-set telephone set M is talking to CO line N. A slot K may be assigned for transferring voice data (in digital linear delta encoded byte format) from M to N, and a slot L may be assigned for transferring digital voice data from N to M. The actual data byte transfer is from key-set telephone M to its key-set interface unit and then onto the TDM data bus. (The TDM data bus is shown in FIG. 3.) The data on the data bus is picked off by the CO line interface and sent to CO line N.

During most of the other 120 time slots, other telephones or CO lines, etc. will have access via their respective interface units to the TDM data bus. It should be understood that during any one slot, only two devices (e.g., telephones, CO lines, etc.) have access to the TDM bus; one for putting a data byte onto the bus and one for taking that data byte from the bus. (There is an exception, described later, for broadcasting.)

The devices having access to the TDM bus are determined by the TDM controller 10, which provides a transmit (TX) address and a receive (RX) address for each time slot. These addresses and other control signals are provided to the interface units, thereby informing the latter whether or not any of their respective devices can have access to the TDM bus during a given time slot of a TDM cycle.

Although most slots in the frame are available for sending and receiving bytes of digital voice data, several are dedicated for control purposes.

Two slots in each frame, called R/W slots, are dedicated for transferring information between the TDM controller 10 and the CPU. (These are shown as IDLE SLOTS on FIG. 2A.)

Two slots in each frame are dedicated for permitting the devices to signal the TDM controller 10. Such signalling is necessary to inform the TDM controller 10, for example, that the device (e.g., telephone) has gone OFF HOOK and wants a line, or a number that is being dialed, etc. Another example is a CO line interface which has an incoming call on one of its CO lines. These two slots are called the PRW slots (see FIG. 2A), and the data sent via these slots is a 16-bit word called the PRW. The word identifies the request and is sent serially (two bits per TDM frame) over a period of eight successive TDM frames to the TDM controller 10 via a separate PRW bus when the device is directed to do so by TDM controller 10.

Two slots in each frame are dedicated for permitting the TDM controller 10 to send control signals to a device designated by TDM controller 10 and the CPU 12. There are basically two types of control signals. One is a digital serial scanning signal (called a port scanning word, PSW), whereby the TDM controller 10 sequentially scans all devices in the system looking for a request, i.e., a PRW serial signal, from a device which is currently being sent a port scanning word serial signal by the TDM controller 10. The second is a digital serial assignment signal (called a port assignment word, PAW) which controls any function in an interface or in a device connected to an interface which can be controlled by the TDM controller 10. Examples of such PAW assignment functions are numerous in the system, and PAW assignment functions are numerous in the system, and include, for example, the flashing of all LEDs on each key-set telephone 20, the change of the state of all LEDs on a DSS/BLF console 36, the lighting of a message lamp on a single-line telephone 24, the activation of a CO line 28 by a CO line interface 26 when any telephone in the system goes OFF HOOK, as well as many others.

The port scanning word is designated as the PAW, and the port assignment word is designated as the PAW. As was stated, the PAWs and the PSWs can only be sent to an interface or a device connected with an interface during the two dedicated time slots in each TDM frame called the PAW/PSW time slots (see FIG. 2A). Each PAW or PSW is always a 16-bit word. As is explained in detail later, each PSW is always of the sequence 0101010101010101, whereas each PAW contains eight bits of assignment information, interleaved with check bits, for indicating to the receiving interface the assignment action to be taken. Each PSW or PAW is sent serially, two bits per TDM frame (during the times in each TDM frame corresponding to the two dedicated PAW/PSW slots), over a period of eight successive TDM frames. The PSW is sent over a separate PSW bus, and the PAW is sent over a separate PAW bus. The interface or device connected to an interface, which is directed by the TDM controller 10 to receive either the PSW or PAW, is sent a specific address which enables it to pick-off the PSW or PAW data off the respective bus.

The system is arranged so that the PAW control and the PSW control are mutually exclusive. That is, a PAW and a PSW can never be sent simultaneously to the same device by the TDM controller 10 on the respective PAW and PSW buses. This mutual exclusivity is necessary so as to prevent system malfunction, which would occur due to the cancellation that would take place in an interface or device which had received a PAW and a PSW simultaneously.

It is also important at this point in the discussion to understand the relationship of the PRW and the PSW. The TDM controller 10, under direction of CPU 12, serially scans each interface in the system and each device connected to an interface in the system to querie that scanned interface or device to find out if it has any pending requests. As will become apparent later, this scanning is done very rapidly so as to prevent the system from becoming overloaded during periods of high activity. When a particular interface or device is scanned, the PSW is sent out, and the TDM controller 10 directs the specified interface or device to pick-off the PSW from the PSW bus. On receipt of the first bit of the 16-bit serial PSW, the interface or device being scanned senses it, and starts to output, if one is present in a latch, a pending PRW. Depending on cable delay, etc., the TDM controller 10 may start receiving the first bit of the 16-bit PRW from the PRW bus during the next dedicated PRW time slot in the TDM frame. Since each interface or device connected to an interface is scanned in less time than two successive PRWs can be created by that interface or device, the system never falls behind and no PRW from any interface or device is ever lost.

Figure 13:
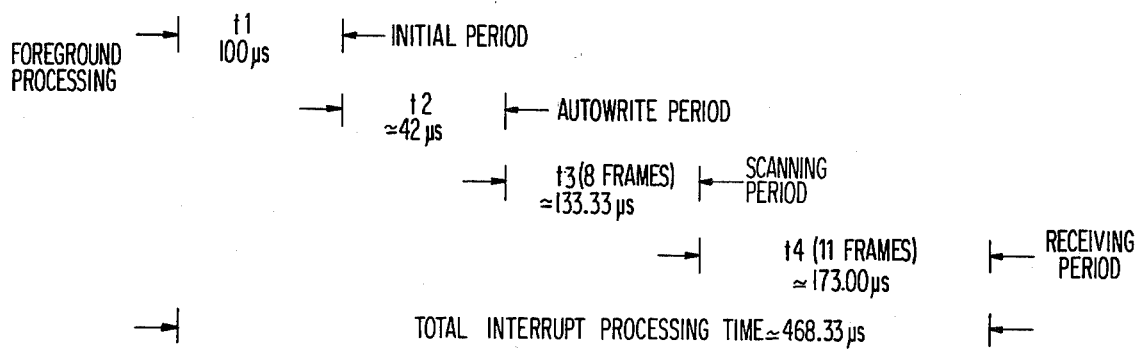
FIG. 13 is a block diagram showing the arrangement of the PSW, PAW and PRW.

Referring to FIG. 13, the format of a PSW, PRW and PAW is shown. As stated earlier, the format of a PSW is fixed, whereas eight bits of signalling information can be present in each PRW and each PSW. The use of fixed bits in each of the three types of control words allows for detection of the beginning of each word by various units in the system, as will become more apparent later.

The system uses linear delta encoding, at a fixed rate of 240 KHz, for converting all audio data in the system to a digital format (there are minor exceptions to this statement, but they are pointed out explicitly). This is the form that all audio data takes that is exchanged between interfaces on the TDM data bus 16 under command of the TDM controller 10 during a specified audio time slot in the TDM frame. Only one interface can output digital audio data onto the TDM data bus during one audio time slot in the TDM frame, and only one interface can accept the digital audio data on the TDM data bus during that slot (the broadcast mode exception is noted in detail later). In order to create a two-way communication channel between two interfaces or devices, it is necessary to use two audio slots per TDM. Since there are 112 such slots, up to 56 two-way paths can be created in the system at one time.

For ease of understanding, it should be noted that there are four bits of digital audio data on the TDM bus during the time of any active audio slot in a TDM frame. In other words, digital audio data is transferred between interfaces via the TDM data bus in a parallel 4-bit fashion. Since the TDM frame is 60 KHz, and the sampling rate of linear delta encoding of audio data is always 240 KHz, it is apparent that by having four bits of parallel digital audio data per TDM frame, there is an even match between the sampling and transfer of digital audio data in the system.

In order to better understand the implementation of the TDM frame, the digital audio exchange between specified interfaces via the TDM data bus, and the control signalling between the TDM controller 10 and the interfaces, reference should now be made to FIG. 3.

As has been stated earlier, digital audio data is exchanged in parallel 4-bit fashion between specified interfaces via the TDM data bus during specified audio time slots in the TDM frame. It should be remembered that only one interface transmits digital audio data onto the TDM data bus per audio slot, and that only one interface receives that digital audio data during that audio slot. In order to direct an interface to transmit digital audio data onto the TDM data bus during a particular audio time slot, the TDM controller 10 must provide that interface with an address signal during the duration of that audio time slot that enables the interface to make the transmission. The interface address that enables that interface to transmit is called the transmit address of the interface (TX ADDRESS for short). It should be remembered that some interfaces in the system have up to four devices connected to them, for example, key-set interface 18 or single-line telephone interface 22, among others. Others perform more than one function, for example, tone generator 32, audio digitizer 38, among others. Thus, many interfaces respond to each of the four different TX ADDRESSes.

Transmit addressing (TX ADDRESS) of interfaces is done so as to minimize the required address bits. Specifically, each interface has a dedicated line called its TX MODULE ENABLE which is connected only between it and TDM controller 10. This TX MODULE ENABLE line must be in, for example, the high state (1 bit) when the TDM controller 10 wants to send a TX ADDRESS to the interface it is connected to. In addition, since there are typically four devices connected to or functions present at each interface, two additional bits of TX ADDRESS data must be provided by the TDM controller 10 to correctly TX ADDRESS a particular device or function at that interface. To accomplish this part of the TX ADDRESS, a TX ADDRESS BUS $2^0$ and a TX ADDRESS BUS $2^1$ are connected between the TDM controller 10 and all of the interfaces in the system. Since each interface has its separate TX MODULE ENABLE line, it is now apparent that only three bits of data are needed by the TDM controller 10 in order to correctly TX ADDRESS one device or function in any of the interfaces in the system. A proper TX ADDRESS from the TDM controller 10 (from unit 320) thus ENABLES the addressed device in an interface, allowing it to transmit digital audio data onto the TDM data bus during the duration of the TX ADDRESS.

TDM controller 10 signalling of the device in an interface which is directed to extract digital audio data off the TDM data bus during an audio slot in the TDM frame is done in the same fashion as the TX ADDRESS, except that separate RX ADDRESS lines are used. Referring to FIG. 3, each interface has its separate RX MODULE ENABLE which is connected only between it and the TDM controller 10. In addition, there is an RX ADDRESS BUS $2^0$ and an RX ADDRESS BUS $2^1$ which are connected between the TDM controller 10 and all interfaces in the system. A proper RX ADDRESS from the TDM controller 10 (from unit 310) thus ENABLES the addressed device in an interface, allowing it to receive digital audio data from the TDM data bus during the duration of the RX ADDRESS.

As stated earlier, key-set telephones 20 have four communication channels: two from the key-set interface 18 to the key-set 20, and two from key-set 20 to the key-set interface 18. It is therefore apparent that TDM controller 10 must, in sending either a TX ADDRESS or an RX ADDRESS to a key-set interface 18, specify which one of the two possible communication channels for each address is to be ENABLED. To provide this capability for the TX ADDRESS, a TX ADDRESS BUS $2^8$ is provided between the TDM controller 10 and each key-set interface 18; to provide this capability for the RX ADDRESS, an RX ADDRESS BUS $2^8$ is provided between the TDM controller 10 and each key-set interface 18, as shown in FIG. 3.

The TX ADDRESS and the RX ADDRESS schemes used to ENABLE interfaces during audio slots are also used by the TDM controller 10 during the dedicated PAW/PRW slots and PSW slots for providing an ENABLE to a designated interface to receive or to send a control word.

With respect to the PAW (which is sent by TDM controller 10 to a designated interface), the only required additional line to send a PAW RX ADDRESS to ENABLE the addressed device to pick-off a PAW bit on the PAW BUS is the PAW/PSW ENABLE BUS. The PAW/PSW ENABLE BUS is connected between the TDM controller 10 and each interface in the system. The PAW/PSW ENABLE BUS thus indicates to the device having the RX ADDRESS sent by the TDM controller 10 whether data from the TDM data bus is to be received or whether a PAW bit is to be picked off the PAW BUS. When the PAW/PSW ENABLE BUS is in, for example, the high state (1 bit), a PAW bit is to be picked-off the PAW BUS.

With respect to the PRW (which is sent by a designated interface to TDM controller 10), the only required additional line to send a PRW TX ADDRESS to ENABLE the addressed device to send a PRW bit on the PRW BUS is the PRW ENABLE BUS. The PRW ENABLE BUS is connected between the TDM controller 10 and each interface in the system. The PRW ENABLE BUS thus indicates to the device having the RX ADDRESS sent by the TDM controller 10 whether data is to be transmitted to the TDM data bus or whether a PRW bit is to be sent out on the PRW BUS. When the PRW ENABLE BUS is in, for example, the high state (1 bit), a PRW bit is sent to the PRW BUS.

With respect to the PSW (which is sent by the TDM controller 10 to a designated interface), the only required additional line to send a PSW TX ADDRESS to ENABLE the addressed device to pick-off a PSW bit on the PSW BUS is the PAW/PSW ENABLE BUS. The PAW/PSW ENABLE BUS is connected between the TDM controller 10 and each interface in the system. The PAW/PSW ENABLE BUS thus indicates to the device having the RX ADDRESS sent by the TDM controller 10 whether data is to be transmitted to the TDM data bus or whether a PSW bit is to be picked-off the PSW BUS. When the PAW/PSW ENABLE BUS is in the high state (1 bit), a PSW bit is to be picked-off the PSW BUS. Even though both the PAW and the PSW are coming from the TDM controller 10, it should be noted that an RX ADDRESS is used for a PAW, while a TX ADDRESS is used for a PSW.

COMMUNICATION BETWEEN A KEY-SET INTERFACE AND A KEY-SET TELEPHONE

As stated earlier, a four-wire cable connects each key-set telephone 20 with its key-set interface 18. It should be remembered that the first two wires of the four-wire cable are used to create two digital audio channels and one digital control channel between the key-set interface 18 and the key-set telephone 20. The first of the two digital audio channels is used to provide the necessary digital audio data for the audio signal going to the receiver in the handset. The second of the two digital audio channels is used to provide the necessary digital audio data for the audio signal going to the speaker in the telephone body. The digital control channel is used to send the two possible bits of PAW or PSW present per TDM frame to the key-set telephone 20.

As stated earlier, there are four bits of digital audio data per TDM frame for any given audio device in the system, since the TDM frame is 60 KHz and the linear delta sampling rate is 240 KHz. Since there are two digital audio channels from the key-set interface 18 to the key-set telephone 20, there are eight possible bits of digital audio data per TDM frame which must be transmitted by the key-set interface 18 to the key-set telephone 20 via the first two wires of the four-wire cable. Moreover, there are two possible bits of control PAW or PSW per TDM frame.

Figure 16A:
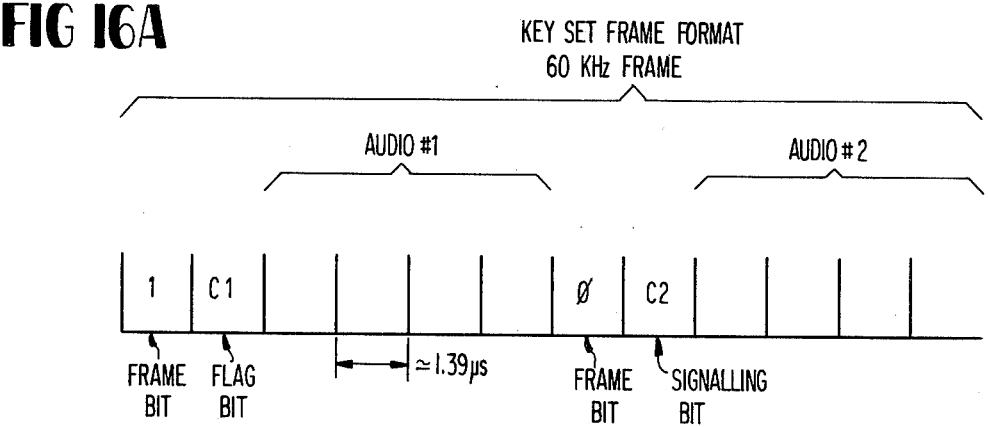
FIGS. 16A, 16B, and 16C are timing diagrams showing the KEY-SET FRAME FORMAT.

FIG. 16A shows the frame format of the serial digital data stream that is continuously sent by the key-set interface 18 to the key-set telephone 20 via the first two wires of the four-wire cable. The frame of the serial digital data stream, called the key-set frame, is 60 KHz, which makes it the same length as the TDM frame of the TDM controller 10. Moreover, the beginning of the key-set frame is synchronized with the beginning of the TDM frame. The key-set frame is divided into twelve equal slots. Each slot is dedicated for a particular function. The first slot is dedicated for the first frame bit, which ways a 1 bit. The first frame bit, as is explained later, is used to determine the beginning of a received key-set frame and to recover the frame clock. The second slot is dedicated for the flag bit, which is the C1 bit of either a PAW or a PSW. Since the C1 bit of a PAW/PSW is always sent by the TDM controller 10 to the interface during the dedicated PAW/PSW slot in the first half of the TDM frame, it is available at the key-set interface 18 for loading into the second slot of the key-set frame. The third through sixth slots of the key-set frame are dedicated for the four bits of digital audio data of first digital audio channel for the receiver in the handset. The seventh slot is dedicated for the second frame bit, which is always a $\phi$ bit. The eighth slot is dedicated for the signalling bit, which is the C2 bit of either a PAW or a PSW. Since the C2 bit of a PAW/PSW is always sent by the TDM controller 10 to the interface during the dedicated PAW/PSW slot in the second half of the TDM frame, it is available at the key-set interface 18 for loading into the seventh slot of the key-set frame. The ninth through twelfth slots of the key-set frame are dedicated for the four bits of digital audio data of the second digital audio channel for the speaker in the body of the key-set telephone 20. It is now apparent that the key-set frame format allows the creation of the two digital audio channels and the digital control channel between the key-set interface 18 and the key-set telephone 20 using the first two wires of the four-wire cable.

It should be noted that the key-set frame is sent continuously by the key-set interface 18, even when the handset is ON HOOK and the second audio channel to the speaker is not in use. This continuous operation of the key-set frame is required for two purposes. First, the key-set interface needs the two frame bits of each key-set frame to reconstruct the 60 KHz frame clock at proper synchronization. It shold be realized that the length of the four-wire cable introduces appreciable signal delay at the frame rate frequency of the key-set frame. The key-set frame allows use of a four-wire cable up to 2200 feet without the need for key-set frame synchronization recalibration because the two frame bits in each key-set frame are used by the key-set telephone 20 to automatically synchronize each key-set frame. The second purpose of sending the key-set frame continuously is to allow the transmission of control PAW or PSW from the TDM controller 10 to the key-set telephone 20 without the need for additional signalling to start the key-set frame each time control signalling is required. It should be noted that since the first frame bit is always a 1 bit, and the second frame bit is always a $\phi$ bit, proper detection of the beginning of the key-set frame is possible at the key-set telephone 20.

As stated earlier, the second two wires of the four-wire cable are used to create two digital audio channels and a digital control channel between the key-set telephone 20 and the key-set interface 18. The first of the two digital audio channels is used to provide the necessary digital audio data for the audio signal going from the microphone in the handset to the key-set interface 18. The second of the two digital audio channels is used to provide the necessary digital audio data from the microphone in the body of the key-set telephone 20 to the key-set interface 18. The digital control channel is used to send the two possible bits of PRW present per TDM frame from the key-set telephone 20 to the TDM controller 10.

FIG. 16A shows the same format of the serial digital data stream that is continuously sent by the key-set telephone 20 to the key-set interface 18. The arrangement of this key-set frame is analogous to that of the key-set frame used between the key-set interface 18 and the key-set telephone 20. Specifically, the frame of the serial digital data stream, called the key-set frame, is 60 KHz, which makes it the same length as the TDM frame of the TDM controller 10. Moreover, the beginning of the key-set frame received at the key-set interface 18 is determined using the two frame bits, discussed above. The key-set frame is divided into twelve equal slots. Each slot is dedicated for a particular function. The first slot is dedicated for the first frame bit, which is always a 1 bit. The first frame bit is used to determine the beginning of a received key-set frame at the key-set interface 18. The second slot is dedicated for the flag bit, which is the C1 bit of a PRW. The third through sixth slots of the key-set frame are dedicated for the four bits of digital audio data of the first digital channel from the microphone of the handset. The seventh slot is dedicated for the second frame bit, which is always a $\phi$ bit. The eighth slot is dedicated for the signalling bit, which is the C2 bit of a PRW. The ninth through twelfth slots of the key-set frame are dedicated for the four bits of digital audio data of the second digital audio channel from the microphone in the body of the key-set telephone 20. It is now apparent that the key-set frame format allows the creation of the two digital audio channels and the one digital control channel between the key-set telephone 20 and the key-set interface 18 using the second two wires of the four-wire cable.

It should be noted that the key-set frame is sent continuously by the key-set telephone 20, even when the handset is ON HOOK and the second audio channel from the microphone is not in use. This continuous operation of the key-set frame is required for PRW signalling in response to PSW signalling from the TDM controller 10 via the key-set interface 18.

COMMUNICATION BETWEEN THE CPU 12 AND THE TDM CONTROLLER 10

Communication between the CPU 12 and the TDM controller 10 is asynchronous with the TDM frame. The CPU 12, under control of a stored program, directs the TDM controller 10 to perform all the required system functions in a serial basis, and responds to changes in system demand for constantly updating the TDM controller 10 instructions for serial control signalling and for required exchange of digital audio data between interfaces or devices connected with interfaces.

The CPU 12 furnishes the TDM controller 10 the TX ADDRESS and RX ADDRESS for each active slot in the TDM frame. These ADDRESSes allow the TDM controller 10 to correctly address interfaces so that they can be responsive to an exchange of parallel digital audio data or to a single control bit (PAW, PRW, PSW), depending on the particular slot in the TDM cycle when the ADDRESS is sent to the interface. When there is no change taking place in exchange of this information, the TDM controller 10 is running the exchange of the digital control data and the digital audio data by using TX ADDRESSes and RX ADDRESSes it has received from the CPU 12 and has stored in its own memories (i.e., the TX ADDRESS memory and the RX ADDRESS memory, respectively).

At intervals unrelated to the TDM frame, the TDM controller 10 sends the CPU 12 an INTERRUPT TICK 1. This can occur at any time, and since the CPU 12 has no control over when it is sent, it is called a non-maskable interrupt. When the CPU 12 receives the INTERRUPT TICK 1, it must immediately stop the processing that it is currrently engaged in, store this unfinished processing in memory, and begin work on what is known as the INTERRUPT CYCLE. The INTERRUPT CYCLE is only used for changing TX ADDRESSes or RX ADDRESSes used in control signalling: PAW, PSW or PRW. Specifically, the INTERRUPT CYCLE allows the CPU 12 to send the TDM controller 10 either the RX ADDRESS required by the TDM controller 10 to send out serially a PAW, or the TX ADDRESS required by the TDM controller 10 to send out serially a PSW and to receive a PRW in response thereto. In other words, the INTERRUPT CYCLE is the means by which the CPU 12 does all required control signalling (i.e., LED lighting, bell ringing, etc.).

From the time the CPU 12 receives the INTERRUPT TICK 1, it takes several TDM frames of time for the CPU 12 to send the TDM controller 10 the necessary TX ADDRESS or RX ADDRESS. Once the ADDRESS(es) is (are) received, the TDM controller 10 must correctly load them into its respective RX ADDRESS and/or TX ADDRESS memory. It should be remembered, however, that the TDM controller 10 is operating in real time and is controlling the flow of digital control signals and digital audio data signals in the system. Thus, the TDM controller 10 cannot stop immediately what it is controlling so as to load the new ADDRESS into proper position in its memory. Instead, the TDM controller 10 must wait until the time of one of two dedicated slots in the TDM frame occurs. The name of the two dedicated slots for ADDRESS change in the TDM controller 10 is the READ/WRITE (R/W) slots (see FIG. 2). It is only when one of the R/W slots appears that the TDM controller 10 can load the new ADDRESS(es) from the CPU 12 into the correct position in its RX ADDRESS or TX ADDRESS memory. While TX ADDRESS or RX ADDRESS changes for reassignment of an audio slot does not take place during an INTERRUPT CYCLE, the new TX ADDRESS or RX ADDRESS can only be written into the TX ADDRESS or RX ADDRESS memory during the time of one of the R/W slots.

Figure 7:
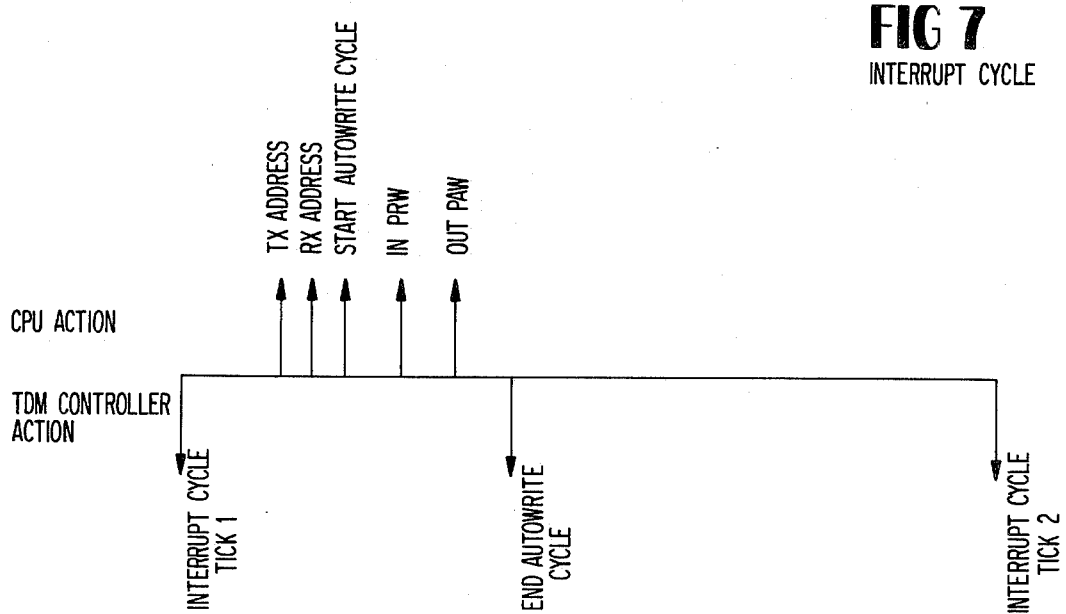
FIG. 7 illustrates the INTERRUPT CYCLE.

Referring now to FIG. 7, a single INTERRUPT CYCLE is shown. As stated earlier, the TDM controller 10 can at any time start an INTERRUPT CYCLE by sending an INTERRUPT TICK 1 to CPU 12. This INTERRUPT TICK 1 directs the CPU 12 to stop immediately the processing it is currently doing, to store this processing in memory, and to begin the processing that results in its sending a new TX ADDRESS or RX ADDRESS, or both, to the TDM controller 10. When these ADDRESSes have been sent to the TDM controller 10, the CPU 12 directs the TDM controller 10 to start the AUTOWRITE CYCLE, i.e., AUTOWRITE CYCLE is process whereby the TDM controller 10 waits for R/W slots in the TDM frame to appear for the times when it can write the new ADDRESSes into the positions in the appropriate memories dedicated for control signalling. When the new ADDRESSes have been written in, the TDM controller 10 creates the END AUTOWRITE CYCLE tick. At this point, approximately nine TDM frames of time have lapsed since the beginning of the INTERRUPT CYCLE. The TDM controller 10 now does the control signalling task before the completion of the INTERRUPT CYCLE. Specifically, the TDM controller 10 must generate the control PSW or PAW (with help from the CPU 12 on the C2 bits of the PAW) and must output two bits of control signal each TDM frame for eight successive TDM frames, as described above in detail. If a PSW has been sent, the TDM controller 10 must be ready to receive two bits of a possible PRW in return in response to the sent PSW. Severl TDM frames of time are left at the end of the INTERRUPT CYCLE to leave an ample time buffer for delay in reception of a return PRW caused by cable delay coming and going to the interrogated device connected to the interrogated interface. When this designated time has lapsed, the INTERRUPT CYCLE has been completed and the TDM controller 10 can immediately initiate another INTERRUPT CYCLE if needed. The total time for an INTERRUPT CYCLE is approximately 30 TDM frames.

The TDM controller 10 can only be doing one INTERRUPT CYCLE at a time; INTERRUPT CYCLES can never overlap in time. INTERRUPT CYCLES are being done often by the TDM controller 10 in order to keep on top of all of the required real time signalling (e.g., LED flashing, bell ringing, etc.). It should be clearly remembered, however, that the INTERRUPT CYCLES in no way interfer with the normal real time operation of the system.

The CPU 12, pursuant to its stored program, is required to poll serially, using the PSW control signals, the INTERRUPT CYCLE and the TDM controller 10, all of the interfaces and devices connected for operation in the system. This serial polling allows the CPU 12 to determine what changes are required in the system due to changes in system demand since the last polling. This serial polling, called the POLLING CYCLE, requires a maximum of, for example, 64 milliseconds. Since it is humanly impossible to activate two pad keys in succession at a key-set telephone 20 in less than 75 milliseconds, the 64 millisecond polling rate is fast enough to accommodate all requests in the system.

The CPU 12, pursuant to its stored program, is required to assign serially, using the PAW control signals, the INTERRUPT CYCLE and the TDM controller 10, all of the interfaces and devices connected for operation in the system. This serial assignment allows the CPU 12 to make all of the assignments in the system, of which there are many. This serial assigning, called the ASSIGNMENT CYCLE, requires a maximum of, for example, 250 milliseconds.

TDM CONTROLLER

Figure 12:
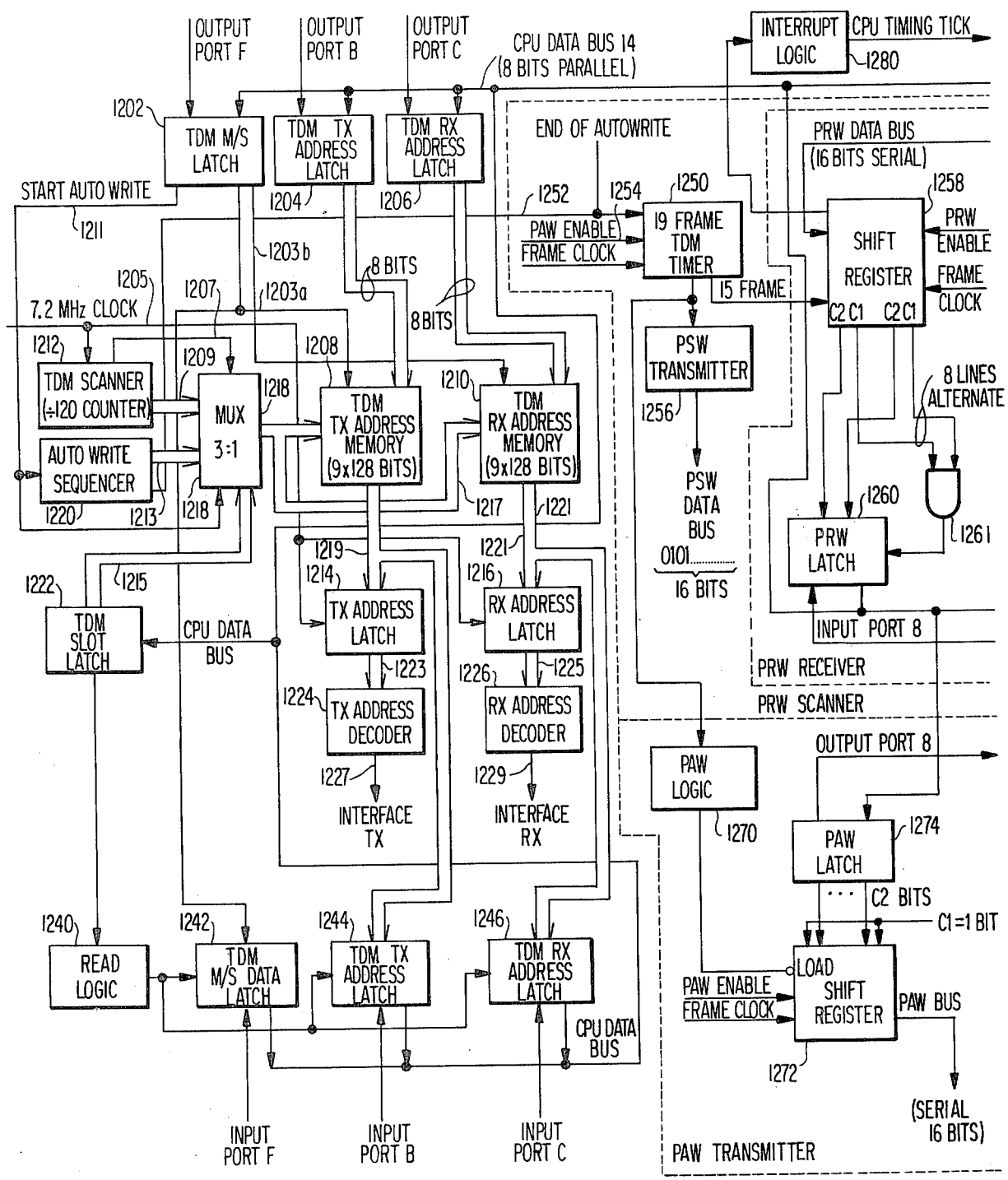
FIG. 12 is a block diagram of the TDM controller 10.

The TDM controller 10, as shown in FIG. 12, controls the digital control signalling (i.e., transmission of PAW and PSW, and reception of PRW) and digital audio data exchange occurring in each TDM cycle, as shown in FIG. 2A, under the asynchronous control of the CPU 12. Specifically, the TDM controller 10 specifies which appropriately addressed interface (or device connected to an interface) is to transmit digital audio data onto the TDM data bus during each audio slot of each TDM frame, and which appropriately addressed interface is to receive the transmitted digital audio data from the TDM data bus (see FIG. 3 and accompanying text for a discussion of the address scheme used between the TDM controller 10 and the interfaces). Moreover, TDM controller 10 serially scans, by transmitting PSW, each interface during the dedicated PAW/PSW signalling slots in each TDM frame, and receives signalling requests (PRW) from the scanned interface during corresponding PRW dedicated slots in each TDM frame. TDM controller 10 sends this signalling request information (PRW) to CPU 12 which, in turn, provides assignment information to controller 10 for performing assignment functions (PAW) to a specified interface during dedicated slots (PAW/PSW) of each TDM frame. Thus, all digital controls signalling in the system is done in real time, which means that all functions, whether they are LED flashing, bell ringing, activation of a CO line for an outgoing call, etc., are controlled by CPU 12 via TDM controller 10.

Figure 2:
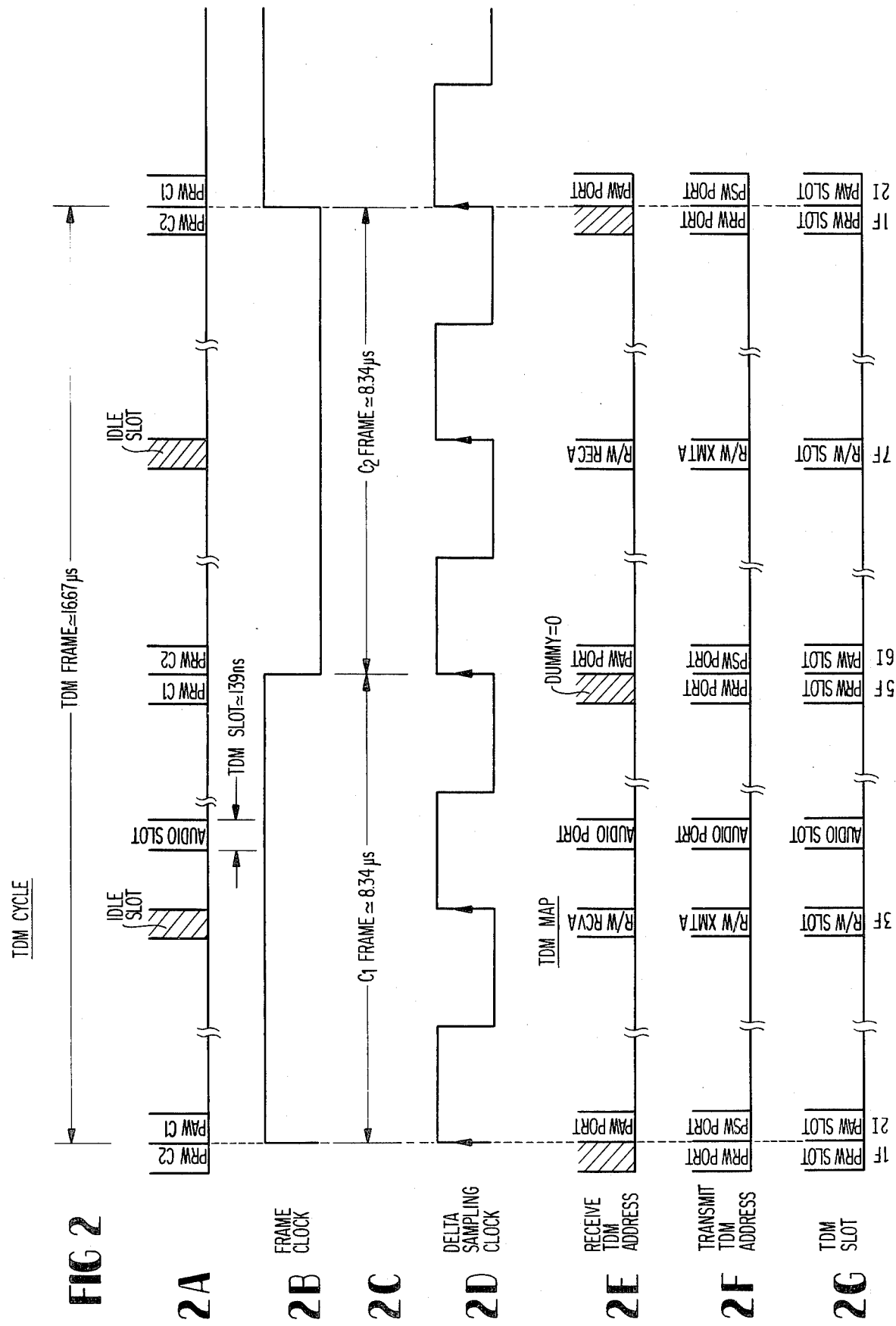
FIGS. 2A–2G illustrate the TDM frame for the system shown in FIG. 1.
Figure 3:
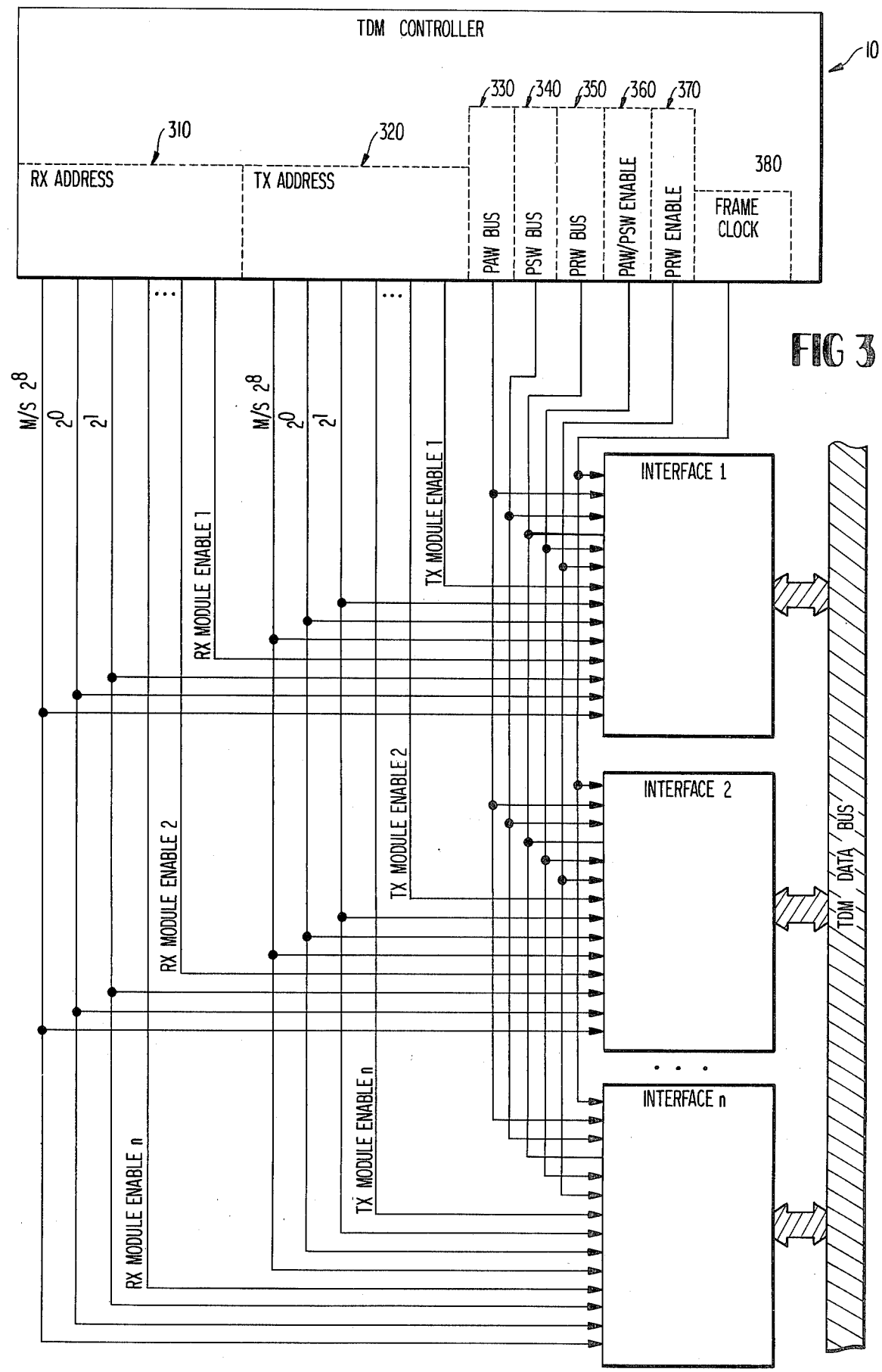
FIG. 3 is a general block diagram showing the connections between the TDM controller 10 and the interfaces, and showing the connections between the interfaces and the TDM DATA bus.

Referring to FIG. 2, the slot assignment of the 120 slots in each TDM frame is shown. As stated earlier, slots 1 and 61 are assigned for transmission from the TDM controller 10 to a specific interface, either a port assignment word (PAW) or a port scanning word (PSW). Slots 30 and 90 are dedicated slots for the Read/Write (R/W) function. This is the time during which the CPU and TDM controller exchange address information from the TDM controller memories. Slots 60 and 120 are dedicated for reception of a port request word (PRW) from a specified interface to the TDM controller 10. Two additional slots are dedicated for the broadcast function, discussed in the explanation of the key-set interface 18. The remaining 112 slots in each TDM frame are for exchange of digital audio data, and are assigned by the CPU 12 via the TDM controller 10 on a demand basis.

Referring to FIG. 12, a block diagram of TDM controller 10 is shown. A CPU data bus 14 connects TDM controller 10 with CPU 12. Bus 14 is connected to a TDM M/S latch 1202, to a TDM TX ADDRESS latch 1204, and to a TDM RX ADDRESS latch 1206. Latch 1202 is also connected to output port F of CPU 12 via I/O PORT ENABLE 650. Similarly, latch 1204 is connected to output port B of CPU 12 via line 650, and latch 1206 is connected to output port C of CPU 12 via line 650. A first output of latch 1202 is connected via a first conductor of a line 1203a to a TDM TX ADDRESS memory 1208, and a second output of latch 1202 is connected via a second conductor of line 1203b to a TDM RX ADDRESS memory 1210. The output of latch 1204 is connected via a parallel 8-bit line to TDM TX ADDRESS memory 1208. The output of latch 1206 is connected via a parallel 8-bit line to a TDM RX ADDRESS memory 1210. TDM TX ADDRESS latch 1204 is for storage of eight bits of a TX ADDRESS from CPU 12 during the INTERRUPT CYCLE, and TDM RX ADDRESS latch 1206 is for storage of eight bits of RX ADDRESS from CPU 12. TDM M/S LATCH 1202 is for storage of the extra 1 bit of information required in an RX ADDRESS or TX ADDRESS to specific audio channel 1 or audio channel 2 of a keyset telephone 20.

The 7.2 MHz clock from oscillator 660 of CPU 12 (see FIG. 6) is provided via a line 1205 to a TDM scanner 1212, to a TX address latch 1214, and to a RX address latch 1216. An output of scanner 1212 is provided via a line 1207 to a 3:1 multiplexer 1218, and a second output is provided via a line 1209 to multiplexer 1218. TDM scanner 1212 is a divide-by-120 counter. The output on line 1205 is normally a 1 bit, except during an R/W slot when it becomes a 1 bit if a new address is to be written into MEMORY 1208 or MEMORY 1210 from LATCH 1204 or LATCH 1206, respectively. The output on line 1209 is a counter output used to specify the positions in the circular memories 1208 and 1210.

An output from latch 1202 is provided via a line 1211 to an AUTOWRITE sequencer 1220. This output indicates the start of the AUTOWRITE CYCLE, discussed above, used to change ADDRESSes required for PAW, PSW or PRW control signalling. A first output from auto write sequencer 1220, used for writing addresses of interfaces to receive control signals into memories 1208 and 1210, is provided to multiplexer 1218 via a line 1213. Latch 1202, the START AUTOWRITE CYCLE line, is also connected directly to multiplexer 1218 via line 1211.

CPU data bus 14 is connected to a TDM slot latch 1222, whose output is connected via a line 1215 to multiplexer 1218. Latch 1222 is used to store the position in memories 1208 and 1210 where a TX ADDRESS or RX ADDRESS, respectively, for an audio slot is to be written. The output from multiplexer 1218 is provided to memory 1208 and to memory 1210 via a line 1217. Multiplexer 1218 is used to control the correct outputting of all stored addresses, as well as controlling the change in stored addresses during R/W slots in the TDM frame.

The output from TX ADDRESS memory 1208 is provided to TX ADDRESS latch 1214 via a line 1219, and the output of RX ADDRESS memory 1210 is provided to RX ADDRESS latch 1216 via a line 1221. The output of latch 1214 is provided to a TX ADDRESS decoder 1224 via a line 1223, and the output of latch 1216 is provided to a TX ADDRESS decoder 1226 via a line 1225. The output of decoder 1224 is provided to a TX interface bus 1227, and the output of decoder 1226 is provided to a RX interface bus 1229. Buses 1227 and 1229 correspond to the TX ADDRESS buses and RX ADDRESS buses, respectively, shown in FIG. 3 and discussed in the accompanying text.

The TDM TX address memory 1208 is a recirculating memory having positions which reappear every 120 sequences. These 120 positions correspond to the 120 slots in each TDM frame. Similarly, TDM RX address memory 1210 is a recirculating memory having positions which reappear every 120 sequences. These positions correspond to the 120 slots of each TDM frame. Moreover, the positions in memories 1208 and 1210 are synchronous with each other and with the 120 slots in the TDM frame.

For purposes of explanation, assume that none of the TX ADDRESSes or RX ADDRESSes corresponding to the 112 audio slots is to be changed in memory 1208 or memory 1210, respectively, during a TDM cycle. The addresses stored in each of the 112 positions in TX ADDRESS memory 1208 and the addresses stored in each of the 112 positions in RX ADDRESS memory 1210 are outputted in synchronism with the TDM audio slots under control of scanner 1212 onto TX interface line 1227 and RX interface line 1229, respectively, during the TDM frame. Since none of these addresses in memories 1208 and 1210 is to be changed, a zero bit is outputted by the TDM scanner 1212 on line 1207 to multiplexer 1218 during each of the two R/W slots of the TDM frame. It is apparent, therefore, that memories 1208 and 1210 control the interfaces transmitting and receiving, respectively, digital audio data on the TDM bus during each of the audio slots in the TDM frame.

Now assume that the CPU 12 decides that a time slot should be reassigned, e.g., the device previously using the slot has terminated a call. The CPU 12 sends the address of the device to be assigned that slot via bus 14 to latch 1204, and this information is loaded therein by the CPU 12 control of output port B. Next, a higher order bit, indicating which memory (1208 or 1210) is to be written into, is sent to latch 1202 and it is stored under CPU control by output port F. The CPU 12 also provides the position of the slot in memory 1208 and in memory 1210 in which the new address is to be written to latch 1222 via bus 14. When the next R/W slot in the TDM cycle appears, scanner 1212 outputs a one bit to multiplexer 1218 via control line 1207, and latch 1222 provides the correct position in memory 1208 and in memory 1210 of the audio slot to be readdressed. Latch 1202 provides separate control lines to memories 1208 and 1210. Thus, in the assumed case, only memory 1208 receives a new address from latch 1204 since only it receives a 1 bit from latch 1202 on line 1203a. Memory 1208 stores the new address in the proper position (corresponding to the reassigned audio slot in the TDM frame) in its memory. Memory 1210 does not change the address in its corresponding position since it did not receive a 1 bit from latch 1202 during the R/W slot time. Moreover, the exchange of digital audio data is never interrupted since address changes occur only during the dedicated R/W slots of the TDM frame.

Maintenance processor 60 (see FIG. 10 and the discussion above) is provided with the capability of determining whether correct address changes in the TDM controller 10 are taking place. Specifically, TDM controller 10, as shown in FIG. 12, has a read logic 1240, whose input is connected to TDM slot latch 1222. A specific most significant bit sent to latch 1222 from CPU 12 enables the maintenance processor 60 diagnostic function. The output of read logic 1240 is provided to a TDM M/S data latch 1242, to a TDM TX address latch 1244 and to a TDM RX address latch 1246. Latch 1242 also has an input connected to line 1203a of latch 1202. Input port F of CPU 12 via bus 650 is connected to latch 1242. The output of memory 1208 is provided to latch 1244, and the output of memory 1210 is provided to latch 1246. The input port B of CPU 12 via bus 650 is provided to latch 1244, and the input port C of CPU 12 via bus 650 is provided to latch 1246. CPU data bus 14 is connected to latches 1242, 1244 and 1246. As stated, when the most significant bit to latch 1222 is a specific state, for example, a 1 bit, this causes the information from latch 1202 and memories 1208 and 1210 to be provided on CPU data bus 14. This loop-back of address information that has been sent by CPU 12 to TDM controller 10, and stored therein, allows the maintenance processor 60 to determine whether correct addressing in the TDM controller 10 is taking place.

As stated earlier, the system uses three words for serial digital signalling: the PSW, the PAW and the PRW. Each of these is 16 bits long, as shown in FIG. 13, and has bits designated C1 and C2 which appear in alternating fashion. The PSW has the fixed 01010101010101 sequence shown in FIG. 13. The PAW always has 1 bits in the C1 positions, and has the assignment information being sent by the TDM controller 10 to a specified interface in the C2 positions. Similarly, the C1 bits in the PRW are 1 bits, and the request information from the addressed interface is contained in the C2 positions. As was stated earlier, the information in the C2 positions in the PAW and the PRW allows CPU 12 via TDM controller 10 to supervise and control the digital control signalling and the digital audio data exchange in the system.

The INTERRUPT CYCLE, discussed above, is used to send a PAW or PSW to a correctly addressed interface or device, and is used to receive a PRW from the addressed interface or device in response to a PSW from the TDM controller 10. When the INTERRUPT CYCLE was explained earlier it was stated that the INTERRUPT CYCLE was started when an INTERRUPT TICK 1 was sent by TDM controller 10 to CPU 12. This INTERRUPT TICK 1 causes CPU 12 to stop all background processing, to store that processing in memory and to perform the required interrupt functions. CPU 12 first provides the TX ADDRESS of the interface which will receive either the PAW or PSW. This TX ADDRESS from CPU 12 is stored in latch 1204. The CPU 12 next provides the RX ADDRESS of the interface to receive either the PAW or PSW. This RX ADDRESS is stored in latch 1206. When the TX ADDRESS or RX ADDRESS is stored in its appropriate latch 1204 or 1206, respectively, the CPU 12 provides a start AUTOWRITE CYCLE signal to TDM controller 10. The time between TICK 1 and the start of the AUTOWRITE CYCLE is $t_1$, which is typically 100 microseconds, as shown in FIG. 7.

In the AUTOWRITE CYCLE, TDM controller 10 writes the TX ADDRESS in latch 1204 into the dedicated PAW/PSW positions in memory 1208. Simultaneously, the RX ADDRESS is written into the dedicated PAW/PSW positions in memory 1210. Next, the TX ADDRESS of the interface or device which is to receive a PSW is written into the dedicated PRW positions in memory 1208. The RX positions dedicated for PRW signalling in memory 1210 are always provided with a non-existent address, since the CPU 12 is to receive the PRW from the designated interface.

It should be recalled that the PSW and the PAW are mutually exclusive for any given device. In other words, an INTERRUPT CYCLE never results in the scanning and assigning of the same port. In order to create this mutual exclusivity, CPU 12 software checks that the assignment and scanning is not done for the same device.

Once the TX ADDRESS and RX ADDRESS have been loaded into memories 1208 and 1210, the AUTOWRITE CYCLE is completed. Typcially, the AUTOWRITE period is of time $t_2 = 42$ microseconds. When the AUTOWRITE period has been completed, TDM controller 10 starts outputting the appropriate PSW or PAW to the addressed interface serially during the two dedicated PAW/PSW slots in eight successive TDM frame. The eight-frame period required for outputting corresponds to the SCANNING PERIOD $t_3$, which typically takes approximately 133 microseconds, as shown in FIG. 7. An additional eleven frame period is provided in the INTERRUPT CYCLE after the SCANNING PERIOD to allow a safety margin for signal time delays caused by any lines between a device and its interface. The safety margin allows the PRW from the scanned device to be sent to the TDM controller 10 without loss of PRW bits. The entire time required for an INTERRUPT CYCLE is approximately 468 microseconds. Since each INTERRUPT CYCLE can send a PAW, or send and receive a PSW/PRW, it is apparent that when more than one control word is required for a signalling function, the corresponding number of INTERRUPT CYCLES must be provided.

The hardware necessary for TDM controller 10 to output correctly the PAW or PSW and to receive the PRW from an addressed interface is shown in FIG. 12.

A PRW scanner includes a 19-frame TDM timer 1250. To the first input of timer 1250 is applied a END OF AUTOWRITE CYCLE signal from auto write sequencer 1220 via a line 1252. The second input of timer 1250 is connected to the PAW ENABLE line 1254. The third input of timer 1250 is connected to the 60 KHz clock from CPU 12 provided at the TDM controller 10. A first output of timer 1250 is provided to a PSW transmitter 1256, which generates the PSW. Transmitter 1256 generates the bits of the PSW in response to the output signal from timer 1250. The output of PSW transmitter 1256 is connected to the PSW data bus, as is also shown in FIG. 3.

A shift register 1258 is provided to receive and store PRW bits serially from the PRW data bus each time a PRW ENABLE signal and the frame clock changes state. Shift register 1258, when so enable by PRW ENABLE and the FRAME BIT, will continue to receive and store any PRW bits on the PRW DATA BUS until timer 1250 provides a 15 FRAME DISABLE signal. The 15 FRAME DISABLE signal from timer 1250 occurs 15 TDM time frames after the END OF AUTOWRITE CYCLE. Thus, timer 1250 provides a 15 frame window in each INTERRUPT CYCLE through which PRW data on the PRW DATA bus can be received and stored in shift register 1258.

The C2 bits of the PRW in shift register 1258 are stored for parallel loading into a PRW latch 1260 when each of the eight C1 bits of the PRW (which, by definition, must each be a 1 bit), applied by a separate line to one of eight inputs of an AND gate 1261, drives the AND gate 1261 to the high state. Since these are eight C1 bits, which are 1 bits, in a received PRW, each of the eight inputs of AND gate 1261 in in the high state, which causes AND gate 1261 to provide an ENABLE pulse to PRW LATCH 1260. This ENABLE pulse causes PRW LATCH 1260 to accept and store the eight C2 PRW bits. When CPU 12 from its INPUT PORT 8 provides an ENABLE signal on INPUT PORT 8 line going to PRW latch 1260, this signal causes PRW latch 1260 to output the eight C2 bits of the PRW onto CPU data bus 14 for transmission of these eight C2 bits to the CPU 12 for processing.

At the end of the INTERRUPT CYCLE, shift register 1258 outputs a control signal to an INTERRUPT LOGIC 1280, which in turn causes LOGIC 1280 to generate the INTERRUPT CYCLE TICK 2, and to send TICK 2 to the CPU 12. The receipt of TICK 2 by CPU 12 marks the end of the INTERRUPT CYCLE.

TDM controller 10 also has a PAW TRANSMITTER for generating the PAW used to do all assignment functions in the system. As has been stated earlier, the C1 bits of the 16-bit serial PAW are always 1 bits, whereas the C2 bits contain the assignment information, as shown in FIG. 13. The PAW is sent by the TDM controller 10 serially two bits per TDM frame during the dedicated PAW/PSW slots to an interface, or device connected to an interface, that has been properly addressed by the RX ADDRESS memory 1210 via latch 1216, decoder 1226 and the RX ADDRESS lines shown in FIG. 12. The PAW transmitter, as shown in FIG. 12, includes an 8-bit PAW latch 1274, whose inputs are connected to the CPU 12 via the DATA BUS 14. CPU 12 sends the eight C2 bits of the PAW on bus 14 and an OUTPUT PORT 8 enable signal on OUTPUT PORT 8 line, to PAW latch 1274, thus enabling it to store the eight C2 bits of the PAW. PAW LATCH 1274 keeps these eight stored C2 bits for parallel loading into a 16-bit parallel-to-serial shift register 1272. The PAW TRANSMITTER also includes a PAW logic 1270, whose input is connected to the first output of 19 FRAME TDM TIMER 1250. At the end of the AUTOWRITE period of the INTERRUPT CYCLE, sequencer 1220 provides an END OF AUTOWRITE signal via line 1252 to TIMER 1250. If CPU 12 wants a PAW to be sent out during this INTERRUPT CYCLE, it provides a PAW/PRW ENABLE signal, which causes (along with the FRAME clock) TIMER 1250 to provide an enable pulse to PAW LOGIC 1270. LOGIC 1270, in turn, produces a signal in response to the enable pulse from TIMER 1250 which is applied to the load enable of shift register 1272, thus causing the eight bits of C2 data stored in latch 1274 to be transferred to and stored in shift register 1272. The eight bits of C2 PRW are applied to shift register 1272 in an arrangement so that they assume the correct C2 positions in the PAW being generated by shift register 1272. The additional eight inputs of shift register 1272, connected to the stages in register 1272 which are in the C1 positions of the PAW, have a 1 bit applied to them, thus creating the 1 bits of the PAW. The 16-bit PAW, now generated in register 1272, is outputted serially onto the PAW bus (shown in FIG. 3) two bits per TDM frame for eight successive frames by the clocking action of the PAW/PSW ENABLE signal and the FRAME clock signal. In this fashion, TDM controller 10 generates and outputs the PAW during an INTERRUPT CYCLE.

It should be noted that the PAW/PSW ENABLE signal from CPU 12 in actuality is a pulse, generated to go to the high state during the time periods corresponding to the dedicated PAW/PSW slots of the TDM frame. The generated PAW/PSW ENABLE is applied to the PAW/PSW ENABLE BUS shown in FIG. 3.

It should also be noted that the PRW ENABLE signal from CPU 12 in actuality is a pulse, generated to go to the high state during the time periods corresponding to the dedicated PRW slots of the TDM frame. The generated PRW ENABLE is applied to the PRW ENABLE BUS shown in FIG. 3.

The process for writing the TX ADDRESS and RX ADDRESS in memories 1208 and 1210 is as follows. The INTERRUPT CYCLE TICK 1 is provided to CPU 12 by INTERRUPT logic 1280, whose input is connected to shift register 1258. The CPU 12 provides the TX ADDRESS via data bus 14 to latch 1204, where it is stored for loading into the correct position in the recirculating memory of TX ADDRESS MEMORY 1208. CPU 12 next outputs the RX ADDRESS via data bus 14 to latch 1206, where it is stored for loading into the correct position in the recirculating memory of RX ADDRESS MEMORY 1210. CPU 12 then begins the AUTOWRITE CYCLE. The TX ADDRESS from latch 1204 is stored in the two dedicated positions PRW in memory 1208. A non-existent RX ADDRESS is stored in the two dedicated PRW positions in memory 1210. This writing into memories 1208 and 1210 can only be done during a R/W slot in the TDM frame. Specifically, when the R/W slot immediately following the start of the auto write cycle occurs, scanner 1212 provides a one bit and auto write sequencer 1220 provides a one bit to multiplexer 1218, whereupon the TX ADDRESS is written into the correct position in memory 1208, and the non-existent address is written into the correct position in memory 1210. This requires a complete TDM cycle in order to fill both of the dedicated PRW positions in memories 1208 and 1210. Next, in the case of a PSW, the TX ADDRESS in latch 1204 is written into the dedicated PSW positions in memory 1208 in the same manner as used with the PRW address writing. In the case of a PAW, the RX ADDRESS in latch 1206 is written into the dedicated PAW positions in memory 1210 in the same manner used with the PRW address writing. It should be noted that the address of the device to be scanned is written into TDM TX ADDRESS memory 1208, while the address of the device to be assigned is written into TDM RX ADDRESS memory 1210. After the AUTOWRITE CYCLE is completed, the procedure described above for PAW/PSW or PRW control signals is performed. Thus, CPU 12 can supervise and control the TDM control signalling using the INTERRUPT CYCLE without affecting the ongoing TDM exchange of digital audio data between interfaces.

KEY-SET INTERFACE (KSI)

Figure 14A:
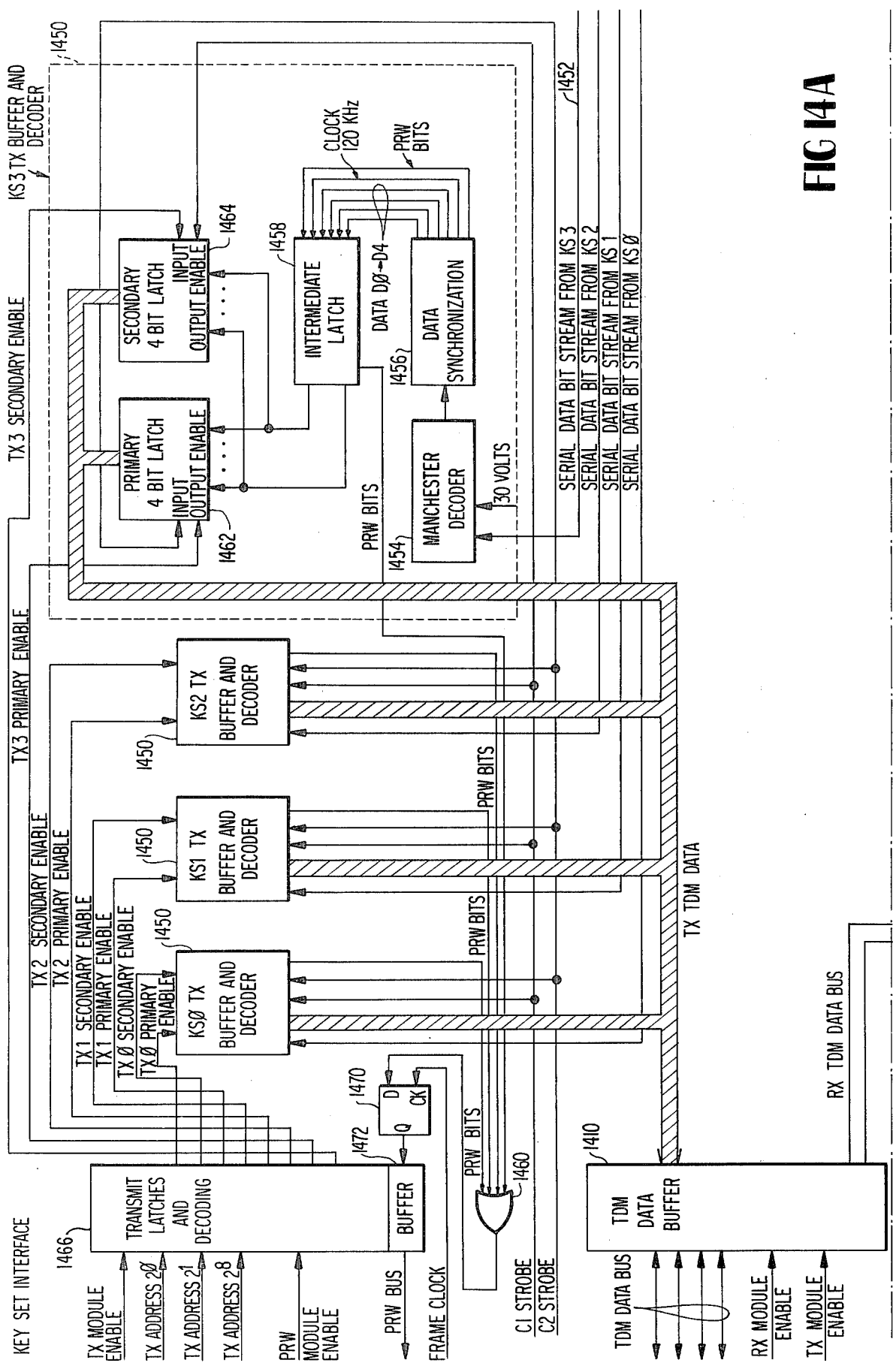
FIG. 14 comprised of 14A and 14B are a block diagram of the KEY-SET INTERFACE 18.

Key-set interface 18, as shown in FIG. 14, connects four key-set telephones 20 with the TDM controller 10 and with the TDM data bus, as shown in FIGS. 1 and 3. The key-set frame has been explained in detail above.

Figure 15:
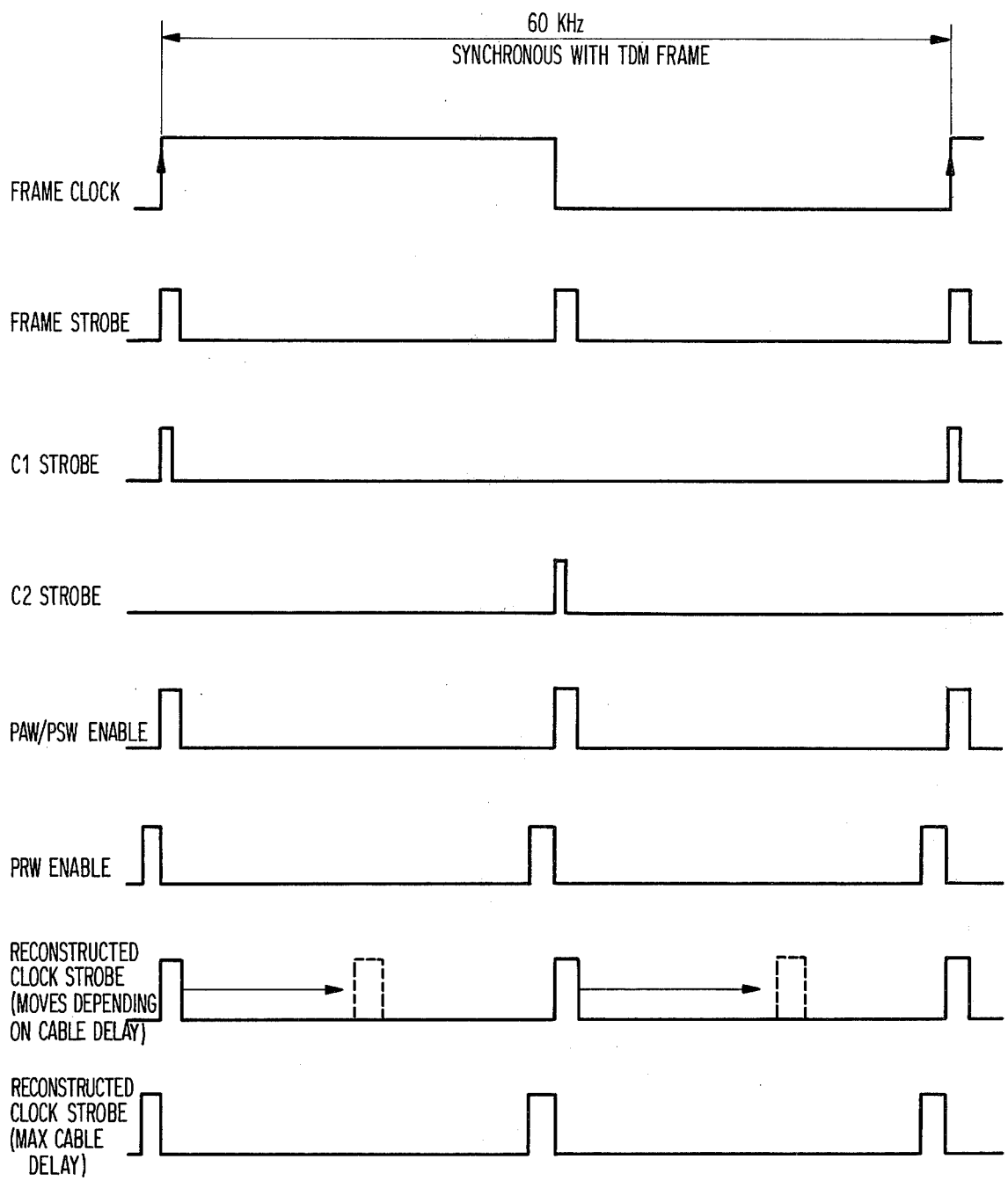
FIG. 15 is a timing diagram of the various timing pulses provided by the TDM controller 10, and also showing the RECONSTRUCTED CLOCK STROBE.

The four key-sets 20 which may be connected with a single key-set interface 18 are designated $KS\phi$ to KS3. A clock generator 1402 is connected to the PAW/PSW ENABLE bus, to the PRW ENABLE bus, to the FRAME CLOCK and to the TDM CLOCK. The waveform of the PAW/PSW ENABLE and the waveform of the PRW ENABLE are shown in FIG. 15. Unit 1402 generates a frame strobe, a C1 strobe and a C2 strobe, as shown in FIG. 15.

A receive latch and decoding unit 1404 is connected to three bits of the RX ADDRESS, which are identified as bits $2^0$, $2^1$ and $2^8$. A separate RX MODULE ENABLE, as described in the text accompanying FIG. 3, is provided to unit 1404 to indicate addressing of this key-set interface 18. The BROADCAST ENABLE and the TDM CLOCK are also provided to unit 1404. Unit 1404 provides an ENABLE PULSE on one of a plurality of ENABLE lines 1406 each time the address for that enable line is received on the RX ADDRESS lines and RX MODULE ENABLE and TDM CLOCK are present. It should be noted that when BROADCAST ENABLE is high, all four key-set secondary latches 1422 are enabled to store data from the internal RX TDM DATA bus. Therefore, the BROADCAST ENABLE allows the system to provide the BROADCAST function, wherein any transmitting interface can provide audio simultaneously on the speaker channel of a plurality of key-set telephones 20.

It should be noted that the PAW/PSW ENABLE must be in a low condition in order for unit 1404 to provide an ENABLE signal. Thus, PAW/PSW ENABLE acts as a disable for unit 1404. The plurality of enable lines 1406 are connected to their respective buffer and encoder units 1408. Moreover, each unit 1408 is connected to the internal RX TDM data bus, which is connected to a TDM data buffer 1410. Buffer 1410 is connected to the external TDM data bus which runs between all of the interfaces in the system. Moreover, buffer 1410 is provided with an RX MODULE ENABLE and a TX MODULE ENABLE. Each buffer 1408 is connected to a separate line 1412 which runs between the unit 1408 and the key-set telephone 20.

A PAW decoder 1414 is connected to the RX ADDRESS BUS $2^0$, RX ADDRESS BUS $2^1$, the RX MODULE ENABLE BUS, the PAW ENABLE BUS and the PAW BUS. The PAW decoder 1414 will pick-off PAW bits from the PAW bus when a proper address is sent to it on these buses.

A PSW decoder 1416 is connected to the TX ADDRESS BUS $2^0$, the TX ADDRESS BUS $2^1$, the TX MODULE ENABLE for this particular interface, the PSW ENABLE BUS and the PSW BUS. Decoder 1416 will pick-off any PSW data sent on the PSW bus when a proper address is sent to it.

The PAW data and the PSW data for each encoder 1408 is combined in an OR 1418 and sent via a separate line to its respective encoder 1408. The serial data stream outputted to each of the four key-set telephones 20 by the corresponding encoder 1408 and wire pair 1412 has the serial frame format shown in FIG. 16A. It should be noted that the period of the key-set frame is identical to that of the TDM frame and that both the TDM frame and the key-set frame are synchronous with each other. The key-set frame is divided into 12 slots of equal length. The first and seventh slots of each key-set frame contain a frame bit. These frame bits are fixed, with the first frame bit being a one bit and the second frame bit being a zero bit. The second slot is for the flag bit C1, and the eighth slot is for the signalling bit C2 of a PAW or PSW. The third through sixth slots are for the four digital audio bits for audio channel 1, and the ninth through twelfth slots are for the four digital audio bits for audio channel 2. It should be noted that each key-set telephone 20 has two audio channels from the key-set interface 18 to the key-set telephone 20. The first audio channel goes to the receiver in the handset, and the second audio channel goes to the speaker of the unit in the body of the key-set telephone 20. Key-set frames from the key-set interface 18 are provided to each of the key-set telephones 20 even when there is no digital signalling or digital audio data being provided to the key-set. (In such a case, the audio data for audio channels 1 and 2 is a stream of alternating ones and zeros, which to a linear delta decoder is a signal above the human audible range.)

Each time unit 1404 receives a correct RX ADDRESS, it provides an enable signal to the appropriate enable line 1406, which causes the corresponding buffer 1408 to extract four parallel digital audio data bits off of the RX TDM data bus. Moreover, each time the PAW decoder 1414 or the PSW decoder 1416 receives a correct address and PAW/PSW ENABLE, respectively, the PAW or PSW bits on the PAW bus or the PSW bus are serially provided to the buffer 1408 designed by the address.

The circuitry of an RX buffer and encoder 1408 is shown for KS3. A 4-bit parallel-to-serial latch 1420 is connected to the RX TDM data bus and is also provided with an RX 3 primary enable line from unit 1404. Similarly, a 4-bit parallel-to-serial latch 1422 is connected to the RX TDM data bus and also to the RX 3 secondary enable line from unit 1404. The output enable of latch 1420 is connected to the frame clock, and the output enable of unit 1422 is connected via an inverter 1424 to the frame clock. Latch 1420 stores the digital data from the RX TDM data bus for audio channel 1 when unit 1404 provides an ENABLE in response to a correct address from TDM controller 10, and latch 1422 stores the digital data from the RX TDM data bus for audio channel 2 when unit 1404 provides an ENABLE in response to a correct address from TDM controller 10.

Figure 16B:
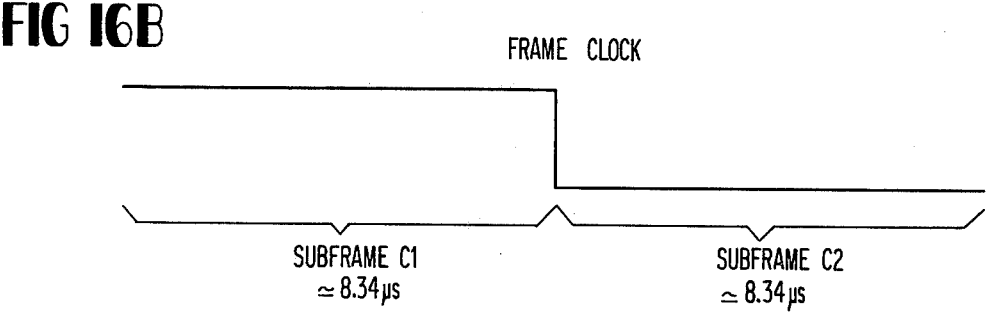
Figure 16C:
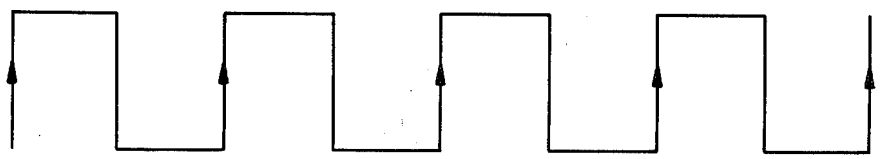

The last four stages of a 6-bit serial register 1426 are connected to latches 1420, 1422 for receiving digital audio data provided from either latch 1420 or 1422. The first stage of latch 1426 is connected to the frame clock so that it is a 1 bit during sub-frame C1 and a $\phi$ bit during sub-frame C2, as shown in FIG. 16B. The second stage of latch 1426 is connected to the control line 3 of OR 1418. OR 1418 provides the flag bits C1 and the signalling bits C2 of either a PAW or a PSW sent by the TDM controller 10 via PAW decoder 1414 or PSW decoder 1416, respectively. The TDM clock and the frame strobe are connected to the latch 1426 for providing output and input enables, respectively.

The serial output of latch 1426 is connected to the first input of an EXCLUSIVE OR 1428 for Manchester encoding of the serial data bit stream. The second input of EXCLUSIVE OR 1428 is connected via an inverter 1430 to the TDM clock. The output of EXCLUSIVE OR 1428, which contains the Manchester encoded serial bit stream in key-set frame format, is connected to the D input of a flipflop 1432. The Q output of flipflop 1432 is connected to the input of a driver unit 1434. The clock input of the flipflop 1432 is connected to the 1.44 MHz clock for removing glitches in the serial data bit stream. The output of driver 1434 is connected to SERIAL DATA line 1412, which is the first pair of the four-wire cable connecting the key-set interface 18 with the key-set telephone 20.

In sub-frame C1 of the key-set frame, the audio data from primary latch 1420 is loaded into the third through sixth position of register 1426, any control bit C1 from OR 1418 is loaded into position 2, and the sync bit in position 1 is provided by the FRAME CLOCK. This data is then outputted at 720 KHz by the gating of the TDM clock. In sub-frame C2, the digital audio data from secondary latch 1422 is loaded into latch 1426, and any control bit C2 from OR 1418 is located into position 2. The zero sync bit is provided by the FRAME CLOCK. The data contained in latch 1426 is then serially outputted at 720 KHz under control of the TDM clock. The data is Manchester encoded by the EXCLUSIVE OR 1428, and the 1.44 MHz signal in flipflop 1432 removes any glitches that may be present in the encoded signal. Thus, buffer 1408 encodes the data from the TDM encoder into the key-set frame format shown in FIG. 16A.

Each key-set telephone 20 also has a second pair 1452 of the four-wire cable which runs between it and its respective TX buffer and decoder unit 1450 in the key-set interface 18. The purpose of buffer and decoder 1450 is to separate the digital audio data from the signalling information so that it can be correctly outputted from the key-set interface 18 under control of the TDM controller 10. In effect, the function of decoder 1450 is the inverse of encoder 1408.

The data from the key-set telephone 20 is in key-set frame format, as shown in FIG. 16A. The data is sent from the key-set telephone 20 via a second pair 1452 of the four-wire cable to a Manchester decoder 1454. A signal delay is introduced by the second wire pair 1452. The output from the Manchester decoder 1454 is applied to a data synchronization unit 1456, which converts the serial data to parallel format. This parallel format data is then fed to an intermediate latch 1458. The PRW bits in the parallel data stream are extracted by intermediate latch 1458 and are sent to an OR 1460. The digital audio data is applied in parallel fashion to the appropriate primary 4-bit latch 1462 or the secondary 4-bit latch 1464, under control of C1 STROBE and C2 STROBE.

A transmit latch and decoder 1466 is connected to the TX ADDRESS, $2^0$, TX ADDRESS $2^1$, TX ADDRESS $2^8$, PRW MODULE ENABLE and TX MODULE ENABLE for the particular key-set interface 18. When the correct ADDRESS is received by unit 1466 on these ADDRESS and ENABLE lines, unit 1466 provides an appropriate enable signal which causes the 4-bit digital audio data contained in either latch 1462 or 1464 to be outputted on the TX TDM DATA bus. Since TX TDM DATA bus is connected to the TDM data buffer 1410, the digital information motion is outputted to the TDM data bus connecting all other interfaces in the system.

The PRW bits contained at OR 1460 are fed to the D inputs of a D flipflop 1470, the Q output of which is connected to a buffer 1472. The clock input of the flipflop 1470 is connected to the FRAME CLOCK. The contents in buffer 1472 are outputted on the PRW bus during time of the PRW dedicated slots in the TDM data frame. The TDM controller 10 can keep track of the beginning of the PRW bus because the C1 bits are always one bits.

It is apparent that the key-set interface 18 allows up to two sets of four bits of digital audio data to be sent to, and two sets to be received from, each key-set telephone 20, and also to allow two PSW or PAW bits to be sent to one key-set telephone, and two PRW bits (in the case of a PSW) to be sent from the key-set telephone back to the TDM controller 10, during each TDM frame.

KEY-SET TELEPHONE (KST)

Figure 17:
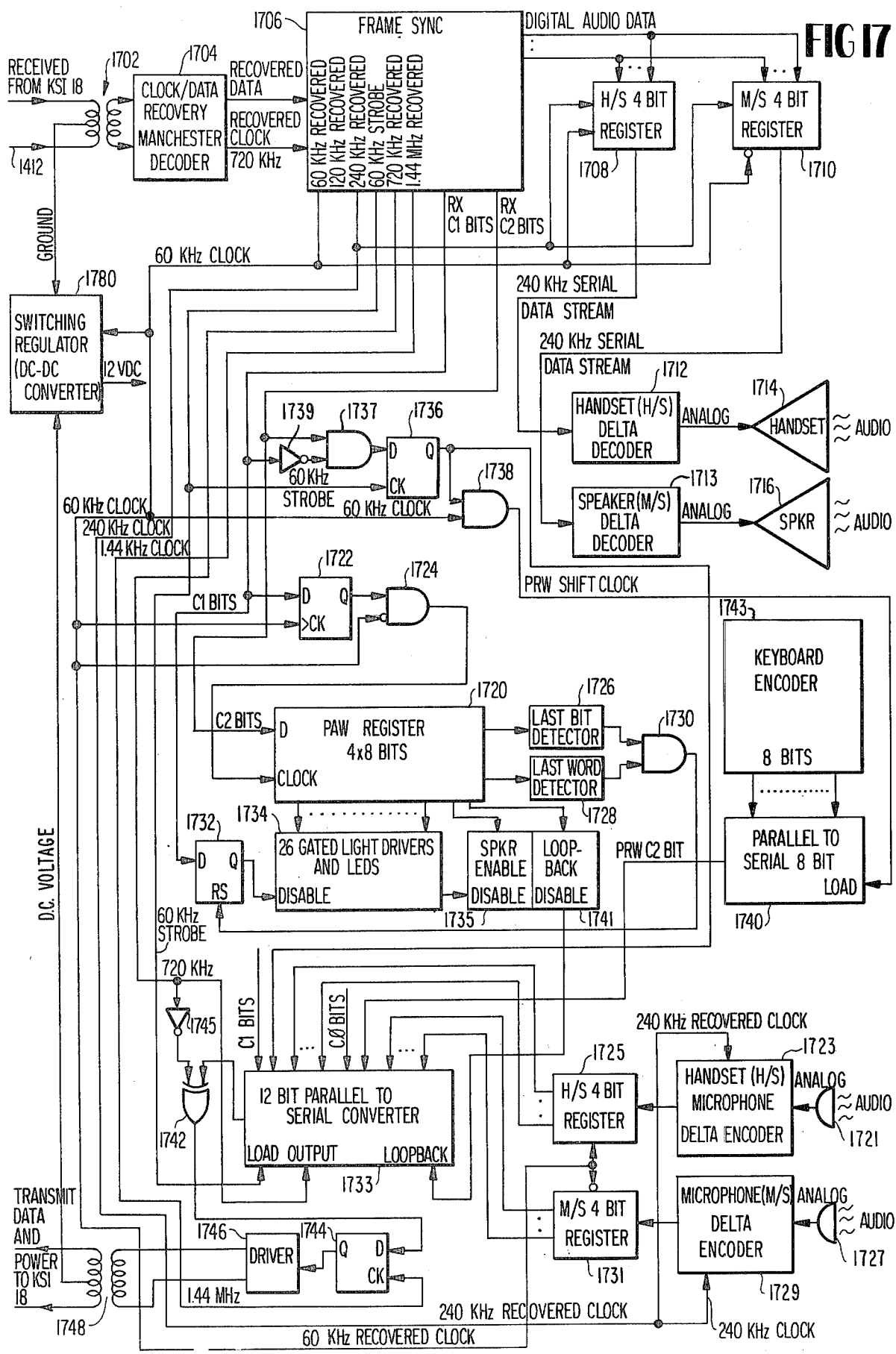
FIG. 17 is a block diagram of the KEY-SET.

A KST 20, as shown in FIG. 17, is connected via the two-pair cable to the KSI 18, as discussed above. The pair 1412 containing the key-set frame from the KSI is applied to the primary windings of a transformer 1702, the secondary winding of which is connected to the input of a CLOCK/DATA RECOVERY and Manchester DECODER 1704. Unit 1704 separates the recovered data and also provides a RECOVERED CLOCK (720 KHz) to a frame sync unit 1706. The recovered clock is displaced with respect to the system clock because of the cable delay introduced by the pairs 1412, this delay being shown in FIG. 15. The maximum delay permitted by the system would occur with a wire pair having the length of 2200 feet, but in practice, a shorter length is required due to attenuation on the DC voltage caused by the line. It should be noted that the DC voltage provided by key-set interface 18 to each key-set telephone 20 is phantomed on the respective four-wire cable between the key-set telephone 20 and the key-set interface 18. Specifically, the center tap of the primary of a transformer 1702 and the center tap of the secondary of a transformer 1748 are used to extract the phantomed DC voltage at the key-set telephone 20. The DC voltage is applied to the four-wire line at the key-set interface in a similar fashion. The serial data stream for each of the two-wire pairs is placed on top of the phantomed DC voltage. The phantomed DC voltage thus appears as an off-set voltage to the digital data.

Frame sync 1706 generates various clock and STROBE signals from the recovered clock. Moreover, unit 1706 extracts the digital audio data from the received serial key-set frame format, as well as the C1 bits and C2 bits. The digital audio data is loaded in 4-bit parallel fashion to either a hand-set (H/S) 4-bit register 1708 or to a mike and speaker (M/S) 4-bit register 1710, depending on whether the data is for audio channel 1 or audio channel 2, respectively. This proper loading of the digital audio data is performed using the RECOVERED FRAME CLOCK. It should be noted that the FRAME CLOCK is inverted to register 1710. The digital audio data stored in register 1708 is read out in serial fashion at 240 KHz to a H/S delta decoder 1712, the analog output of which is applied to a handset H/S 1714. As stated, the present system utilizes linear delta encoding of audio data, with an encoding rate of 240 KHz. Thus, the digital audio data contained in register 1708 is provided to the decoder 1712 such that continuous audio is present at H/S 1714. When no meaningful audio signal is being sent to the key-set for audio channel 1, the KSI18, as stated previously, provides a continuous stream of ones and zeros. This stream of ones and zeros, when decoded, is a signal above the human audible hearing range. The digital audio data in register 1710 is sent in a serial data stream at 240 KHz to a speaker delta decoder 1713, the output of which is connected to the telephone speaker 1716. It should be noted that the RING SIGNAL to the key-set is provided on audio channel 2.

All PAW signalling data to the key-set 20 contained in the key-set frame format must be examined to determine what signalling functions are to be performed. The received C2 bits from unit 1706 are provided to the D input of a PAW register 1720. The key-set 20 requires 32 bits of PAW information for each signalling cycle. In other words, four concurrent INTERRUPT CYCLES are required of the CPU 12 in order for one key-set 20 control signalling sequence to be performed.

The C1 bits are applied to the D input of a flipflop 1722, whose output Q is applied to the first input of an AND 1724. The clock of flipflop 1722 is connected to the RECOVERED FRAME CLOCK, and the second input of the AND 1724 is connected to an inverted version of the FRAME CLOCK. The output of AND 1724 is connected to the output enable of the 32-bit serial-to-parallel register 1720. A last-bit PAW detector 1726 and a last-word PAW detector 1728 are connected to register 1720. Detector 1726 detects the last bit of the PAW 32-bit C2 word. Similarly, detector 1728 detects the last word of the four words contained in register 1720. The output of detector 1726 is fed to the first input of an AND 1730, and the output of detector 1728 is connected to the second input of AND 1730. The output of AND 1730 is connected to the reset input of a D flipflop 1732. The D input of flipflop 1732 is connected to the C1 bits from unit 1706, and the output Q of flipflop 1732 is connected to the DISABLE of a series of 26 GATED LIGHT DRIVERS and corresponding LEDs 1734. The parallel output of PAW register 1720 is connected to LIGHT DRIVER 1734. A SPEAKER ENABLE 1735 is connected to a specific parallel output of register 1720 as is a LOOP-BACK 1741.

The first C1 bit of the PAW causes flipflop 1732 to go high, and thus disable light driver circuit 1734, as well as SPEAKER ENABLE 1735 and LOOP-BACK 1741. When the entire complement of 32 C2 bits have been loaded into the register 1720, detectors 1726 and 1728 cause flipflop 1732 to RESET and the output Q to go low since no C1 bits are present. This causes the LEDs in unit 1734, which are associated with the C2 bits that are in the high state, to be lighted. Moreover, ENABLE 1735 and LOOP-BACK 1741 are activated if their corresponding C2 bits are in the high state. Thus, four bits of PAW data allow the control of 26 LEDs plus a SPEAKER ENABLE and a LOOP-BACK of the key-set. It is apparent that any number of different LEDs lighting functions can be accomplished by applying these PAWs to a key-set in rapid fashion. Since the interrupt cycles of the CPU 12 are very rapid, many different LED lighting patterns are possible. The LED lighting sequences shows the real time signalling function that is present in the system.

A microphone 1721, present in the handset (H/S), is connected to a H/S microphone delta encoder 1723. The audio data from microphone 1721 is linear delta encoded by unit 1723 at the recovered clock rate of 240 KHz. The serial digital audio data from unit 1723 is applied to a 4-bit serial-to-parallel register 1725. Similarly, the audio data from a microphone 1727, in the body of the KST 20, is connected to a microphone delta encoder 1729. The serial digital audio data from unit 1729 is applied to a 4-bit serial-to-parallel register 1731. The OUTPUT ENABLE of register 1725 is connected to the RECOVERED FRAME CLOCK, and the OUTPUT ENABLE of register 1731 is connected to the inverted RECOVERED FRAME CLOCK. The 4-bit parallel digital audio data from register 1725 is applied during sub-frame C1 of the key-set frame to the third through sixth stages of a 12-bit parallel-to-serial converter 1733. The first and seventh stages of converter 1733 are always provided with a 1 bit and a $\phi$ bit, respectively. The ninth through twelfth stages of converter 1733 are connected to the digital audio data output of register 1731.

The C1 bits are applied to the first input of an AND gate 1737 via an inverter 1739. The second input of AND gate 1737 is connected to the C2 bits. The output of AND gate 1737 is connected to the D input of a flipflop 1736, the output Q of which is connected to the first input of an AND gate 1738. The clock input of flipflop 1736 is connected to the 60 KHz STROBE. The second input of AND gate 1738 is connected to the RECOVERED FRAME CLOCK. The output Q of flipflop 1736, which is always a one bit when a PSW bit is received by the key-set, is applied to the second stage of converter 1733. Thus, flipflop 1736 provides the required one bit for the C1 bit of the PRW.

The output from AND gate 1738 is applied to the load of a parallel-to-serial 8-bit converter 1743. An encoder 1742 for the keyboard of the KST provides a parallel 8-bit output signal indicating a user request. The output from converter 1740 is connected to the seventh stage of converter 1733. The output enable of converter 1733 is connected to the first input of an EXCLUSIVE OR 1742, and the second input of EXCLUSIVE OR 1742 is connected via an inverter 1745 to the TDM clock. EXCLUSIVE OR 1742 provides Manchester encoding. The output of EXCLUSIVE OR 1742 is applied to the D input of a flipflop 1744, the output Q of which is applied to a driver 1746. The clock input of flipflop 1744 is connected to the 1.44 MHz clock. The output of driver 1746 is connected to the primary of a transformer 1748, the secondary of which is connected to the second pair of the two-pair cable connecting the KST 20 with the KSI 18.

The output of AND gate 1738 provides a PRW SHIFT CLOCK for loading serially a C2 bit from register 1740 into converter 1733 each time a PSW is detected. In other words, the first C2 bit of a PSW causes a one bit to be loaded into the second stage of converter 1733. The second C1 bit of the received PSW causes the first PRW C2 bit to be located in the second stage of converter 1733. The contents of converter 1733 are outputted serially after Manchester encoding to the second pair of the four-wire cable going to the KSI 18. Moreover, all C2 bits in the PRW are outputted in response to the received PSW. It should be noted that the 1.44 MHz to the clock of flipflop 1744 is just used to remove any glitches present in the serial digital signal.

The center tap of the primary of transformer 1702 is connected to a SWITCHING REGULATOR 1780, and the center tap of the secondary of transformer 1748 is connected to regulator 1780. The recovered frame clock is also provided to regulator 1780. DC voltage is phantomed along the four-wire cable between KSI 18 and the KST 20 and is recovered by regulator 1780, so as to provide 12-volt DC used at the KST 20. Thus, only two pairs are required in the cable between the KSI 18 and the KST 20 for all digital control and digital audio exchange, as well as for power.

SINGLE-LINE TELEPHONE (SLT) INTERFACE

Each SLT interface module 22 allows the connection of four SLTs 24 to the system. A two-wire cable is required between each SLT 24 and the SLT interface 22. It should be noted that analog data is present between each SLT 24 and the SLT interface 22. This is to be distinguished from the digital information exchange between each KST 20 and KSI 18.

Referring to FIG. 18 a clock 1802 is connected to the TDM, clock, FRAME CLOCK, 240 KHz, PAW/PSW ENABLE and PRW ENABLE. Clock 1802 provides a TDM CLOCK, C1 STROBE, C2 STROBE and 120 KHz CLOCK. A DC/DC converter 1804 converts a 30-volt DC potential to a 120-volt DC potential for providing ringing current to the bells in the SLTs 24.

A receiver decoder unit 1806 is connected to the RX ADDRESS BUS $2^0$, RX ADDRESS BUS $2^1$, PAW/PSW ENABLE bus and the RX MODULE ENABLE dedicated for this interface address. It should be noted that the PAW/PSW ENABLE acts as a DISABLE when TDM digital audio data is received. Unit 1806 is connected to four RX BUFFER and PAW LATCH units 1810. Each unit 1810 is connected via a separate RX ENABLE line 1808 to unit 1806. Each unit 1810 is connected to the RX TDM DATA bus 1812, which is connected to the main TDM DATA bus via a TDM DATA buffer 1814. Buffer unit 1814 is connected to the RX MODULE ENABLE and to a TX MOD- ULE ENABLE. In addition, each unit 1810 is connected to a PAW control unit 1815 via a separate PAW SHIFT line 1816 and via a common PAW bus 1818. Unit 1815 receives the PAW SHIFT information from unit 1806, and is also connected to the PAW bus.

The function of each RX buffer and PAW latch 1810 is to receive and process, on command, digital audio data and PAW/PSW control bits from units 1806 and 1815, respectively. Each unit 1810 includes a 4-bit buffer 1820, which is connected to the RX TDM DATA bus 1812 and to the appropriate RX ENABLE line 1808. Buffer 1820 stores four bits of parallel digital audio data from bus 1812 when it receives a proper ENABLE signal from line 1808. Unit 1810 also includes an 8-bit serial latch 1822, whose D input is connected to the PAW bus 1818. The D input of a flipflop 1824 is connected to the appropriate PAW SHIFT line 1816, and the clock input is connected to the C1 STROBE from clock 1802. The Q output of flipflop 1824 is connected to the first input of an AND gate 1826, and the second input of AND gate 1826 is connected to the C2 STROBE from clock 1802. The output of AND gate 1826 is connected to the clock input of latch 1822. The first stage of latch 1822 is connected to the RING line 1828, and the second stage is connected to the MESSAGE wait line 1830. The outputs of the remaining six stages of latch 1822 are left unconnected.

When a proper PAW ADDRESS and ENABLE signal is received by control 1815, it provides the appropriate ENABLE signal on PAW SHIFT line 1816 to the address buffer unit 1810. The address unit 1810 then extracts the PAW information from the PAW bus. Because of the switching provided by flipflop 1824 and AND gate 1826, latch 1822 only stores the C2 bits from the PAW bus 1818. When the entire eight bits of C2 data has been stored in latch 1822, only the first two C2 bits are used for signalling purposes. The remaining six C2 bits in the received PAW act as dummy bits and are not used for signalling.

Each RX buffer and PAW latch 1810 is connected to a respective A/D, D/A hybrid unit 1834. Each hybrid unit 1834 includes a 4-bit parallel-to-serial converter 1836 whose parallel inputs are connected to buffer 1820, whose enable input is connected to the appropriate RX ENABLE line 1808, and whose OUTPUT ENABLE is connected to the 240 KHz output from clock 1802. The serial output of buffer 1836 is connected to a delta decoder 1838. The sampling input of decoder 1838 is connected to the 240 KHz clock. The audio output of decoder 1838 is connected to a first pair input of a four-wire to two-wire hybrid 1840. The four bits of parallel digital audio data from buffer 1820 to buffer 1836 is outputted in serial fashion to decoder 1838 at the 240 KHz delta sampling frequency. Thus, the audio signal at the output of decoder 1838 is a continuous audio analog of the digital data. This signal is applied to a two-wire cable 1842 running to the SLT 24 after it has passed through hybrid 1840.

The RING line 1828 from latch 1822 is connected to a relay 1844 which has a first contact connected to a RING voltage and a second contact connected to the first line at the output of hybrid 1840. The arm of relay 1844 is connected to the first contact of a relay 1846, whose second contact is connected to the 120-volt DC signal from converter 1804. The arm of relay 1846 is connected to one of the wires in the wire pair 1842. The second line at the output of hybrid 1840 is connected to an OFF HOOK detector 1848, whose output is connected to the second wire of the pair 1842. OFF HOOK detector 1848 provides an output bit which indicates when the SLT 22 connected to pair 1842 has been taken OFF HOOK.

When the first C2 bit of the eight C2 bits of the PAW stored in latch 1822 is a one bit, RING line 1828 causes relay 1844 to switch to its second contact, whereupon a RING voltage is sent out over pair 1842 to the SLT 24 causing its bell to ring. When the second C2 bit of the PAW in latch 1822 is a one bit, latch 1822 sends a one bit on MESSAGE WAIT line 1830 to relay 1846 causing the relay arm to move to the second contact, whereupon a 120-volt signal is applied to pair 1842, which causes a neon MESSAGE WAIT light (not shown) in SLT 24 to be lit. This indicates to the user that a DSS operator has a message for that SLT 24. It should be noted that relays 1844 and 1846 cannot both be in their second position simultaneously because such a state would cause an electrical failure in SLT 24. It is thus apparent that the PAW provides a dual signalling function to each SLT 24, even though there is only a two-wire cable connecting the SLT 24 with the SLT interface 22. It should be remembered that the signalling information sent over cable 1842 to the SLT 24 is a ringing voltage or a MESSAGE WAIT voltage, and is not a digital signal voltage, as constrasted to the digital signalling used between the KSI 18 and the KST 20.

The audio signal over pair 1842 from SLT 24 is passed through the OFF HOOK detector 1848, which detects when the SLT 24 has gone OFF HOOK. The audio signal is then applied to the two-wire output of hybrid 1840, and the second pair input of the hybrid is connected to the input of a delta encoder 1850. A 240 KHz delta sampling clock is applied to encoder 1850 to cause the received audio signal to be linear delta encoded and serially sent to the input of a 4-bit serial-to-parallel converter 1852. The OUTPUT ENABLE of converter 1852 is connected to the 240 KHz clock.

A transmitting decoding unit 1856 produces TX ENABLE signals upon receipt of an appropriate TX ADDRESS and PRW ENABLE signal. Unit 1856 is connected to the TX ADDRESS BUS $2^0$, TX ADDRESS BUS $2^1$, PRW ENABLE bus and the TX MODULE ENABLE line dedicated for this interface. Unit 1856 provides a TX ENABLE signal after proper addressing to any one of four TX buffers 1858. Each TX buffer 1858 is connected to the transmitter decoding unit 1856 via a separate TX ENABLE line 1860. Specifically, the appropriate TX ENABLE line 1860 is connected to the enable input of converter 1852 so that when an enable signal is received thereat, converter 1852 outputs the four bits of digital audio data in parallel fashion to a corresponding 4-bit buffer in unit 1858. This buffer then outputs the parallel four bits of digital audio data onto a TX TDM data bus 1861. Bus 1861 is connected to the TDM data buffer 1814, which in turn transmits the 4-bit digital audio data onto the main TDM DATA bus which runs between all modules. It is seen now that audio data from the SLT 24 is linear delta encoded and transmitted over the TDM data bus on command in a parallel 4-bit configuration.

Each SLT interface 22 has a PRW generator 1865. The PRW generator includes a AND gate 1866 having its first input connected to the PSW bus, its second input connected to the PAW/PSW ENABLE bus and its third input connected to the TX MODULE ENABLE line. The output of AND gate 1866 is connected to the D input of a flipflop 1868, whose Q output is connected to the D input of a flipflop 1870. The clock input of flipflop 1868 is connected to the C2 STROBE from clock 1802. The clock input of flipflop 1870 is connected to the C1 STROBE of clock 1802. The output from flip-flop 1870 is connected to the clock input of a flip-flop 1872. The reset of flipflop 1872 is connected to an inverted version of the FRAME CLOCK.

The binary output from the OFF HOOK detector 1848 from each unit 1834 is applied to a separate SLT OFF HOOK line, which is sent to the PRW generator 1865. The four separate SLT OFF HOOK lines are connected to a CHANGE detector 1874, which detects both the rising edge and the falling edge of the digital signal from the plurality of OFF HOOK detectors 1848. In other words, CHANGE detector 1874 detects the high state outputted by an OFF HOOK detector 1848 when the associated SLT 24 goes OFF HOOK, and also detects when the SLT goes ON HOOK and the signal from the detector 1848 goes low. CHANGE detector 1874 generates a separate TRANSITION signal associated with each OFF HOOK detector 1848 for indicating when a change in state has occurred. Each of these TRANSITION signals is also applied to an OR stage in CHANGE detector 1874 to produce a MASTER TRANSITION signal which is applied to the D input of flipflop 1872. MASTER TRANSITION signal indicates when any of the OFF HOOK detectors 1848 has changed state. Each of the OFF HOOK detectors 1848 are connected to the input of a 16-bit parallel-to-serial converter 1876. Moreover, the separate TRANSITION lines from CHANGE detector 1874 are also connected to converter 1876, as are a plurality of eight C1 inputs. The C1 inputs are always in the high state. The arrangement of these inputs to converter 1876 are such as to generate a PRW in which the C1 bits are always one bits, and the C2 bits indicate the OFF HOOK condition of each of the SLTs 24. Specifically, the C2 bits in the $R_6$, $R_4$, $R_2$ and $R_0$ positions are connected to the appropriate TRANSITION lines for indicating whether a transition in the OFF/ON condition has taken place. The C2 bits in the $R_7$, $R_5$, $R_3$ and $R_1$ positions are connected to the appropriate SLT OFF HOOK lines for indicating whether the SLT 24 is either OFF HOOK or ON HOOK. Thus, the C2 bits provide signalling information for indicating the OFF/ON condition for each SLT 24.

The RESET input of CHANGE detector 1874 and the LOAD input of converter 1876 are connected to an inverted version of the signal at the Q output of flipflop 1872. Converter 1876 is connected to the 120 KHz clock, the serially output from converter 1876 is connected to the PRW bus.

The operation of the PRW generator 1865 is as follows. When the TX MODULE ENABLE line and the PAW/PSW ENABLE line to AND gate 1866 are provided with ENABLE bits, AND gate 1866 causes flipflop 1868 to go to the high state upon reception of the first C2 one bit of the PSW. The Q output of flipflop 1870 goes to the high state when the second C1 zero bit of the PSW is received by AND gate 1866. The Q output of flipflop 1870 stays in the high state during reception of the entire PSW, but it should be noted that this PRW WINDOW signal from flipflop 1870 is delayed by one frame with respect to the PSW. Since the PRW WINDOW from flipflop 1870 is in the high state, the clock input of flip-flop 1872 is in the high state for a period equal to eight TDM frames. If there has been a transition in any of the SLTs 24, the MASTER TRANSITION signal is a one bit, which causes the Q output of flipflop 1872 to go to the low state. Since the clock input of flipflop 1872 is high for the entire eight-frame period, the Q output stays in the low state for a corresponding eight frames. This causes the information in converter 1876 to be outputted at 120 KHz, since both the load input of converter 1876 and the reset of CHANGE detector 1874 have been put to the high state. The information in converter 1876 has to be outputted at 120 KHz because there are two PRW slots in each TDM frame. It is thus seen that reception of a PSW by the PRW generator 1865 causes the generator to the output a corresponding PRW to the TDM controller 10 for indicating the OFF HOOK condition of each SLT 24. In the situation where none of the SLTs 24 has changed state since the reception of the prior PSW, all of the C2 bits indicating transitions will be zeros, which will indicate to the TDM controller 10 that no change of state has occurred. It should be seen that signal line delays between the SLTs 24 in the SLT interface 22 are of no concern, since the audio and signal data is encoded and decoded into digital form at the SLT interface 22, and not at the SLTs 24. This should be contrasted with the situation in the KSTs 20, where signal line delay must be accounted for since digital signal transformations are done at the KSTs 20. It should also be noted that standard SLTs 24 may be utilized in the present system, since the SLT interface 22 provides signals which are compatible to those used by standard SLTs.

THE CENTRAL OFFICE (CO) INTERFACE

Figure 19A:
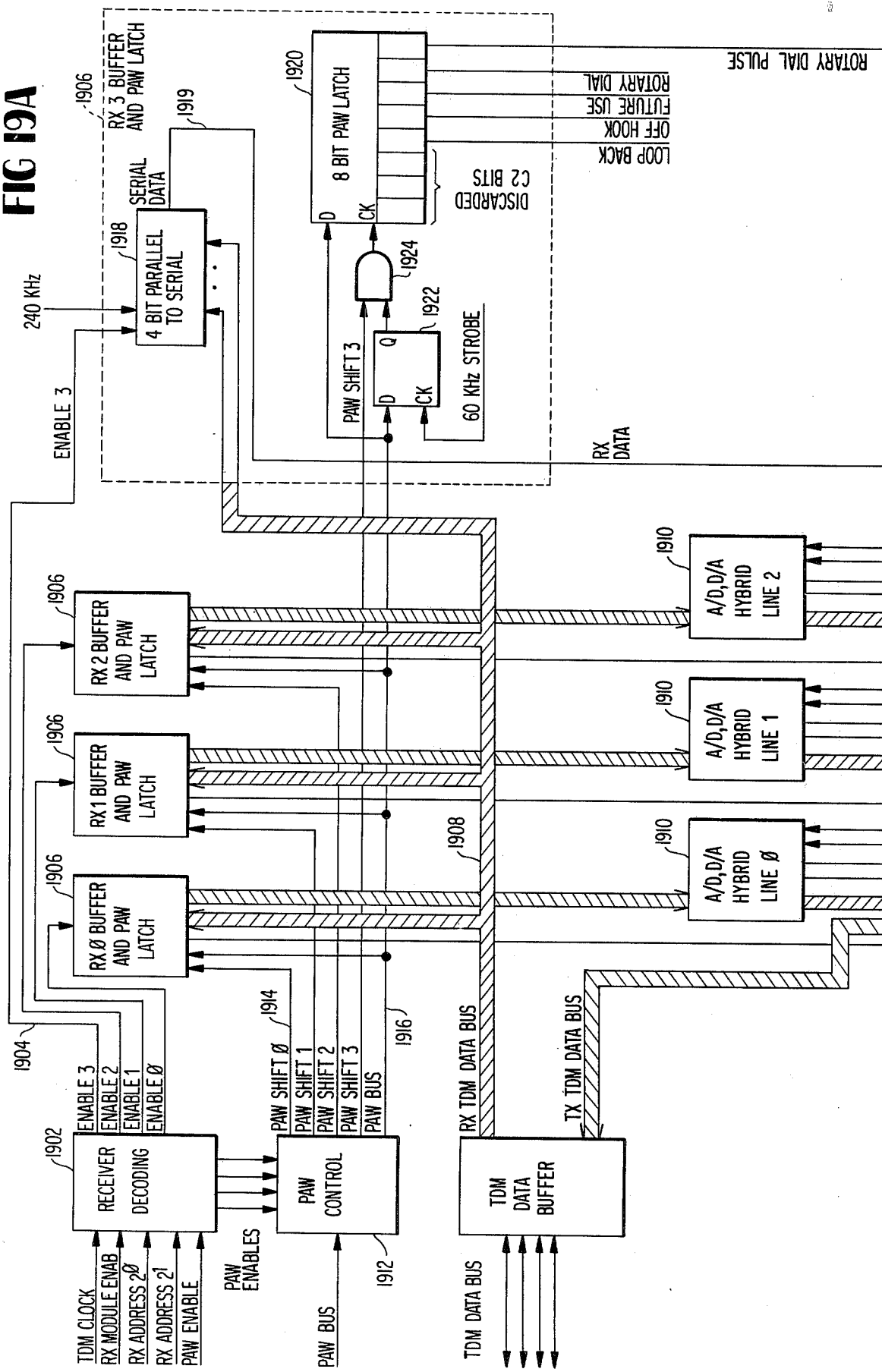
FIG. 19 comprised of 19A and 19B are a block diagram of the CENTRAL OFFICE INTERFACE 26.

A central office interface 26, as shown in FIG. 19, allows connection of up to four central office (CO) lines per interface. The CO line interface 26 converts all of the audio and signalling information present on the CO line into appropriate digital format for use in the system. Moreover, the CO line interface 26 converts all digital information from the system into appropriate analog signals for transmission of audio and signalling information out on the CO lines. In other words, the CO line interface 26 acts as an analog-to-digital converter for correctly interfacing the CO lines with the system. The addressing scheme used to address other modules in the system is also employed with the CO line interface 26, and reference should be made to FIG. 3 and the accompanying text for an explanation of the addressing scheme and TDM data exchange used between the TDM controller 10 and interfaces in the system.

Referring now to FIG. 19, a receiver decoding unit 1902 acts to provide a plurality of ENABLE signals upon receipt of a correct address from the TDM controller 10. Specifically, receiver decoder unit 1902 is connected to the RX ADDRESS BUS $2^0$, RX ADDRESS BUS $2^1$, to the PAW/PSW ENABLE BUS and to the TDM CLOCK. The unit 1902 is also connected to the RX MODULE ENABLE line which is dedicated for this particular unit 1902. Addressing of unit 1902 is done in the fashion explained in the text accompanying FIG. 3. It should be noted that unit 1902 is not connected to the common RX ADDRESS BUS $2^8$ since there is only one receiving audio channel for each CO line. This should be contrasted with the two audio channels which are present in the KSTs 20. It should also be remembered that the PAW/PSW ENABLE line acts as a disable with respect to unit 1902. In other words, in order for unit 1902 to be correctly addressed, the PAW/PSW ENABLE line must be in the low state.

Unit 1902 provides, upon receipt of a correct address, a separate ENABLE signal on a separate line 1904 to one of four RX buffer and PAW latches 1906. The function of units 1906 is twofold. First, units 1906 extract four parallel bits of digital audio data from a RX TDM data bus 1908 upon receipt of an ENABLE signal from unit 1902, and furnish this digital data in serial fashion at a rate of 240 KHz to one of four A/D, D/A hybrid units 1910. The second function of units 1906 is to extract the C2 bits of a PAW upon receipt of an appropriate PAW SHIFT signal from a PAW control unit 1912. These extracted C2 bits of the PAW are stored in a latch, which uses these C2 bits to perform certain signalling functions required on the CO line. Thus, the RX buffer and PAW latches 1906 convert designated digital audio data to serial digital form and also extract, on command, the C2 bits from a PAW on the PAW bus, and use these extracted C2 bits to perform certain signalling functions on the CO line.

The PAW control unit 1912 is connected to unit 1902 via PAW ENABLE line. Unit 1902 provides ENABLE signals to control 1912 when a correct address has been received. This explains why the PAW ENABLE line must be provided to unit 1902, because if it was not present, unit 1902 would not be able to tell whether the address signal was for a receiving function or for a PAW function. PAW control 1912 is connected to the common PAW bus. Unit 1912 provides a SHIFT signal on an appropriate PAW SHIFT line 1914 when an appropriate PAW address is received. There is one PAW SHIFT line 1914 for each unit 1906, and a SHIFT signal thereon thus indicates when that unit 1906 is to extract PAW bits from a common PAW bus 1916 connected with unit 1912.

Each RX buffer and PAW latch 1906 includes a 4-bit parallel-to-serial converter 1918, whose four parallel inputs are connected to the RX TDM data bus 1908. The enable line 1904 associated with the unit 1906 is connected to converter 1918 for providing an ENABLE signal when parallel digital data is to be extracted off bus 1908. The 240 KHz clock from a clock 1901 is also applied to converter 1918 so that the serial data outputted by converter 1918 occurs at a 240 KHz rate. This serial data at the output of converter 1918 is applied via a line 1919, the purpose of which will be explained later.

Each unit 1906 also includes an 8-bit PAW latch 1920 for storage of the C2 bits of a PAW used for signalling purposes on the CO line. The common PAW bus 1916 is connected to the D input of the latch 1920, and is also connected to D input of a flipflop 1922. The PAW SHIFT line 1914 designated for the particular unit 1906 is connected to the first input of a AND gate 1924. The Q output of flipflop 1922 is connected to the second input of AND gate 1924. The clock input of flipflop 1922 is connected to a 60 KHz STROBE from the clock 1901. The output of AND gate 1924 is connected to the clock input of latch 1920.

The operation of latch 1920 is as follows. Each TDM frame in which a PAW is to be sent to unit 1906, a correct address is received by the PAW control 1912. This causes a SHIFT signal to be applied to the appropriate PAW SHIFT line 1914 going to the unit 1906 to receive the PAW information. Since the C1 bit in a PAW is always a one bit, it causes flipflop 1922 to go into the high condition each time it is received. Since flipflop 1922 goes high each time a C1 bit of a PAW is received, this results in only the C2 bits being loaded into latch 1920. This continues for eight TDM cycles until the entire PAW has been sent, whereupon all of the C2 bits of the PAW have been stored into latch 1920. Certain of these C2 bits are designated for certain signalling functions on the CO line. It is seen that the first C2 bit indicates the ROTARY DIAL PULSE function, the second C2 bit provides the ROTARY DIAL function, the third C2 bit has been left free for future use, the fourth C2 bit indicates the OFF HOOK function and finally, the fifth C2 bit provides the LOOP-BACK function. These various functions will be discussed later. The remaining C2 bits are not used for signalling purposes and are discarded.

Each RX buffer and PAW latch 1906 is connected to a separate A/D, D/A hybrid unit 1910. The purpose of unit 1910 is fourfold. First, it accepts the serial digital audio data from unit 1906 and converts it into an analog signal for transmission onto the CO line 1915 that the unit 1910 is connected to. Second, unit 1910 utilizes the signalling information from latch 1920 to perform required signalling functions on the connected CO line 1915. Third, unit 1910 converts received audio signals from the CO line 1915 into serial digital audio data. Finally, unit 1910 detects certain signalling functions on the signal on CO line 1915, and produces digital information which indicates these changes.

Each A/D, D/A hybrid unit 1910 includes a linear delta decoder 1926, whose input is connected to the serial Rx data stream coming from converter 1918. Delta decoder 1926 is connected to the 240 KHz delta sampling frequency so that decoder 1926 converts the serial data on line 1919 to a continuous analog signal at its output on a line 1921. Turning to FIG. 19, the analog signal on line 1921 is applied to the first input pair of a four-wire to two-wire hybrid unit 1928. The two-wire output pair from hybrid unit 1928 is connected to a line 1923 and to a line 1925. Line 1923 is connected to a first input of a RING DETECTOR 1930. RING DETECTOR 1930 detects the 90-volt, 20 Hz signal on CO line 1915 that indicates that the CO of the telephone system is ringing the "telephone" connected to the CO line 1915. When this ring voltage is detected by RING DETECTOR 1930, it provides a binary RING DETECT signal, the purpose of which is discussed later. Line 1923 is then connected to the first terminal of a blocking capacitor 1927. The second terminal of capacitor 1927 is connected to a line 1929. Line 1929 is connected to the first wire of the two-wire CO line 1915. The connection between line 1929 and the first wire of CO line 1915 can be broken by a relay 1932. Relay 1932 is connected via an inverter 1934 to the ROTARY DIAL line of latch 1920. Line 1929 is connected to the first input of a LOOP CURRENT detector 1936. Detector 1936 senses when LOOP CURRENT starts flowing in the CO line 1915. Since some COs provides a break in the LOOP CURRENT on the CO line 1915 when the telephone connected directly to the CO equipment is hung up, detector 1936 will sense when this LOOP CURRENT has ceased. Detector 1936 provides an output binary signal for indicating when the outside telephone connected to the CO line 1915 has been hung up. This binary signal, called a HOOK FLASH, will be discussed later.

Line 1925 from hybrid 1928 is connected to the second input of the LOOP CURRENT DETECTOR 1936. A line 1935 connects line 1925 with line 1915a (line 1915a being the first of the two lines making up CO line 1915) via a relay contact associated with a relay 1937. The armature of relay 1937 is connected to the ROTARY DIAL PULSE line of latch 1920. Line 1929 is connected to line 1915a via a relay contact associated with a relay 1932. The armature of relay 1932 is connected via an inverter 1934 to the ROTARY DIAL line of latch 1920. Line 1915a is connected via a varistor 1931 to a PROTECTIVE GROUND which connects the CO equipment with the present system. Line 1925 is connected to line 1915b (line 1915b being the second line of CO line 1915) via a relay contact associated with a relay 1938. The armature of relay 1938 is connected to the OFF HOOK line of latch 1920. Line 1915b is connected to the PROTECTIVE GROUND via a varistor 1933. Finally, the second input of the RING detector 1930 is connected to line 1915b.

The operation of the OFF HOOK function, the ROTARY DIAL function and the ROTARY DIAL PULSE is as follows. When any telephone in the present system is taken OFF HOOK, the software in CPU 12 causes the TDM controller 10 to output a PAW for receipt by a specific unit 1906. This PAW has a fourth C2 bit which is a one bit. This results in a OFF HOOK signal being applied to relay 1938. It should be noted that line 1915b is normally disconnected from line 1925. The OFF HOOK signal from latch 1920 causes a connection to be established between the CO line 1915 and the hybrid 1928. This OFF HOOK signal from latch 1920 must be repeatedly provided as long as the telephone in the system remains OFF HOOK.

When the present system is connected to a CO which uses rotary dial signalling, unit 1910 must provide correct rotary dial pulses in order for correct dial signalling to take place between the present system and the CO line. This rotary dial signalling capability is furnished by relays 1932 and 1937. Specifically, once the OFF HOOK relay 1938 has connected the CO line 1915 to hybrid 1928, a ROTARY DIAL signal from latch 1920 must be sent to relay 1932 to break the connection between line 1915a and line 1929. Thereafter, latch 1920 provides ROTARY DIAL PULSE signals to relay 1937 at predetermined time intervals to cause the correct make and break of line 1935 to create rotary dial pulses. The software in CPU 12 must furnish the TDM controller 10 with instructions which cause PAWs to be sent to the unit 1910 at intervals which will result in correct rotary dial pulse being created by the switching of relay 1937. It is therefore apparent that the present system can accommodate a CO using ROTARY DIAL PULSE signalling. On the other hand, if the CO uses dual-tone multi-frequency (DTMF) signalling, the software from the CPU 12 does not provide signalling to relays 1932 and 1937.

Each CO line interface 26 has a TRANSMITTER DECODER 1950. The operation of unit 1950 is similar to that of the RECEIVER DECODER 1902 in that it provides an ENABLE signal to one of four TX buffers 1952 upon receipt of a correct ADDRESS signal and a PRW ENABLE signal. Specifically, transmitter decoder 1950 is connected to the TX ADDRESS BUS $2^0$, TX ADDRESS BUS $2^1$ and the PRW ENABLE bus. In addition, decoder 1950 is connected to the TX MODULE ENABLE line which is dedicated for this particular interface. Each TX buffer 1952 is connected via an ENABLE line 1951 to the decoder 1950. An ENABLE signal is provided to the unit 1952 when a correct ADDRESS is received by decoder 1950.

Each TX buffer 1952 performs the function of converting the serial digital audio data stream from an associated unit 1910 into a parallel 4-bit data format for outputting on a TX TDM DATA bus 1953. Moreover, TX buffers 1952 also provide the LOOP-BACK function, which permits diagnostic testing to determine whether proper signalling is taking place in the CO interface 26.

Returning to unit 1910, the analog data from hybrid 1928 is applied to a delta encoder 1944, which is connected to the 240 KHz delta sampling clock. Encoder 1944 provides a serial digital audio bit stream at its output at a rate of 240 KHz. This serial bit stream is applied to the TX data input of a DATA SELECTOR unit 1954. The RX data input of DATA SELECTOR 1954 is connected to the serial data bit stream 1919 coming from converter 1918 of buffer 1906. The binary LOOP-BACK signal from latch 1920 is provided as a control signal to DATA SELECTOR 1954. The output of DATA SELECTOR 1954 is applied to the input of a 4-bit serial-to-parallel converter 1956. The ENABLE input of converter 1956 is connected to the appropriate ENABLE line coming from transmitter decoder 1950. Furthermore, the clock input of latch 1956 is connected to the 240 KHz delta sampling clock. The parallel 4-bit output from latch 1956 is connected with the TX TDM DATA bus 1953.

Normally, there is a zero bit in the LOOP-BACK stage of latch 1920, thus causing the TX data to be applied to the input of latch 1956. However, when a PAW in latch 1920 causes the LOOP-BACK signal to be high, the RX data is applied to the input of latch 1956. It is therefore seen that the LOOP-BACK function results in a feedback to the TDM data bus of all information received by a unit 1906 from the RX TDM data bus 1908. The LOOP-BACK function permits the TDM controller 10 to perform diagnostic analysis on the CO line interface 26 to determine whether correct signalling is taking place.

Each CO line interface 26 also has a PRW generator 1960. The function of PRW generator 1960 is to provide signalling information to the TDM controller 10 for indicating two different conditions for each CO line 1915. The first condition is called the RING DETECT which indicates when the CO is applying a RING signal on CO line 1915, which requires the CPU 12 to direct the TDM controller 10 to output the correct PAW information so that the incoming call channel will be created. The RING DETECT binary signal is provided by the RING detector 1930. The second function is called the HOOK FLASH which indicates that there has been a break in the loop current on CO line 1915. It should be remembered that some COs provide a break in the loop current when the outside telephone is hung up. The HOOK FLASH signal is provided by the LOOP CURRENT detector 1936.

The HOOK FLASH signal and the RING DETECT signal from each unit 1910 is provided to a CHANGE detector 1962. CHANGE detector 1962 detects only the leading edge of each change of signal any of the eight lines connected to it. In other words, when any of the HOOK FLASH or RING DETECT signals goes to the high state, CHANGE detector 1962 will detect that change. Detector 1962 will not detect when any of those signals go to the low value.

The HOOK FLASH and RING DETECT signals from each unit 1910 are also applied to the respective parallel inputs of a 16-bit parallel-to-serial latch 1964.

The latch 1964 is clocked by the 120 KHz clock. An additional eight parallel inputs to latch 1964 are always set at a 1-bit value. It should be noted that these constant inputs are positioned so as to occupy the C1 bit positions of a PRW. The C2 positions of the PRW are occupied by the HOOK FLASH and RING DETECT signals. The serial output of the latch 1964 is connected to the PRW bus.

The PSW bus is connected to the first input of a AND gate 1966, while the PAW/PSW ENABLE bus is connected to the second input, and the TX MODULE ENABLE line is connected to the third input. The output of AND gate 1966 is connected to the D input of a flipflop 1968, whose Q output is connected to the D input of a flipflop 1970. The clock input of flipflop 1968 is connected to the C2 STROBE signal from clock 1901, and the clock input of flipflop 1970 is connected to the C1 STROBE signal. The output Q of flipflop 1970 is connected to the clock input of flipflop 1972. A MASTER TRANSITION signal from CHANGE detector 1962, which indicates when any of the HOOK FLASH or RING DETECT signals has gone high, is connected to the D input of flipflop 1972. The RESET of flipflop 1972 is connected to the frame clock of clock 1901. The Q output of flipflop 1972 is connected in an inverted form to the reset of CHANGE detector 1962 and to the LOAD input of converter 1964.

The operation of the PRW generator 1960 is as follows. When a PAW/PSW ENABLE signal and a TX MODULE ENABLE signal is sent to AND gate 1966, the first C2 bit of a PSW on the PSW bus causes flipflop 1968 to go into the high state. The second C1 bit causes flipflop 1970 to go in the high state, which thus causes the clock input of flipflop 1972 to be at the high level. The clock input of flipflop 1972 remains in the high state during reception of the entire PSW. If the MASTER TRANSITION is in the low state, which indicates that none of the HOOK FLASH or RING DETECT signals has gone into the high state, CHANGE detector 1962 is not reset and converter 1964 is not loaded. Thus, no PRW is outputted on the PRW bus. In comparison, if the MASTER TRANSITION signal is in the high state, a PRW is outputted on the PRW bus. Thus, the CPU 12 knows that a change has taken place in one of the HOOK FLASH or RING DETECT signals. In other words, only one PRW is required to do appropriate signalling between the CO line interface 26 and the TDM controller 10.

DIRECT STATION SELECTION WITH BUSY LAMP FIELD (DSS/BLF) CONSOLE

The DSS/BLF console 36, as shown in FIG. 20, can be connected as if it was a KST 20 with any KSI 18 in the system. The DSS/BLF console operates as an attendant station which provides on a BLF composed of LEDs a busy indication of up to 100 telephones in the system. In addition, the DSS/BLF console 36 allows an attendant to create a talk path connection between the attendant's telephone and any other telephone in the system. Each DSS/BLF console 36 can accommodate up to 100 telephones. The system can accommodate two DSS/BLF consoles 36.

As stated above, the first function of the DSS/BLF console 36 is to provide the attendant on a console BLF a visual map of the activity status of the telephones in the system. It should be noted that the DSS/BLF console 36 can monitor the activity of both KSTs 20 and SLTs 24. It should also be remembered that the DSS/BLF console 36 is connected to a key-set interface 18.

The DSS/BLF console 36 provides the console BLF function as follows. A first pair 2001 of the two-pair cable connecting the DSS/BLF console 36 with the KSI 18 is connected to the primary of a transformer 2002, whose secondary is connected to the input of a clock data recovery and Manchester decoder unit 2004. It should be noted that pair 2001 is the pair that is receiving signals sent by the KSI 18. Unit 2004 recovers the data from the KSI 18 as well as recovering the 720 KHz clock. The recovered data from unit 2004 is applied via line 2005 to the input of a receiver latch 2006, which extracts the C1 bits and the C2 bits from the recovered data. The RECOVERED 720 KHz CLOCK is also applied to latch 2006. The C2 bits recovered by the receiver latch 2006 are applied to the input of a temporary PAW latch 2008. Latch 2008 has storage capacity for 224 bits. A synchronization and timing unit 2010 provides a PAW SHIFT clock signal to the enable input of latch 2008 each time a C2 bit to be stored in latch 2008 is outputted by latch 2006.

For ease of explanation, it should be noted at this point that 32 PAWs are required by the DSS/BLF console 36 each time the console BLF is to be lighted. It should also be noted that the PAW SHIFT clock pulse from the synchronization and timing unit 2010 is applied to the enable input of latch 2008 only during the time of the last seven C2 bits of each PAW. In other words, the first C2 bit of each received PAW is discarded, and thus is not stored in the latch 2008.

The PAW SHIFT clock signal from unit 2010 is created as follows. The received C1 bits from latch 2006 are applied to the D input of a flipflop 2012, whose Q output is applied to the D input of a flipflop 2014. The Q output of flipflop 2014 is applied to the first input of an AND gate 2016. The RECOVERED 60 KHz FRAME CLOCK derived from the RECOVERED 720 KHz clock is applied to the clock input of flipflop 2012 and to the clock input of flipflop 2014. The Q output of flipflop 2012 is applied to the RESET input of flipflop 2014. The RECOVERED 60 KHz FRAME CLOCK is also applied via an inverter 2018 to the second input of AND gate 2016. The output of AND gate 2016 is the PAW SHIFT clock.

The first C1 bit of each PAW causes the Q output of flipflop 2012 to go to the high state. The next received C1 bit causes the Q output of flipflop 2014 to go to the high state, whereupon the output of AND gate 2016 first goes to the high state when the second C2 bit is received. Thus, the first C2 bit is not stored by latch 2008 since there is no PAW SHIFT clock signal from AND gate 2016. The remaining seven C2 bits of each PAW are loaded into latch 2008 because of the presence of PAW SHIFT clock signal from AND gate 2016.

It should be noted at this point that the time required for the TDM controller 10 to output the required 32 words of PAW to the DSS/BLF console 36 is sufficiently long so that the human eye can detect the flicker that would be caused if 32 words of PAW were required each time the BLF on the console was lighted. In order to overcome this flicker problem, the prior 32 words of PAW data received at the DSS/BLF console 36 are utilized for controlling the console BLF until an updated set of 32 words of PAW are received. This is to be contrasted with other PAW signalling in the system in which PAW information is required each time a signalling operation is to be performed.

The synchronization and timing unit 2010 detects when the full complement of 32 words of PAW have been received and stored in latch 2008. When the 32 words of PAW data have been stored and detected, synchronization and timing unit 2010 provides a first SHIFT signal on line 2020 to a SELECTOR unit 2022 of a PAW latch 2024. The first input of SELECTOR 2020, called the NEW DATA input, is connected to the output of latch 2008 for receiving the serial PAW data stream therefrom. The PAW latch 2024 is a 112-bit serial register, whose input is connected to the output of SELECTOR 2022 and whose output is fed back to the second input, called the RECIRCULATION input, of SELECTOR 2022. The first SHIFT signal on line 2020 is also connected to the OUTPUT ENABLE of latch 2008. Thus, when the 32 words of PAW data have been loaded into latch 2008, and synchronization and timing unit 2010 has detected this, unit 2010 outputs a first SHIFT signal on line 2020 which causes the first 16 words of PAW to be outputted from latch 2008 to PAW latch 2024 via the NEW DATA input of SELECTOR 2022.

After the first 16 words of PAW data have been stored in PAW latch 2024, the synchronization and timing unit 2010 provides a second SHIFT signal on a line 2026. Line 2026 is connected to a SELECTOR unit 2028, whose output is connected to a PAW latch 2030. PAW latch 2030 is a 112-bit serial latch, whose output is connected to the second input, called the RECIRCULATION input, of SELECTOR 2028. The first input of SELECTOR 2028 is called the NEW DATA input, which is connected to the output of PAW latch 2008. The second SHIFT signal from unit 2010 causes the second 16-words of PAW data from latch 2008 to be outputted into PAW latch 2030 via SELECTOR 2028.

The 16 words of PAW data in latch 2024 are now recirculated via the RECIRCULATION input of SELECTOR 2024 at the 720 KHz rate. Similarly, the 16 words of PAW data in latch 2030 are recirculated via the RECIRCULATION input of SELECTOR 2028 at the 720 KHz rate. The last 16 stages of latch 2024 are connected to a corresponding set of serial stages in a 16-bit column latch 2032. Similarly, the last 16 stages of latch 2030 are connected to a corresponding set of serial stages in a 16-bit column latch 2034. A 7-bit row latch 2036 is connected via seven distinct lines to the synchronization and timing unit 2010. Latch 2036 is associated with latch 2032. A 7-bit row latch 2037 is also connected to the seven distinct lines which connect latch 2036 with the synchronization and timing unit 2010. A parallel clock pulse on a line 2039 is provided from synchronization and timing unit 2010 to latches 2032 and 2034.

A 7×16-bit DRIVER and LED MATRIX 2038 is associated with latches 2036 and 2032. Similarly, a 7×16-bit DRIVER and LED MATRIX 2040 is associated with latches 2037 and 2034. MATRICES 2038 and 2040 form the console BLF for indicating to the attendant the status of all of the 100 possible telephones in the system. The DC voltage for lighting MATRICES 2038 and 2040 is provided by DC power supplies connected to the building AC power mains. It should be noted that this DC voltage is not phantomed from the key-set interface 18.

The operation of MATRICES 2038 and 2040 is as follows. The 16 words of PAW data in latch 2024 is being recirculated at the 720 KHz clock rate. Similarly, the 16 words of PAW data in latch 2030 is being recirculated at the 720 KHz rate. Unit 2010 provides a PARALLEL CLOCK signal on line 2039 at intervals equal to multiple of 16 bits in the order of the PAWs stored in latches 2024 and 2030. In other words, unit 2010 provides a PARALLEL CLOCK pulse when the 16th bit in the PAW latch is about to be recirculated, when the 32nd bit is about to be recirculated and so on and so forth in increments of 16 bits. It should be remembered that the contents of PAW latch 2024 and 2030, respectively, is being continuously recirculated at the 720 KHz rate. Each time a PARALLEL CLOCK pulse is outputted by unit 2010 on line 2039, the last 16 bits of the recirculated PAW data in latches 2024 and 2030 are respectively loaded into latches 2032 and 2034. Since this data is the first 16 bits of each of the 16 words of PAW data outputted by latch 2008, unit 2010 provides a one pulse on the first line going to latches 2036 and 2037. This one bit on the first line causes the LEDs in the first column of MATRICES 2038 and 2040 to be responsive to the 16 bits of control information in latches 2032 and 2034, respectively. Similarly, when unit 2010 provides a PARALLEL CLOCK pulse for the second group of 16 bits, latches 2032 and 2034 accept the second group of 16 bits of a PAW data. Simultaneously, unit 2010 provides a one bit on the second line going to latches 2036 and 2037. Thus, the second row of LEDs in MATRICES 2038 and 2040 are responsive to the second set of 16 bits of PAW data in latches 2032 and 2034, respectively. The sequence repeats itself continuously until new PAW data is inputted into latches 2024 and 2030.

It is possible that the TDM controller 10 could start outputting a second group of 32 words of PAW data to the DSS/BLF console 36 before the preceding set of 32 words of PAW data have been outputted by latch 2008 into the respective latches 2024 and 2030. In such a condition, the circuit disclosed automatically stops the loading of the old PAW data into latches 2024 and 2030 so as to permit the new PAW data to be loaded into latch 2008. Thus, the DSS/BLF console 36 is always provided with the newest PAW data from TDM controller 10.

The circuitry in unit 2010 for generating the first SHIFT signal on line 2020 and the second SHIFT signal on line 2026 as well as the PARALLEL CLOCK signal on line 2039 is as follows. The recovered 720 KHz clock is applied to the input of a divide-by-16 counter 2050. The terminal count output of counter 2050 is applied to the enable input of a divide-by-7 counter 2052. The PARALLEL CLOCK pulse appears at the terminal count of counter 2050. The plurality of seven lines connected to latches 2036 and 2037 are provided by counter 2052. The terminal count output of counter 2052 is applied to the clock input of a flipflop 2054. The received C2 bits from latch 2006 are applied to the input of a LAST BYTE detector 2056. Detector 2056 detects the last byte of the 32 bytes of PAW data by sensing the first C2 bit of the last byte. The output of detector 2056 is applied to the first input of an AND gate 2058. The received C2 data is also applied to the input of a FIRST BYTE detector 2060 which senses the first byte of the 32 bytes of PAW data. Detector 2060 always insures that the most recent PAW data from the TDM controller 10 is stored into latch 2008, as discussed above. The output of detector 2060 is applied to the first input of an OR gate 2062. The Q output of flipflop 2054 is fed back to its D input and is also fed to the first input of AND gate 2064. The Q output of flipflop 2054 is connected to the second input of AND gate 2058. As well as to the first input of an AND gate 2066, the output of AND gate 2058 is applied to the clock input of a flipflop 2068, whose D input is always kept at a high state and whose Q output is applied to the second input of AND gates 2064 and 2066. The output of AND gate 2066 is connected to line 2020 and is the first SHIFT signal when in the high state. The output of AND gate 2064 is connected to line 2026 and is the second SHIFT signal when in the high state. The output of AND gate 2064 is also connected to the first input of an AND gate 2070, whose second input is connected to the terminal count of counter 2050. The output of AND gate 2070 is connected to the second input of OR gate 2062, whose output is fed to the reset input of flipflop 2068.

The DSS/BLF console 36 also provides the capability of allowing the attendant to create a talk path connection between the attendant's station and a telephone in the system. When the attendant inputs signalling information to establish the talk path on a bank of PRW switches 2080, the coded PRW data from switches 2080 is sent to be loaded into a PRW generator 2082 via a PRW data bus 2081. There are eight C2 bits of PRW data when switches on the PRW switch banks 2080 have been activated by the user.

When the TDM controller 10 outputs a PAW to the DSS/BLF console 36, the C1 and C2 bits of the received PSW are recovered by latch 2006, as described above with respect to reception of the PAW. The received C1 bits are applied via a line 2083 to an inverter 2084, the output of which is applied to the first input of an AND gate 2085. The received C2 bits are applied to the second input of AND gate 2085. The output of AND gate 2085 is applied to the D input of flipflop 2086, whose clock input is connected to the 60 KHz STROBE signal from unit 2010. The output Q of flipflop 2086 is applied to the first input of AND gate 2088. It is apparent that the reception of a PSW causes the Q output of flipflop 2086 to be in the high state. Thus, the output of flipflop 2086 can be used to generate the C1 bits of the PRW to be sent by the DSS/BLF console 36 to the TDM controller 10. The C1 bits from the Q output of flipflop 2086 are fed to the eight C1 bit positions in a 12-bit parallel-to-serial latch 2090.

The Q output of flipflop 2086 is also applied to the first input of an AND gate 2088, and the second input of AND gate 2088 is connected to the 60 KHz clock from unit 2010. The output of AND gate 2088 is the PRW SHIFT CLOCK window which is in the high state for an eight-frame TDM period following the reception of the second C1 bit of the PSW. The PRW SHIFT CLOCK window thus allows one C2 PRW bit to be loaded by PRW generator 2082 into the seventh register of latch 2090 per TDM frame. Since a one bit is always loaded into the first stage and a zero bit is always loaded into the sixth stage of 12-bit latch 2090, and since one C1 bit and one C2 bit is located into the second stage and seventh stage, respectively, per TDM frame. The four primary audio bits per TDM frame from receiver latch 2006, and the four secondary audio bits per TDM frame from receiver latch 2006 are looped back and applied to the third through sixth stages and the ninth through twelfth stages of latch 2090. Thus, latch 2090 generates a serial bit stream which is of the same format as the key-set frame.

It should also be noted that each PRW bit is delayed one TDM frame with respect to the each received PSW bit. The 60 KHz STROBE clock is applied to the load input of latch 2090 so that the PRW generated therein is outputted in correct time sequence with the key-set frame. The output of latch 2090 is connected to the first input of an EXCLUSIVE OR 2092, and the second input of EXCLUSIVE OR 2092 is connected via an inverter 2094 to the 720 KHz clock. The output of EXCLUSIVE OR 2092 is connected to the D input of flipflop 2095, whose Q output is connected to the input of a driver 2096. The clock input of flipflop 2095 is connected to the 1.44 MHz clock so as to remove glitches in the output serial data stream. The output of driver 2096 is applied to the primary of a transformer 2097, whose secondary is conneced to a second pair 2098 of the two pairs that comprise the cable that runs between the DSS/BLF console 36 and the KSI 18. This data is phantom on wire pairs 2001 and 2098, as described in the discussion of the KST 20.

TONE GENERATOR

The tone generator 32, as shown in FIG. 21, provides all the signalling tones used throughout the system. This includes both the tones sent to KSTs 20 and to SLTs 24 as well as the tones sent over the CO lines by the CO line interfaces 26. Unit 2102 is connected to a TX 1 ENABLE line, a TX 2 ENABLE line, a TX ENABLE line, a TX 4 ENABLE line and a TX 5 ENABLE line. In addition, unit 2102 is connected to the TX ADDRESS BUS $2^0$ and to the TX ADDRESS BUS $2^1$. The TDM CLOCK, the FRAME CLOCK and the 240 KHz are also provided to unit 2102.

In response to the MODULE ENABLE and ADDRESS bits, unit 2102 generates a plurality of separate enable signals in a rate control unit 2104. It should be observed that the tone generator 32 may receive a plurality of addresses during any one TDM frame for indicating that a plurality of separate tones are to be outputted on the TDM data bus during a plurality of audio slots in the TDM frame. Thus, unit 2104 generates the plurality of ENABLE signals that may be required in response to the MODULE ENABLE and ADDRESS bit from unit 2102. Specifically, unit 2104 provides an ENABLE signal to a CHIME generator unit 2106. Unit 2104 also provides separate ENABLE signals to a 4-bit serial-to-parallel converter 2108, a 4-bit serial-to-parallel converter 2110, a 4-bit serial-to-parallel converter 2112, a 4-bit serial-to-parallel converter 2114 and finally a 4-bit serial-to-parallel converter 2116.

Unit 2102 develops both a 15 KHz signal and 7.5 KHz signal. The 15 KHz signal is applied on a line 2118 which connects unit 2102 with the input of a 2500 Hz generator unit 2120. Generator 2120 converts the 15 KHz square wave signal into a 2500 Hz square wave signal at its output, which is applied to the input of a low-pass filter (LPF) 2122. As is well known in the art, a LPF converts a square wave input to a semi-sinusoidal output. Thus, the output of LPF 2122 is a semi-sinusoidal signal. The output of LPF 2122 is applied to a delta encoder 2124, which is provided with the 240 KHz DELTA SAMPLING clock. The serial bit stream at the output of encoder 2124 is applied at a rate of 240 KHz to the input of the 4-bit serial-to-parallel converter 2116.

Similarly, a 1250 Hz semi-sinusoidal signal is generated by the combination of a 1250 Hz generator 2126 whose input is connected to the 7.5 KHz signal from unit 2102 via a line 2128, and a LPF 2130 connected to the output of generator 2126. The semi-sinusoidal 1250 Hz signal at the output of LPF 2130 is applied to the input of a delta encoder 2132. Encoder 2132 is provided with the 240 KHz DELTA SAMPLING clock, which causes it to output a serial digital audio bit stream at a rate of 240 KHz to the input of 4-bit serial-to-parallel converter 2114.

A 750 Hz semi-sinusoidal tone is generated by a 750 Hz generator 2134, whose input is connected to line 2128 and whose output is connected to a LPF 2136. The semi-sinusoidal 750 Hz signal at the output of LPF 2136 is applied to the input of a delta encoder 2138. Delta encoder 2138 is also provided with the 240 KHz DELTA SAMPLING clock, which causes encoder 2138 to output a serial digital audio stream at a rate of 240 KHz to the input of the 4-bit serial-to-parallel converter 2112.

A 500 Hz semi-sinusoidal signal is generated by a 500 Hz generator 2140 connected to the output of generator 2134. The output of generator 2140 is connected to a LPF 2142. The output of LPF 2142 is a 500 Hz semi-sinusoidal signal which is applied to the input of a delta encoder 2144. Delta encoder 2144 is provided with the 240 KHz DELTA SAMPLING clock, which causes it to output a serial digital audio stream at a rate of 240 KHz to the input of the 4-bit serial-to-parallel converter 2110.

A dual-tone multi-frequency (DTMF) generator 2146 of standard design is applied with ROW/COLUMN control signals from timing and control unit 2102, as specified by the addresses received by unit 2102. This ROW/COLUMN control signals indicate to the DTMF generator 2146 which DTMF tone is to be generated. The DTMF tones from 2146 are made to be approximately 50 milliseconds in duration so as to provide compatible DTMF signalling tones for the CO lines (not shown). Moreover, tone generator 32 can only generate one DTMF tone at a time. This DTMF tone is generated during successive TDM frames equal to 50 milliseconds of time. The output DTMF tones from generator 2146 are applied to the input of a LPF 2148, whose output is connected to the input of a delta encoder 2150. Encoder 2150 is provided with a 240 KHz DELTA SAMPLING clock, which causes it to output a serial digital audio bit stream at a rate of 240 KHz to the input of the 4-bit serial-to-parallel converter 2108.

When timing and control unit 2102 receives an ADDRESS for a particular tone to be outputted on a particular audio slot in the TDM frame, rate control unit 2104 provides an appropriate enable signal to the 4-bit serial-to-parallel converter associated with the address tone. It should be noted that in the case of a DTMF tone, additional ROW/COLUMN control information must be provided to the DTMF generator 2146. The ENABLE signal from rate control unit 2104 causes the address 4-bit serial-to-parallel converter to output 4 bits of parallel digital audio data on a TX TDM bus 2170 at the time of the designated audio slot in the TDM frame. The 4 bits of parallel digital audio data on TX TDM bus 2170 is applied to a TDM data buffer 2175. An OUTPUT CONTROL signal from timing and control unit 2102 is provided to buffer 2175 so that information on the TX TDM bus 2170 is correctly outputted on the main TDM data bus of the system.

It is thus seen that the tone generator can provide tones during any of the audio slots in the TDM frame, and that DTMF tones can also be generated. Thus, considerable savings result since the tone generator 32 is time-shared by many units in the system.

CHIME generator 2106 can be enabled to provide a signal, called a NIGHT CHIME, for indicating incoming calls to the entire system during non-business hour periods. The CPU 12 can incorporate software to utilize this feature which is set by the operator at the DSS/BLF console 36.

CONFERENCE MODULE

Figure 22:
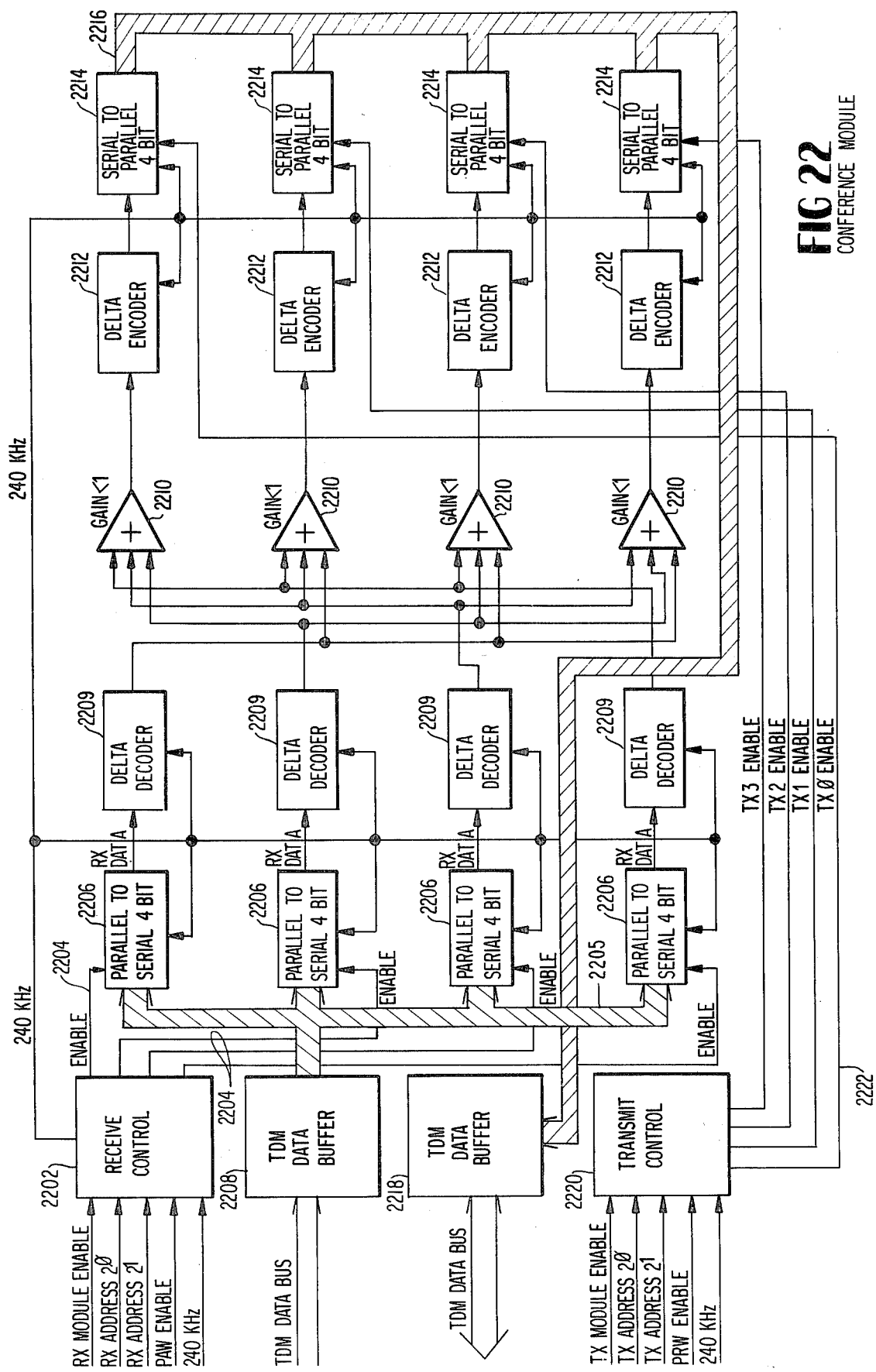
FIG. 22 is a block diagram of the CONFERENCE MODULE 46.

The conference module 46, as shown in FIG. 22, allows the digital audio data in up to four audio slots in a TDM frame to be combined and outputted on up to four additional audio slots in the TDM frame. This results in a conference function which allows four devices in the system to be in communication simultaneously with each other. It is thus apparent that up to four telephones in the system can be in a conference call or alternatively up to three outside CO lines can be in a conference with one system telephone. Thus, outside telephones via CO lines can participate in the conference call function which is provided by the conference module 46.

A receive control unit 2202 receives proper addressing from the TDM controller 10. It is apparent that the unit 2202 can receive up to four separate ADDRESSes during each TDM frame. The addressing used by the TDM controller 10 with the receive control unit 2202 is identical to that described in the text that accompanies FIG. 3. Specifically, receive control unit 2202 is connected to the RX ADDRESS BUS $2^0$, the RX ADDRESS BUS $2^1$ and the PAW ENABLE bus. As has been stated previously, the PAW ENABLE bus acts as a disable for reception of digital audio data. Thus, the PAW ENABLE signal must be in the low state in order for the receive control unit 2202 to receive data. Control unit 2202 is also connected to the RX MODULE ENABLE line dedicated for the conference module 46. The 240 KHz DELTA SAMPLING clock is also provided to control 2202.

Control 2202 provides an ENABLE signal on one of a plurality of lines 2204 in response to a correct received address. There are four 4-bit parallel-to-serial converters 2206. Each converter 2206 is connected to its appropriate enable line 2204 to the unit 2202. The 4-bit parallel input of each converter 2206 is connected to a TDM data buffer 2208 via a RX TDM bus 2205. TDM data buffer 2208, in turn, is connected to the common TDM data bus in the system.

The output of each converter 2206 is fed to the input of a delta decoder 2209. Each converter 2206 and each decoder 2209 is connected to the 240 KHz DELTA SAMPLING clock. It is therefore apparent that when an ENABLE signal is applied to a particular converter 2206. Before parallel bits of digital audio data on bus 2205 are stored in the converter 2206, and are outputted in serial fashion at 240 KHz to the input of the respective decoder 2209, where they are decoded and outputted as a continuous audio stream.

The output of each decoder 2209 is applied to an input of three separate analog amplifiers 2210. The gain of amplifiers 2210 is set to be slightly below one, so as to prevent audio feedback between conference channels. It should be noted that the output of each decoder 2209 is not applied to the amplifier associated with the transmit channel for the particular device being used. This feature also prevents feedback that could be caused by the feedback between the microphone and the speaker in the H/S of a particular telephone in conference connection.

The output of each amplifier 2210 is applied to the input of a delta encoder 2212, which encodes the applied analog signal. Each delta encoder 2212 is connected via its output to the input of a 4-bit serial-to-parallel converter 2214. Each delta encoder 2212 and converter 2214 is provided with the 240 KHz DELTA SAMPLING clock. Thus, it is apparent that encoder 2214 provides digital audio data in a serial form at the rate of 240 KHz to the input of the converter 2214. The 4-bit parallel output of each converter 2214 is connected to a TX TDM data bus 2216, which is connected via a TDM data buffer 2218 to the common TDM data bus of the system.

A transmit control unit 2220 provides an ENABLE signal on one of a plurality of lines 2222 upon receipt of a correct TX ADDRESS. The method for addressing is identical to that used with the receive control unit 2202. Specifically, transmit control unit 2220 is connected to the TX ADDRESS BUS $2^0$, the TX ADDRESS BUS $2^1$ and to the PRW ENABLE bus. As has been discussed previously, the PRW ENABLE bus must be in the low state in order for the transmit control unit 2220 to receive transmit information. Unit 2220 is also connected to a TX MODULE ENABLE line which is dedicated for the conference module 46. It is thus apparent that when a correct address is received by transmit control unit 2220 an ENABLE signal is sent on the specific line 2222 to the 4-bit serial-to-parallel converter 2214, thus causing 4 bits of digital audio data to be outputted in parallel fashion on the TDM data bus 2216 for transmission via the buffer 2218 to the common TDM data bus of the system.

The analog combination in the amplifiers 2210 of the decoded audio data thus creates the conference function. Since the digital information is being exchanged between modules at such a rapid rate in the TDM frame, any time delay between the separate slots in the TDM frame are unintelligible to the human ear. Thus, to the user, it appears that all four parties using the conference module 46 are in direct communication with each other, and there are no degradations in the audio signal, such as echo or feedback.

EXTERNAL ZONE PAGE AND NIGHT CHIME

Figure 23:
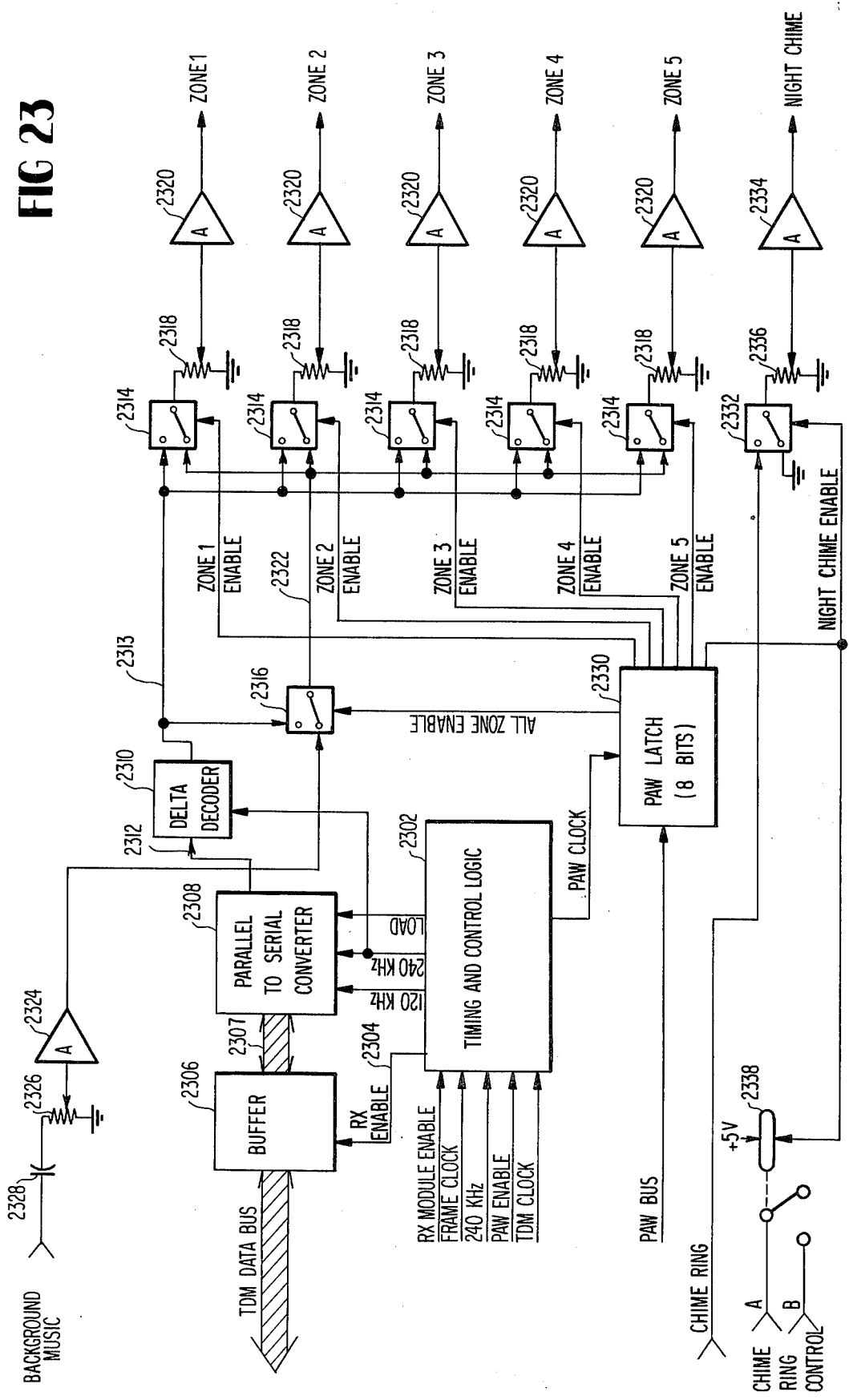
FIG. 23 is a block diagram of the EXTERNAL ZONE PAGE/NIGHT CHIME 42.

The External Zone Page and Night Chime, as shown in FIG. 23, provides the external zone paging and night chime function in the system. The external zone page allows any telephone in the system to page using one or all of five zones of external speakers. Background music from an external audio source can also be broadcast over the zones of external speakers. The Night Chime allows a night chime tone to be provided, under control of CPU 12, during certain specified times, for example, those designated by an attendant at a DSS/BLF console 36.

The external zone page allows any telephone in the system to page using one or all of five zones of external speakers. A timing and control logic 2302 produces an RX ENABLE signal on a line 2304 in response to receiving is an ENABLE signal on its dedicated RX MODULE ENABLE line. The FRAME CLOCK, 240 KHz DELTA SAMPLING clock and TDM CLOCK are provided to unit 2302 by the TDM controller 10. Line 2304 is connected to a 4-bit parallel buffer 2306. The inputs of buffer 2306 are connected to the TDM DATA bus that runs throughout the system. Buffer 2306 stores parallel digital audio data from the TDM DATA bus on receipt of the RX ENABLE signal from LOGIC unit 2302 via line 2304. The stored parallel digital audio data in buffer 2306 is applied to the input of a 4-bit parallel-to-serial converter 2308 on a data bus 2307, and is stored in converter 2308 when it receives a LOAD command from LOGIC 2302. The digital audio data stored in converter 2308 is outputted to a delta decoder 2310 at the 240 KHz delta sampling rate on a line 2312. Decoder 2310 linear delta decodes the serial bit stream at a 240 KHz rate and provides an audio signal to a line 2313 which is connected to the first inputs of a plurality of relay units 2314 and to the first input of a relay unit 2316. Each relay unit 2314 is associated with one of the zones of external speakers, and relay unit 2316 is associated with the ALL ZONE page, which allows simultaneous paging of one audio signal through all the zones in the system. The output of each relay 2314 is connected to signal level adjuster potentiometer 2318, whose arm is connected an audio amplifier 2320. The output of each amplifier 2320 is connected to the external speakers (not shown) which make up one of the paging zones. When the output of a relay 2314 is connected to its first input, any audio signal from decoder 2310 will be amplified by the associated amplifier 2320 and broadcast over the speakers connected to the amplifier 2320. The output of relay 2316 is connected via a line 2322 to the second input of each relay 2314. When the first input of relay 2316 is connected to its output, any audio signal from decoder 2310 can be amplified by each amplifier 2320 and will thus be broadcast over all the zones of speakers in the system. This is called ALL ZONE PAGING.

The second input of relay 2316 is connected to the output of an amplifier 2324, whose input is connected to a signal source, for example, a background music source (not shown) via a signal level adjuster potentiometer 2326 and a blocking capacitor 2328. The output of relay 2316 and each relay 2314 is normally connected to its second input absent an ENABLE signal, so that the broadcast music source is normally connected through relay 2316 and line 2322 to all the zones of speakers in the system, thus providing background music.

PAW signalling from the TDM controller 10 is used to provide ENABLE signals to relay 2316 and relays 2314 so that the background music can be switched off and voice paging via the TDM DATA bus can be provided. LOGIC 2302 is connected to the PAW ENABLE bus from TDM controller 10 and generates a PAW CONTROL (during the time of the C2 bit of the PSW) when provided with both an RX MODULE ENABLE and a PAW ENABLE. This control signal addressing was discussed in the text accompanying FIG. 3, supra. This PAW CLOCK from unit 2302 is applied as an ENABLE signal to a serial 8-bit PAW latch 2330, whose input is connected to the PAW BUS from TDM controller 10. Since the PAW CLOCK can only be present during the time of the C2 bit of a PAW, latch 2330 picks-off only the C2 bits of a PAW from the PAW bus when enabled by the PAW CLOCK from unit 2302. The eight C2 bits of a PAW are used by latch 2330 to produce ENABLE signals used to control the switching of relay 2316, each relay 2314, and a relay 2332 used for the NIGHT CHIME function. Specifically, each C2 bit in latch 2330 controls the generation of an ENABLE that determines the state of an associated relay 2316, 2314 or 2332. Each of these relays is normally connected to its second input, which corresponds to its C2 bit being a $\phi$ bit. When, however, its C2 bit is a 1 bit, an ENABLE signal is generated which causes the relay to change state. Thus, one PAW is used by latch 2330 to specify the zone paging that is to take place.

The first input of a relay 2332 is connected to a CHIME RING (not shown) which is a source of NIGHT CHIME audio. The second input of relay 2332 is connected to ground. The output of relay 2332 is connected to the input of an audio amplifier 2334 via a signal level adjuster potentiometer 2336. The output of amplifier 2334 is connected to external NIGHT CHIME speakers (not shown) for broadcasting the NIGHT CHIME signal when the output of relay 2332 is connected to its first input. Relay 2332 is normally connected to its grounded second input. A relay 2338 has its output connected to a controller of the CHIME RING source, its first input not used, and its second input connected to ring control which indicates that CHIME RING signal should be generated. Relay 2338 is normally connected to its first position. Relays 2332 are both responsive to the NIGHT CHIME ENABLE signal generated by latch 2330. When no NIGHT CHIME ENABLE is generated by latch 2330, no NIGHT CHIME signal is broadcasted by the NIGHT CHIME speakers. When a NIGHT CHIME ENABLE is generated by latch 2330, a NIGHT CHIME signal is generated in response to the ring control at relay 2338 and is broadcast over the NIGHT CHIME speakers. Thus, the NIGHT CHIME function can indicate incoming calls from CO lines to the system.

AUDIO DIGITIZER

Figure 24:
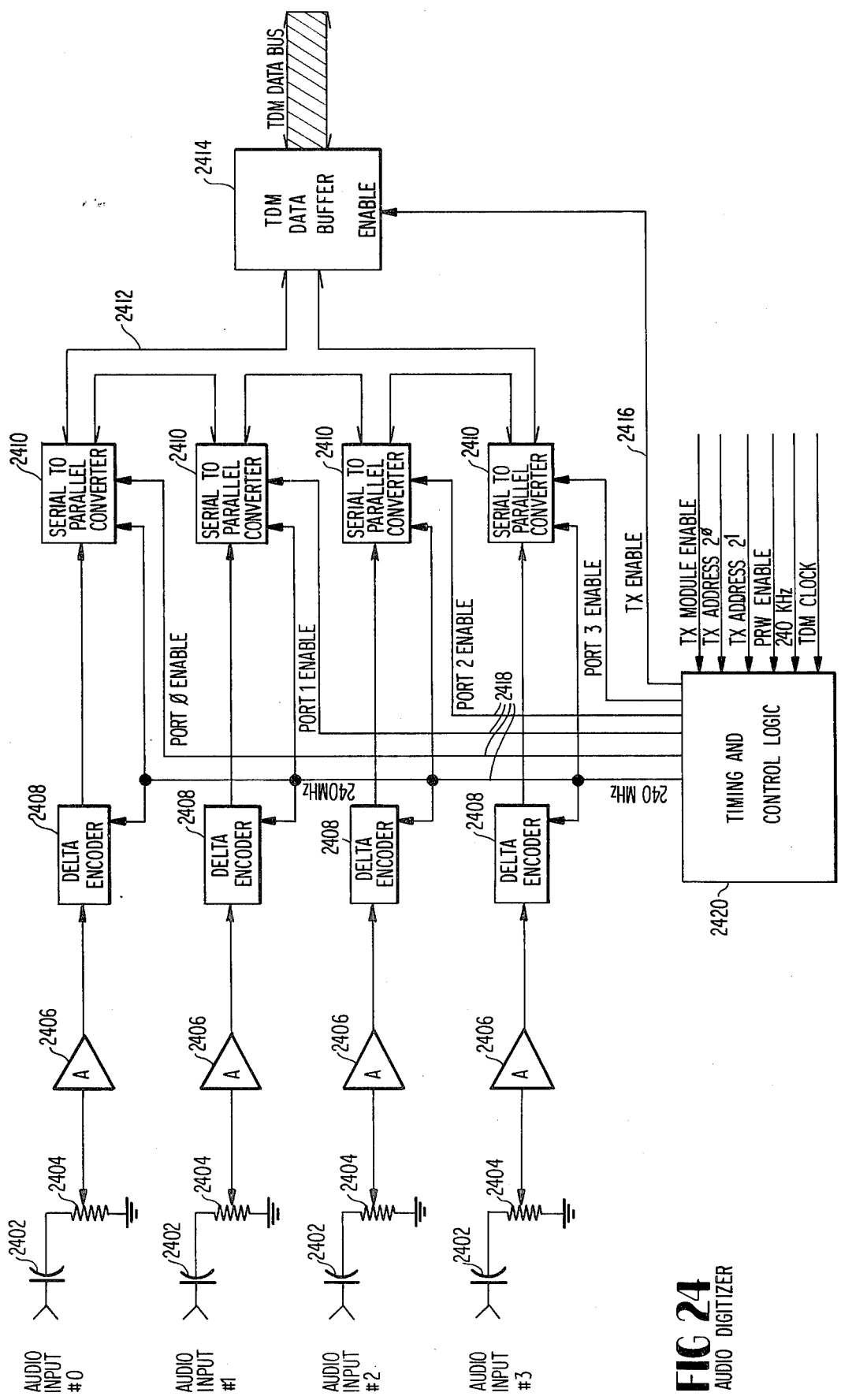
FIG. 24 is a block diagram of the AUDIO DIGITIZER 38.

The audio digitizer, as shown in FIG. 24, allows up to four signal sources to provide, on PRW command, digital audio data onto the TDM DATA bus. Possible uses of the audio digitizer are many, including background music for signals in a HOLD state.

Each of the four possible signal sources (not shown) is connected to the input of a separate audio amplifier 2406 via a blocking capacitor 2402 and a signal level adjuster potentiometer 2404. The output of each amplifier 2406 is connected to the input of a separate delta encoder 2408, which delta encodes the input audio signal at the 240 KHz DELTA SAMPLING clock rate and provides the encoded signal audio data serially to the input of a 4-bit serial-to-parallel converter 2410. Each converter 2410 is also connected to the 240 KHz DELTA SAMPLING clock provided by a timing and control logic 2420.

Timing and control logic 2420 provides a PORT ENABLE signal to each converter 2410 upon receipt of its TX ADDRESS from TDM controller 10, and provides a TX ENABLE to a TDM DATA buffer 2414 when the PRW ENABLE bus is in the low state. Specifically, logic 2420 is connected to the common TX ADDRESS BUS $2^0$, TX ADDRESS BUS $2^1$, PRW ENABLE bus and to a dedicated TX MODULE ENABLE line running only to the audio digitizer from the TDM controller 10. Thus, each one of the four signal sources can be addressed by the TDM controller 10, and logic 2420 can generate an ENABLE signal on respective ENABLE line of the signal source that is provided to its associated converter 2410. Logic 2420 continuously generates a TX ENABLE for the TDM DATA buffer 2414, which is always present when the PRW ENABLE bus from the TDM controller 10 is low.

The parallel 4-bit output of each converter 2410 is connected to an internal TDM DATA bus 2412, which is connected to the input of the TDM DATA buffer 2414. The output of buffer 2414 is connected to the common TDM DATA bus.

Serial digital audio data is continuously applied to the input of each converter 2410 from its associated delta encoder 2408. When the TDM controller 10 sends logic 2420 a TX ADDRESS specifying one of the converters 2410, logic 2420 generates a PORT ENABLE for that converter 2410, which causes it to output four bits of parallel digital audio data onto internal TDM DATA bus 2412. This four parallel bits of digital audio data is outputted to the common TDM DATA bus via TDM DATA buffer 2414, unless buffer 2414 is not provided with TX ENABLE from logic 2420. As stated earlier, TX ENABLE is always present except during the time of the dedicated PRW slots in the TDM frame. The audio digitizer thus allows up to four signal sources to provide, on PRW command from the TDM controller 10, digital audio data onto the TDM DATA bus.

DUAL-TONE MULTI-FREQUENCY (DTMF) RECEIVER

Figure 25:
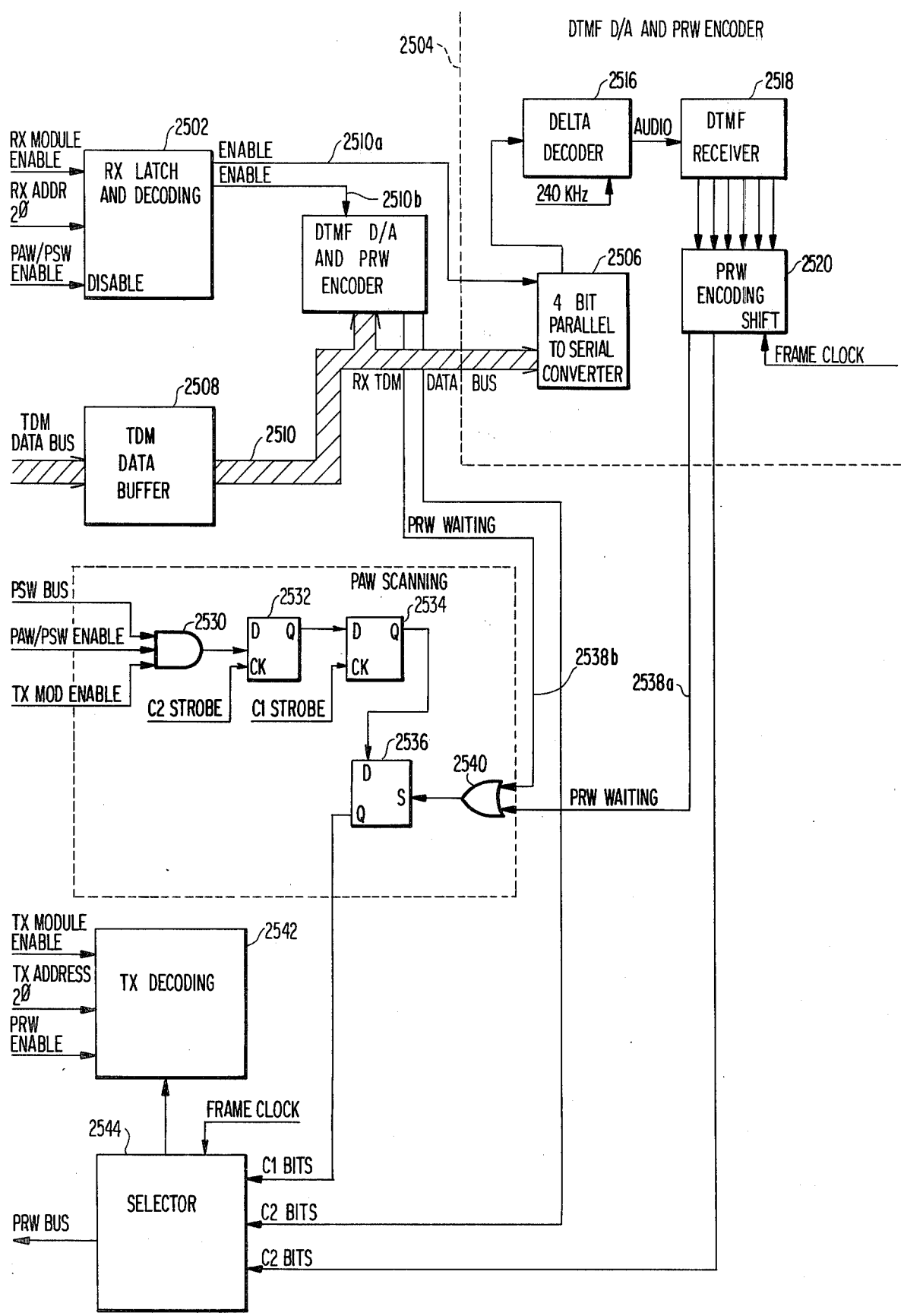
FIG. 25 is a block diagram of the DTMF RECEIVER 30.

The dual-tone multi-frequency (DTMF) receiver 30, as shown in FIG. 25, allows DTMF tones generated by a conventional DTMF pad in any of the single-line telephones 24 to be detected and used for signalling purposes. When a single-line telephone 24 goes OFF HOOK, this change of state is detected by the TDM controller 10, which provides an ENABLE signal to the DTMF receiver 30 so that it can extract from the TDM DATA bus the digitally encoded DTMF tone from the single-line telephone 24. The DTMF receiver 30 stores the received digital DTMF tone, and then provides it to a linear delta decoder, where it is converted back to an analog form. The analog DTMF tone is sent to a DTMF receiver module, of conventional design, which decodes it tones, and provides corresponding indication bits to a PRW encoder which, in turn, generates the C2 bits of a PRW. These C2 PRW bits indicate the DTMF tone outputted by the DTMF pad at the single-line telephone 24.

When the TDM controller 10 starts serially providing a PSW to the DTMF receiver 30, receiver 30 detects the PSW and starts sending back to the PRW stored in the PRW encoder. Thus, the DTMF receiver 30, in conjunction with the DTMF encoder pad on a single-line telephone 24, provides the dialing function of the single-line telephone 24. Each DTMF receiver 30 contains two DTMF D/A and PRW encoders. Together, these encoders can provide DTMF detection for approximately 32 single-line telephones 24.

Referring to FIG. 25, a received latch and decoding unit 2502 is connected to the TDM controller 10 via the RX ADDRESS BUS $2^0$, the PAW/PSW ENABLE bus and a RX MODULE ENABLE line. These lines allow the TDM controller 10 to enable either of the two DTMF D/A and PRW encoders 2504 in the DTMF receiver 30.

Each DTMF D/A and PRW encoder 2504 includes a 4-bit parallel-to-serial converter 2506, whose inputs are connected to the common TDM DATA bus via a TDM DATA buffer 2508 and an internal TDM RX DATA bus 2510. An ENABLE line 2510a and 2510b is provided from unit 2502 to each of the converters 2506, respectively. The 240 KHz DELTA clock is provided to each of the converters 2506. The serial data bit stream from each of the converters 2506 is applied to the input of a separate delta encoder 2516. Each decoder 2516 is provided with the 240 KHz DELTA clock. The audio signal at the output of the decoder 2516, having the DTMF tone from the single-line telephone 24, is applied to the input of a DTMF receiver 2518. DTMF receiver 2518 is of conventional design and is well known in the art. Receiver 2518 provides a binary output which indicates the received DTMF tone. This binary output, which is used to generate the C2 bits of a PRW, is applied to the parallel inputs of a 4-bit parallel-to-serial PRW encoding converter 2520. The FRAME CLOCK is provided to each of the PRW encoders 2520.

A PSW scanner for detecting a PSW includes a three input AND gate 2530. The first input of AND gate 2530 is connected to the PSW bus, the second input is connected to the PAW/PSW ENABLE bus and the third input is connected to a TX MODULE ENABLE line. The output of AND gate 2530 is applied to the D input of a flipflop 2532, whose Q output is connected to the D input of a flipflop 2534. The clock input of flipflop 2532 is connected to the C2 STROBE, and the clock input of flipflop 2534 is connected to the C1 STROBE. The Q output of the flipflop 2534 is applied to the D input of a flipflop 2536.

When the TDM controller 10 decides to send a PSW to AND gate 2530, the first C2 bit of the received PSW causes the Q output of flipflop 2532 to go to the high state. The second received C1 bit, in turn, causes the Q output of flipflop 2534 to go to the high state. Thus, an eight TDM frame PSW WINDOW is created at the Q output of flipflop 2534, which is delayed one TDM frame with respect to the received PSW.

Each encoder 2520 is connected by a respective line 2538a, 2538b, to one of the two inputs of an OR gate 2540. When a PRW is being stored in one of the encoders 2520, that encoder provides a signal onto its respective line 2538, which drives the output of OR gate 2540 to the high state. The output of OR gate 2540 is applied to the SHIFT input of flipflop 2536.

A transmit latch and decoding unit 2542, for detecting a TX ADDRESS from TDM controller 10, provides an ENABLE signal to a SELECTOR unit 2544. Unit 2542 is connected to the TX ADDRESS BUS $2^0$, the PRW ENABLE bus and a TX MODULE ENABLE line. SELECTOR 2544 is responsive to the ENABLE signal provided by unit 2542 for selecting the serial output of either of the encoders 2520. Moreover, the Q output of flipflop 2536 is provided to SELECTOR 2544, and the FRAME CLOCK is also provided. The output of SELECTOR 2544 is connected to the PRW bus going to the TDM controller 10.

When the TDM controller 10 sends a PSW to the DTMF receiver 30, the Q output of flipflop 2536 provides the C1 bits of the PRW sent back to the TDM controller 10 from SELECTOR 2544. If the addressed encoder 2520 has specified stored C2 bits of a PRW, these C2 bits are provided to SELECTOR 2544 so that each is properly interleaved with the C1 bits from flipflop 2536 to generate as serial PRW on the PRW bus. In other words, the received PSW causes flipflop 2536 to generate the C1 bits, in proper time relationship, when the output of OR gate 2540 is driven to the high state by the presence of a PRW in the encoder 2520 addressed by the TDM controller 10. The FRAME CLOCK applied to the address encoder 2520, in turn, causes the C2 bits stored in the addressed encoder 2520 to be outputted in proper PRW time relationship. Thus, a PRW indicating the decoded DTMF tone is provided on the PRW bus going to the TDM controller 10. In this way, the DTMF receiver 30 decodes the received DTMF tone, and provides a corresponding PRW indicating the decoded DTMF tone to the TDM controller 10.

CPU

Figure 6:
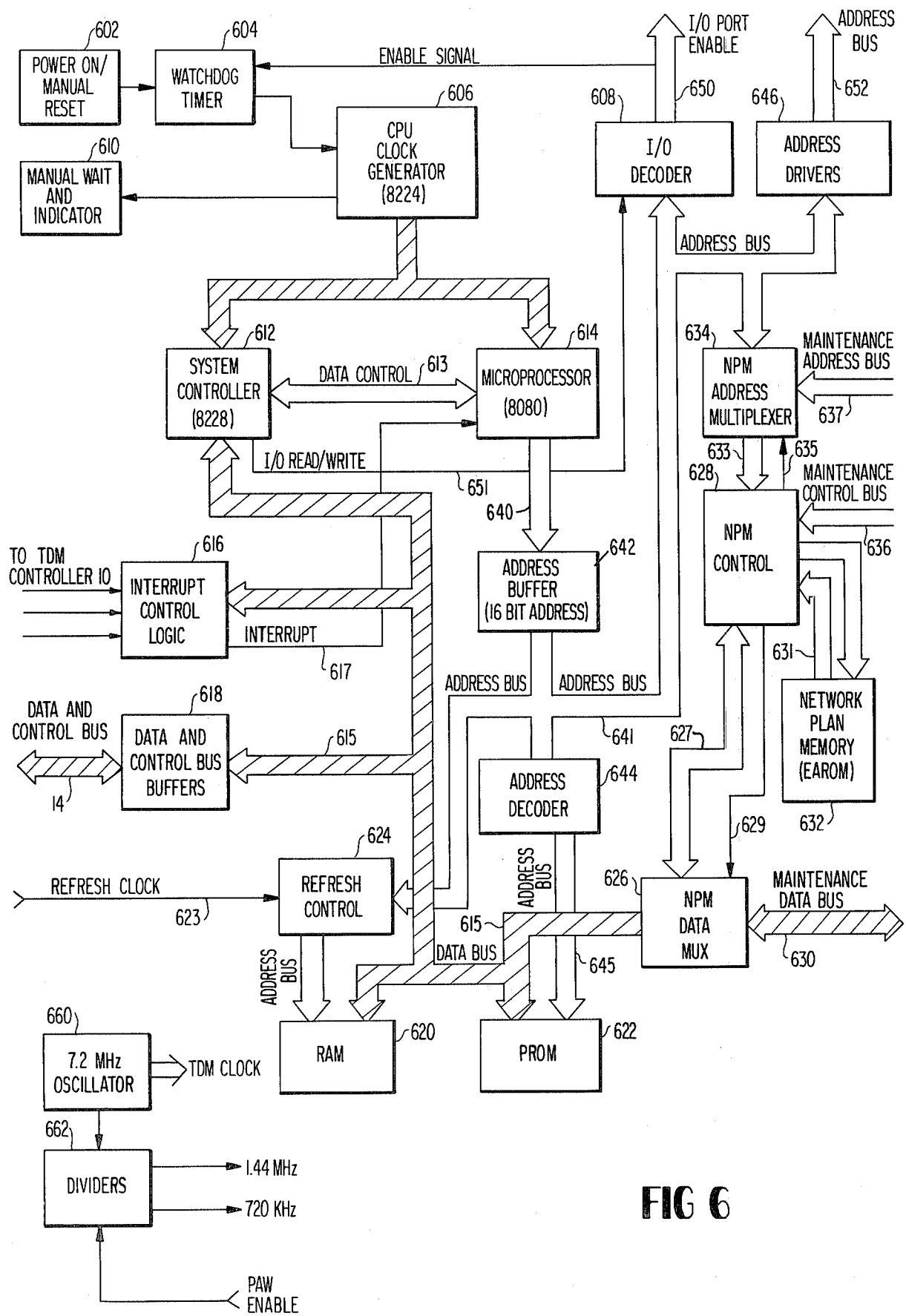
FIG. 6 is a block diagram of the CPU and MEMORY 12.

In general, the CPU 12 as shown in FIG. 6 controls the entire system in real time according to instructions provided in a stored program. The CPU 12 has two main programming functions. First, CPU 12 controls the normal real time call processing, for example, ongoing digital audio data exchange between ports, according to the instructions provided by the stored program. The second function of CPU 12 is to supervise and control the TDM signalling and switching network asynchronously under direction of a INTERRUPT CYCLE scheme as shown in FIG. 7. The system program is stored in a designated area in the system memory. A system memory plan is shown in FIG. 8.

Referring again to FIG. 6, the operation of the entire system is started by actuation of a manual switch contained in a power on/manual reset 602. Unit 602 activates a watch-dog timer 604, which provides a trigger to a CPU clock generator 606. Watch-dog timer 604 must be provided with an enable signal by an I/O decoder 608 every 500 milliseconds or less in order to provide a trigger to the clock unit 606. If no trigger is provided to unit 606, it takes the entire system back to ground zero.

CPU clock generator 606 provides timing pulses to other units in the CPU 12. Unit 606 is, for example, an INTEL 8224. Clock pulses from unit 606 are provided to a system controller 612 and to a microprocessor 614. Unit 612 is, for example, an INTEL 8228, and microprocessor 614 is, for example, an INTEL 8080. A data control bus 613 permits communication between units 614 and 612. As is well known, microprocessor 614 employs a 16-bit address bus and an 8-bit data bus. Since a 16-bit address is used, any location of a 64 kilobyte memory can be addressed at any time.

System controller 612 performs several functions. It provides an indication of the status of microprocessor 614 in the CPU cycle. Moreover, it provides control gating signals to I/O ports and memories via the unit 608 so that these ports and memories do the correct operation. Further, unit 612 identifies the interface which is to transmit data onto the TDM bus 16 and the interface which is to receive data from bus 16 during each slot of each TDM frame. Thus, system controller 612 provides the controlling function which insures that the microprocessor 614 can execute the system program.

System controller 612 is connected via an 8-bit data bus 615 to an interrupt control logic 616. Interrupt control logic 616 receives the INTERRUPT CYCLE TICKS from the TDM controller 10 which allows the CPU 12 to perform the INTERRUPT CYCLE. The INTERRUPT CYCLE, which is discussed in greater detail above, allows the microprocessor to supervise and control signalling by the TDM controller 10 asynchronously with the TDM frames. Unit 616 is connected via an INTERRUPT line 617 to microprocessor 614.

System controller 612 is connected via bus 615 to DATA and CONTROL bus buffers 618. Units 618 act as buffers for received data and control signals on the DATA and CONTROL bus 14 that connects the CPU 12 with the TDM controller 10. System controller 612 is also connected via DATA bus 615 to a random access memory (RAM) 620 and to a programmable read-only memory (PROM) 622. Referring to FIG. 8, RAM 620 corresponds to the 16K RAM 8, shown as Chapter 3 in the system memory plan. RAM 620 has storage for 16 kilobytes of information which is used for storage of system status bytes and expanded network plan memory (NPM) contents for each device in the system. In other words, RAM 620 is used as the working memory area for microprocessor 614. Since RAM 620 is a dynamic random access memory, it requires semi-continuous electrical updating so as not to erase and loose the stored data. This electrical updating, which is well known in the art, is provided with a stream of refresh clock pulses on line 623 to generate appropriate signals for refreshing RAM 620.

PROM 622 corresponds to the 16 kilobyte area 1 and the 2 kilobyte area 1 of Chapters 1 and 2, respectively, as shown in the system memory plan. PROM 622 stores the system program, and this program is available to the microprocessor 614 via unit 612. To reduce cost once the system program has been completely finalized, PROM 622 can be replaced by a mask-programmed ROM.

System controller 612 is connected via data bus 615 to a NPM data multiplexer 626. Multiplexer 626 is connected via a DATA bus 627 and a CONTROL line 629 to a NPM control unit 628. Multiplexer 626 is also connected via a MAINTENANCE DATA bus 630 to the maintenance unit 60, discussed below. Unit 628 is connected via DATA bus 631 to a NPN 632. NPM 632 corresponds to the 3 kilobytes of electrically alterable read-only memories (EAROM), designated 4 in Chapter 2, as shown in FIG. 8. The information stored in NPM 632 gives the entire network configuration of the system, which includes the feature access codes, the devices in operation and the system features that are present. The information stored in NPM 632 is required by the microprocessor 614 in order to execute the system program stored in PROM 622. The network plan stored in unit 632 is unintelligible to microprocessor 614 in its condensed format, which requires the network plan to be read out of unit 632 by units 626 and 628 in expanded, decoded format and to be stored in that format in RAM 620. In terms of the sequence of system operation, once unit 606 has been activated by watchdog timer 604, unit 612 causes the network plan to be immediately read out of unit 632 and stored in RAM 620 in an expanded, decoded format for use by the microprocessor 614. Once the network plan has been read into RAM 620, the condensed network plan stored in unit 632 can be altered by the maintenance unit 60 while the entire system is in operation.

NPM control 628 is connected via an ADDRESS bus 633 and a CONTROL line 635 to an NPM address multiplexer 634. Unit 628 is connected to maintenance unit 60 via a MAINTENANCE control bus 636, and NPN address multiplexer 634 is connected to maintenance unit 60 via a MAINTENANCE ADDRESS bus 637.

Microprocessor 614 is connected via an address bus 640 to an address buffer 642. In turn, buffer 642 is connected via a 16-bit ADDRESS bus 641 to the refresh control unit 624, I/O decoder unit 608, NPM address multiplexer 634 and to an address decoder 644 and address drivers 646. It should be noted that ADDRESS bus 641 is uni-directional, while DATA bus 615 is bi-directional and uses tri-state data.

Address decoder 644 is connected via an address bus 645 to the PROM 622. Unit 644 allows microprocessor 614 to access data contained in PROM 622, as is well known in the art.

I/O decoder 608 is connected via an I/O DATA bus 650 to certain peripherals in the system, for example, the TDM controller 10, the maintenance unit 60, the subscriber message detail service (SMDS) 54 and the watchdog timer 604. The system controller 612 is connected to the I/O decoder 608 via an I/O READ/WRITE line 651. I/O decoder 608 provides the enable signals to enable the peripherals stated above. As is well known, microprocessor 614 can accommodate up to 256 I/O ports. Only some of these possible I/O ports are used and decoded by the present system.

Address drivers 646 are connected via an ADDRESS bus 652 having a plurality of separate lines to various modules in the system, including the peripherals noted above. Drivers 646 provide the addresses for accessing these modules.

The CPU 12 generates some of the timing ticks in the system, using a 7.2 MHz oscillator 660 and associated dividers 662. Oscillator 660 provides the 7.2 MHz TDM clock, and dividers 662 provide, under control of a PAW ENABLE signal, the 1.44 MHz and 720 KHz clocks. The PAW ENABLE signal prevents the rising edge of the 720 KHz clock from occurring simultaneously with a PAW slot in a TDM frame, and thus prevents bit errors caused by such a condition from occurring.

Normally, CPU 12 is processing and maintaining the real time exchange of digital data between interfaces under the interaction of microprocessor 614 with the stored program and the network plan. This digital data is exchanged on the TDM data bus 16 during the audio slots in each TDM frame.

The INTERRUPT CYCLE, as shown in FIG. 7, represents the asynchronous interaction between the CPU 12 and the TDM controller 10 in order to perform control signalling. The CPU 12 is performing ongoing background processing at all times until it receives an INTERRUPT CYCLE TICK 1 from the TDM controller 10. This INTERRUPT TICK can occur at any time, and does not have to be synchronous with the TDM frame. FIG. 7 shows that approximately 468 microseconds are required for each INTERRUPT CYCLE. During part of each INTERRUPT CYCLE, the CPU 12 must store the background processing that it is performing in order to perform the foreground INTERRUPT processing. Since the INTERRUPT can come at any time, it is called a NON-MASKABLE INTERRUPT. When the INTERRUPT CYCLES are completed, CPU 12 returns to the background processing.

Control signalling, i.e., PSW, PAW or PRW, require at least one INTERRUPT CYCLE. Some interfaces requires up to 32 INTERRUPT CYCLES to perform the requisite control signalling, for example, the DSS/BLF console 36.

A typical computer program utilized by the CPU 12 is shown in flowgraph form in FIG. 9. The program represents the sequence of events required for dialing an outgoing number. It is apparent that each function in the system requires a separate sub-program. Since the system uses a program stored in PROM 622, as shown in FIG. 6, these sub-programs can be changed by reprogramming the stored system program. This reprogramming capability shows the flexibility of the present system.

MAINTENANCE PROCESSOR

Figure 10:
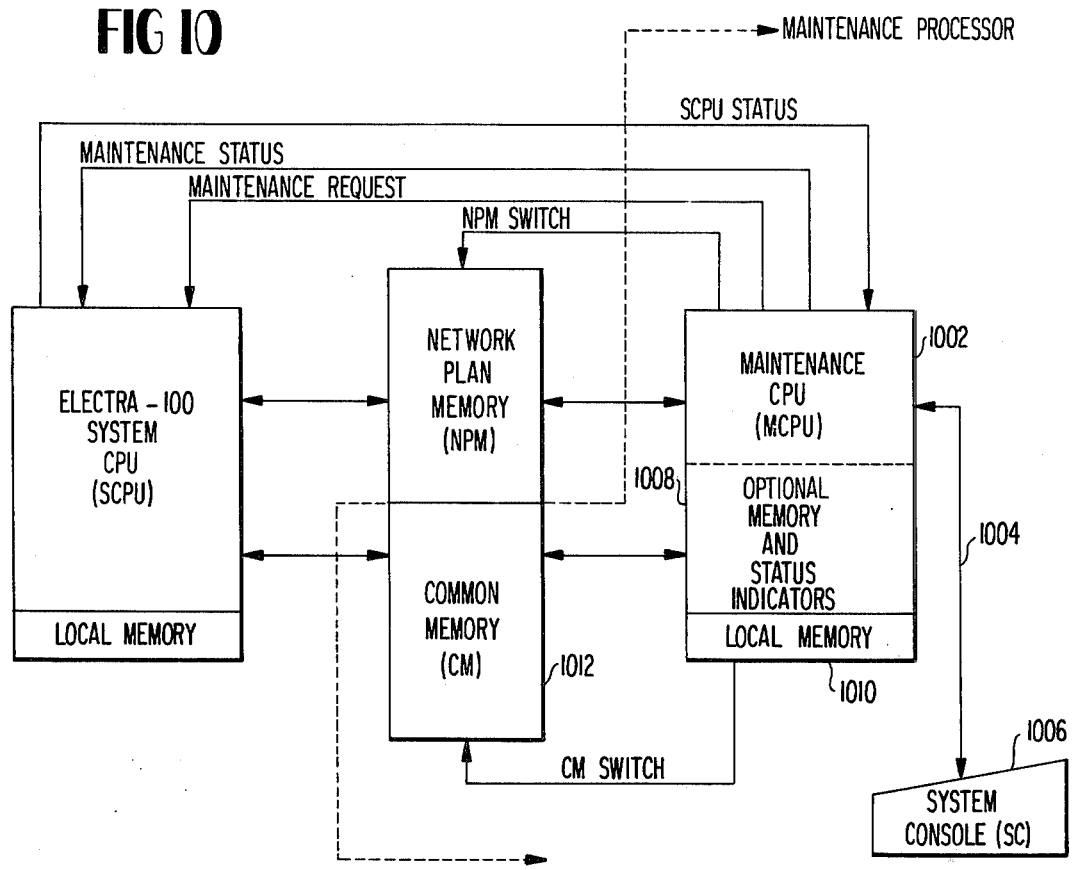
FIG. 10 is a general block diagram showing the CPU 12 and the MAINTENANCE PROCESSOR 60.

Referring to FIG. 10, the interconnection between maintenance processor 60 and CPU 12 is shown. Maintenance processor 60 includes a maintenance CPU 1002 which, for example, may be an INTEL 8080 microprocessor. Maintenance CPU 1002 is connected via a line 1004 to a system console 1006, for example, a teletype of tape reader of standard design. Maintenance CPU 1002 is connected using standard interface modules with an optional memory and status indicators 1008. Unit 1008, in turn, is connected to a local memory 1010.

Maintenance CPU 1002 is connected via unit 1008 to a common memory 1012, which is also connected to CPU 12. Common memory 1012 corresponds to the 4 kilobyte RAM common memory 7 of Chapter 2, as shown in the system memory plan of FIG. 8. Common memory 1012 thus acts as the link between the maintenance CPU 1002 and the system microprocessor 614. Memory 1012 is accessible by either of the processors, but cannot be accessed by both simultaneously.

Maintenance CPU 1002 is also connected to the NPM 632 contained in the CPU via the maintenance data bus 630. Additional maintenance buses connect the maintenance CPU 1002 with the system CPU as shown by the maintenance address bus 637 and the maintenance control bus 636 shown in FIG. 6.

As stated above, the maintenance CPU 1002 can alter the network plan contained in the NPM 632 once the network plan has been read out in expanded, decoded format to RAM 620. This alteration allows the maintenance CPU 1002 to modify the network plan when the system is on-line. This on-line capability is believed to be unique to this electronic key telephone system.

As stated earlier, NPM 632 is an EAROM which allows its contents to be modified using appropriate electronic signals. NPM 632 has two addresses, one for the system CPU 12 and the other for the maintenance processor 60. Either CPU can access the NPM 632, but only the maintenance processor 60 can write into the NPM 632.

When the system is started from ground zero, CPU 12 has priority over maintenance processor 60 with respect to the NPM 632 until its contents are written into RAM 620. Once this writing has taken place, CPU 12 relinquishes control over NPM 632 to the maintenance processor 60. Once maintenance processor 60 has access to NPM 632, it can do either of three functions: (1) erase the entire contents of the NPM before reprogramming; (2) reprogram the NPM when the system is operating on-line; and (3) read out the reprogrammed NPM to check for errors. It is thus apparent that the system capabilities and functions can be modified when the system is operating on-line, and, therefore, the system need not be taken off-line to make system changes.

It should be noted that the maintenance processor 60 has its own BOOT STRAP LOADER so that it can talk with its external teletype during NPM editing without bothering CPU 12. This BOOT STRAP LOADER also allows other types of interfaces to be used, for example, tape readers, so that any maintenance program for checking the system can be read into the maintenance processor 60 when the system is operating on-line. Maintenance programs sent to the maintenance processor 60 via modems and telephone lines are also possible with the system. These diagnostic programs are then stored in memory provided in the maintenance processor 60.

NON-VOLATILE MEMORY

A non-volatile memory unit 52, as shown in FIGS. 1 and 8, provides 16 kilobytes of non-volatile memory, designated 7 in Chapter 4 of the system memory plan. This non-volatile memory allows the storage of up to 10 separate telephone numbers for each telephone in the system, including single-line telephones 24. These stored numbers can be selected by the user of the appropriate telephone for the SPEED DIALING function. The non-volatile memory 52 uses a trickle charge battery to maintain storage during power outages. Power outages up to five hours can be accommodated without loss of stored information. Since only 11 kilobytes are used to store the speed dial numbers, an additional 4 kilobytes are available in the non-volatile memory for storage of critical condition information from the system. This critical condition information will not be erased in the event of a power outage, and thus will provide information for diagnostic or reprogramming functions after the power outage has ceased.

SUBSCRIBER MESSAGE DETAIL SERVICE (SMDS)

Figure 11:
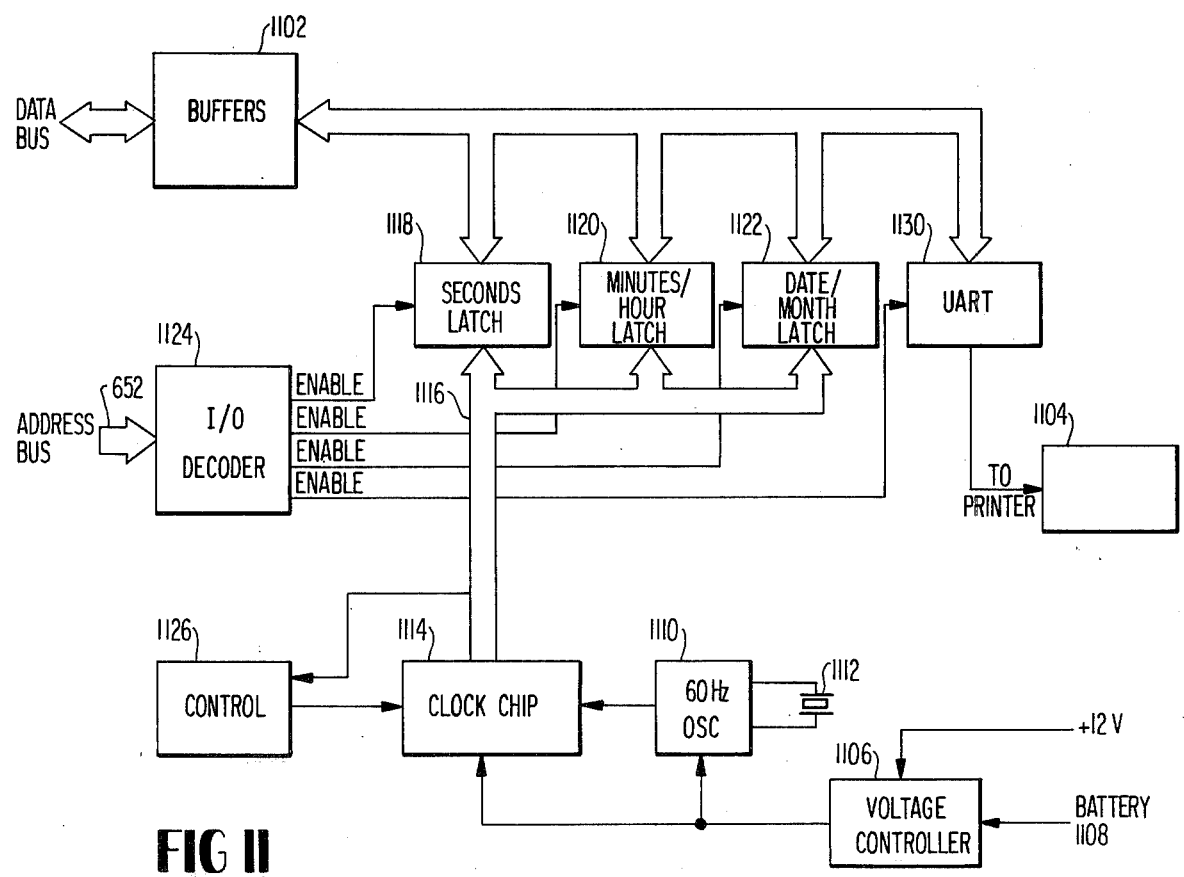
FIG. 11 is a block diagram of the SUBSCRIBER MESSAGE DETAIL SERVICE 54.

The SMDS unit 54 allows the permanent recording of certain system information, for example, numbers dialed, numbers of calls per unit of time, time of day, length of calls and other toll-related information. The SMDS 54 is connected to CPU 12 via the I/O port enable 650 and the ADDRESS bus 652. Information to and from CPU 12 is stored in buffers 1102. Buffers 1102 may be line drivers having no storage capability, or may be the 4 kilobytes of RAM designated 6 of Chapter 2 in the system memory plan of FIG. 8. The 4 kilobytes of RAM allows the storage of dynamic system data in ACSII code for later print-out on demand by a printer 1004 as shown in FIG. 11. Alternatively, information could be stored in the 16 K non-volatile memory 52 for protection against power outage.

The bulk of the SMDS 54, shown in the block diagram in FIG. 11, is for generating the system time function. Specifically, a voltage controller 1106 provides a precisely controlled reference voltage to the timer. Normally, the reference voltage derived by unit 1106 is from a 12-volt source, but in the event of a power outage, a battery 1108 provides the necessary power. The output from unit 1106 is provided to a 60 Hz oscillator 1110 which divides down to 60 Hz a signal from a crystal 1112. The output of oscillator 1110 is fed to a clock chip 1114, of standard design, which provides the necessary output signals for driving seven segment LEDs directly. The seven segment digital information is provided via a data bus 1116 to a second's latch 1118, a minute's-hour latch 1120 and a date-month latch 1122. These latches are of conventional design. A I/O decoder 1124 provides respective enable signals to units 1118-1122 upon receipt of commands from address bus 652 connected with CPU 12. CPU 12 can read only one latch at a time. After all of the latches have been updated, a control counter 1126 updates all of the latches 1118-1122. This allows updating every 3⅛ seconds. The time information at the output of each of the latches 1118-1122 is provided to buffers 1102 for transmission to the CPU via the DATA bus. A universal asynchronous receiver/transmitter unit 1130 converts all parallel data from the CPU 12 or from the 4 K RAM to serial data and also provides all necessary timing pulses required by printer 1104.

What is claimed is:

1. A telephone exchange for selectively connecting a plurality of telephones to a plurality of telephone lines, said telephone exchange comprising:
    a plurality of interface units, at least one of which is a key-set telephone interface unit for connection to a plurality of key-set telephones,
    a TDM bus for carrying time division multiplexed digital data, according to a first frame format, between said interface units,
    TDM controller means connected to said interface units for controlling the access of said interface units to said TDM bus and for controlling the frame format of the digital data on said TDM bus,
    each said key-set telephone being respectively connected to said key-set telephone interface by means of a receiving wire pair and a transmitting wire pair for carrying digital data according to a second frame format, said digital data on said receiving wire pair provided by said key-set telephone interface and including multiplexed digitally encoded audio signals and digital control data, said digital data on said transmitting wire pair provided by said key-set telephone and including multiplexed digitally encoded audio signals and digital request data,
    encoding means for digitally encoding audio signals,
    means for connecting said digitally encoded audio signals onto said transmitting wire pair,
    means for decoding digitally encoded audio signals received on said receiving wire pair,
    means for generating digital request data representing selectable functions of said key-set telephone,
    means responsive to a digital scan code received via said receiving pair of wires from said key-set interface unit for transmitting said digital request data to said key-set interface unit by multiplexing same with said digitally encoded audio signals onto said transmitting wire pair, and
    said key-set telephone interface unit comprising means for synchronizing the said second frame rate with the first frame rate.

2. A telephone exchange as claimed in claim 1 wherein said encoding means is a delta encoding means, and wherein said means for decoding is a delta decoding means.

3. A telephone exchange as claimed in claim 1 wherein said key-set interface unit comprises means for applying power for each said key-set telephone onto said respective receiving wire pair and transmitting wire pair, whereby the power is carried along the same wires carrying digital data.

4. A telephone exchange as claimed in claim 1 further comprising a digital tone generator means, connected to said TDM bus and to said TDM controller, for generating digital tone signals and providing said digital tone signals to said TDM bus under control of enabling signals from said TDM controller, whereby digitally encoded telephonic tones are placed in the time division multiplexed data format on the TDM bus and directed by said key-set interface under control of said TDM controller to a selected key-set telephone via its respective receiving wire pair.

5. A telephone exchange as claimed in claim 1 wherein said TDM controller means comprises means for generating said digital scan codes and for sequentially enabling said interface units to receive said digital scan codes, and means for sequentially enabling said interface units to pass said digital request data from respective devices connected thereto said TDM controller, said enablement occurring during dedicated time slots of said first frame format.

6. A telephone exchange as claimed in claim 5 wherein said key-set interface means comprises means for receiving, when enabled by said TDM controller, said digital scan code from said TDM controller and, in response thereto, placing said digital scan code on said receiving wire pair of said key-set telephone to which said digital scan code is directed, and means for receiving via said transmitting wire pair said digital request data and, in response thereto, sending said digital request data to said TDM controller.

7. A telephone exchange as claimed in claim 6 further comprising means in said TDM controller for transmitting a digital status updating code to said key-set interface unit, means in said key-set interface unit for receiving said digital status updating code and sending it via said respective receiving wire pair to said designated key-set telephone, and means in said designated key-set telephone responsive to said digital status updating code for displaying information corresponding to said digital status updating code.

8. A telephone exchange as claimed in claim 7 wherein said TDM controller comprises transmit address means for sending to said interface units transmit address codes indicative of the particular interface connected device allocated to place said digital audio data onto said TDM bus, said transmit address means cycling through a stored sequence of transmit addresses once per TDM bus frame, with each address being effective during a single time slot of said frame, and receive address means for sending to said interface units receive address codes indicative of the particular interface connected device allocated to extract said digital audio data from said TDM bus, said receive address means cycling through a stored sequence of receive addresses once per TDM bus frame, with each address being effective during a single time slot of said frame.

9. A telephone exchange as claimed in claim 1 wherein a second one of said plurality of interface units is a single-line telephone interface unit for connection to a plurality of single-line telephones, each said single-line telephone being respectively connected to said single-line telephone interface unit by means of a wire pair for carrying audio data, and said single-line telephone interface unit comprising means for converting said audio data on each said respective wire pair to a digital format compatible with said first frame format.

10. A telephone exchange as claimed in claim 9 wherein said single-line telephone interface unit comprises means for applying power for each said single-line telephone onto said respective wire pair whereby the power is carried along the same wires carrying said audio data.

11. A telephone exchange as claimed in claim 10 wherein said single-line telephone is of the type having a dual-tone multi-frequency generator means for producing, on demand, a plurality of distinct analog signals of predetermined frequency composition, and wherein a third one of said plurality of interface units includes a dual-tone multi-frequency receiver means, connected to said TDM bus and to said TDM controller, for converting to analog form digital audio data on said TDM bus under control of enabling signals from said TDM controller, whereby digital dual-tone multi-frequency audio request signals are taken from said TDM bus and converted to analog form.

12. A telephone exchange as claimed in claim 11 wherein said dual-tone multi-frequency receiver means further comprises means for detecting said dual-tone multi-frequency audio request signals in analog form according to the frequency composition thereof, whereby the frequency composition can be used for multi-frequency signalling.

13. A telephone exchange as claimed in claim 9 wherein said converting means of said single-line telephone interface unit comprises a plurality of means for digital encoding of audio signals, a plurality of two-wire to four-wire hybrid means, each said two-wire to four-wire hybrid means having a two-wire receive input, a two-wire transmit input, and a two-wire transmit and receive output for converting a two-wire line to a four-wire line, means for separately connecting each said two-wire line from a respective single-line telephone to said two-wire transmit and receive output of a respective one of said two-wire to four-wire hybrid means, means for separately connecting said two-wire transmit input of each of said two-wire to four-wire hybrid means to a respective one of said encoding means, a plurality of means for digital decoding digital audio signals, means for separately connecting said two-wire receive input of each said two-wire to four-wire hybrid means to a respective one of said decoding means, whereby said digital audio data from said TDM bus applied to each said single-line telephone under control of said TDM controller means is converted to an analog signal at said single-line telephone interface before being applied to said respective wire pair, and said analog audio signal on said wire pair from said respective single-line telephone is converted to encoded digital audio data at said single-line telephone interface before being connected to said TDM bus under control of said TDM controller.

14. A telephone exchange as claimed in claim 1 wherein a third one of said plurality of interface units is a central office line unit for connection to a plurality of central office telephone lines, said central office line unit comprising means for converting analog audio data on each said central office telephone line to a digital format compatible with said first frame format.

15. A telephone exchange as claimed in claim 14 wherein said central office line unit further comprises a plurality of ring detect means, connected respectively to said plurality of central office telephone lines, for sensing an incoming call to said telephone exchange on said respective central office telephone line.

16. A telephone exchange as claimed in claim 15 wherein each said ring detect means further comprises means for generating digital request data representing said sensed incoming call on said central office telephone line, and means responsive to a scan code received from said TDM controller means for transmitting said request data to said TDM controller means via a scan code line.

17. A telephone exchange as claimed in claim 14 wherein said central office line unit further comprises means for converting said digital data from said TDM data bus provided under control of said TDM controller to an analog format compatible for transmission over any of said plurality of said central office telephone lines.

18. A telephone exchange as claimed in claim 17 wherein said central office line unit further comprises a plurality of off hook means connected respectively to said plurality of central office telephone lines for connecting said respective central office telephone line to said means for converting said analog audio data and said means for converting said digital audio data upon receipt of an assignment code received from said TDM controller, whereby said TDM controller means can connect said TDM data bus via said central office line unit to any one of said plurality of central office telephone lines by sending one of said scan codes.

19. A telephone exchange as claimed in claim 14 wherein said central office line unit further comprises a plurality of rotary dial pulse means connected respectively to said plurality of central office telephone lines for providing a rotary dial pulse to said respective central office telephone line upon receipt of an assignment code received from said TDM controller means, whereby rotary dial pulse signalling is provided on said respective central office telephone line.

20. A telephone exchange as claimed in claim 16 wherein said central office line unit further comprises a plurality of loop current detector means, one of which being connected to each said central office telephone line, for sensing the completion of a call to said telephone exchange on said respective central office telephone line.

21. A telephone exchange as claimed in claim 20 wherein said loop current means further comprises means for generating digital request data representing said sensed completed call on said respective central office telephone line, and means responsive to a scan code received from said TDM controller means for transmitting said request data to said TDM controller means via a scan code line.

22. A telephone exchange as claimed in claim 1 wherein a second one of said plurality of interface units is an audio digitizer interface unit for connection to a plurality of audio signal sources, said audio digitizer interface unit comprising means for converting said audio signal from each said audio signal source to a digital format compatible with said first frame format.

23. A telephone exchange as claimed in claim 22 wherein said audio digitizer unit comprises a plurality of digital encoding means connected respectively to said plurality of audio signal sources for digitally encoding said respective audio signals, means for connecting each said digitally encoded audio signal to said TDM bus on receipt of an assignment word from said TDM controller.

24. A telephone exchange as claimed in claim 1 wherein a second one of said plurality of interface units is a zone page interface unit for connection to at least one analog amplifier, said zone page unit comprising means for converting digital audio data on said TDM bus specified by said TDM controller to an analog form compatible with said analog amplifier.

25. A telephone exchange as claimed in claim 24 wherein said zone page unit comprises at least one delta decoding means for converting said digital audio data specified by said TDM controller to an analog form.

26. A telephone exchange as claimed in claim 1 wherein a second one of said plurality of interface units is a central office line unit for connection to a plurality of said central office telephone lines, said central office line unit comprising means for converting analog audio data on each said central office telephone line to a digital format compatible with said first frame format.

27. A telephone exchange as claimed in claim 26 wherein a third one of said plurality of interface units is a single-line telephone interface unit for connection to a plurality of single-line telephones, said single-line telephone interface unit comprising means for converting said audio data on each said respective wire pair to a digital format compatible with said first frame format.

28. A telephone exchange as claimed in claim 27 wherein a fourth one of said plurality of interface units is an audio digitizer unit for connection to a plurality of audio signal sources, said audio digitizer unit comprising means for converting said audio signal from each said audio signal source to a digital format compatible with said first frame format.

29. A telephone exchange as claimed in claim 28 wherein a fifth one of said plurality of interface units is a zone page unit for connection to at least one analog amplifier, said zone page unit comprising means for converting digital audio data on said TDM bus specified by said TDM controller to an analog form compatible with said analog amplifier.

30. A telephone exchange for selectively connecting a plurality of telephones to a plurality of telephone lines, said telephone exchange comprising:

TDM controller means for generating, during specific time slots in a TDM frame, sets of address signals and sets of serial digital control words, a plurality of interface module means, each said interface module means electrically connected with said TDM controller means and responsive to specific sets of said address signals therefrom for generating an enable signal on receipt of each said address signal of said specific sets of address signals, TDM data bus means connected to each said interface module means for electrically conducting digital audio data between said interface module means, a first plurality of key-set telephones, a first one of said plurality of interface module means being connected to said first plurality of key-set telephones, each said key-set telephone means from said first plurality of key-set telephones connected to said first interface module means by a four-wire cable, said first interface module means comprising means transmitting a first serial bit stream to each said key-set telephone means via the first two wires of said four-wire cable so as to provide one digital signal channel and two digital audio channels to said key-set telephone means, each said key-set telephone means comprising means for transmitting a second serial bit stream to said first interface module means via the second two wires of said four-wire cable so as to provide one digital signal channel and two digital audio channels to said first interface module means, and means for linear delta decoding each of said digital audio channels from said first two wires and linear delta encoding audio information for each of said digital audio channels to said second two wires of said four-wire cable;

CPU means associated with said TDM controller means for providing control instructions for directing said TDM controller (i) to send a first specified set of address signals and a specified set of serial digital control words during dedicated slots in a first selected group of successive TDM frames to said first interface module means to determine the status of a first specified key-set telephone means;

(ii) to send a second specified set of address signals during other dedicated slots in a second selected group of successive TDM frames to said first interface module means to receive digital control words indicating the status of said first specified key-set telephone means;

(iii) to send a third specified set of address signals in response to said received digital control words during selected slot in a third selected TDM frame to said first interface module means to cause one of said digital audio channels from said first key-set telephone means to be provided in 4-bit parallel form to said TDM data bus means and to simultaneously send a fourth specified set of address signals in response to said received control words during said selected slot in said third selected TDM frame to a second interface module means of said plurality of interface module means to cause receipt thereby of said 4-bit parallel data from said TDM data bus means.

* * * * *

UNITED STATES PATENT AND TRADEMARK OFFICE
CERTIFICATE OF CORRECTION

PATENT NO. : 4,160,131  Page 1 of 5
DATED : July 3, 1979
INVENTOR(S) : Pradeep P. KAUL et al It is certified that error appears in the above-identified patent and that said Letters Patent are hereby corrected as shown below:

Column 5, line 47 - after "uses" delete "the" insert -- this --

Column 6, line 48 - delete "conferences" insert -- conferencees --

Column 6, line 49 - delete "conferences" insert -- conferencees --

Column 8, line 22 - delete entire line

Column 8, line 23 - delete "system,"

Column 8, line 65 - delete "querie" insert -- query --

Column 8, line 30 - delete "PAW" insert --PSW --

Column 11, line 4 - delete "PAW/PRW" insert -- PAW/PSW --

UNITED STATES PATENT AND TRADEMARK OFFICE
CERTIFICATE OF CORRECTION

PATENT NO. : 4,160,131
DATED : July 3, 1979
INVENTOR(S) : Pradeep P. KAUL et al

It is certified that error appears in the above-identified patent and that said Letters Patent are hereby corrected as shown below:

Column 11, line 4 - after "and" delete "PSW" insert -- PRW --

Column 12, line 23 - after "which" delete "ways" and insert -- is always --

Column 13, line 22 - delete "same" insert -- frame --

Column 15, line 13 - after "is" insert -- the --

Column 17, line 12 - "address" should be ADDRESS

Column 17, line 12 - "ad" should be AD

Column 17, line 13 - "dress" should be DRESS

Column 17, line 59 - "address" should be ADDRESS

Column 17, line 62 - "address" should be ADDRESS

Column 18, line 56 - "address" should be ADDRESS

UNITED STATES PATENT AND TRADEMARK OFFICE
CERTIFICATE OF CORRECTION

PATENT NO. : 4,160,131
DATED : July 3, 1979
INVENTOR(S) : Pradeep P. KAUL et al

It is certified that error appears in the above-identified patent and that said Letters Patent are hereby corrected as shown below:

Column 18, line 57 - "address" should be ADDRESS

Column 19, line 11 - delete "0101010101010101" insert -01010101010101-

Column 20, line 3 - "frame" should be "frames"

Column 20, line 38 - "enable" should be "enabled"

Column 21, line 20 - "LATCH should be "latch"

Column 22, line 14 - "auto write cycle" should be "AUTO WRITE CYCLE"

Column 25, line 24 - after "TX ADDRESS (first occurrence)" delete -- , --

Column 25, line 33 - delete "ma"

Column 25, line 34 - delete "tion"

Column 27, line 66 delete "1743" insert -- 1740 --

UNITED STATES PATENT AND TRADEMARK OFFICE
CERTIFICATE OF CORRECTION

PATENT NO. : 4,160,131
DATED : July 3, 1979
INVENTOR(S) : Pradeep P. KAUL et al

It is certified that error appears in the above-identified patent and that said Letters Patent are hereby corrected as shown below:

Column 27, line 67 - delete "1742" insert -- 1743 --

Column 28, line 49 - after "FIG. 18" insert -- , --

Column 28, line 50 - after "TDM" delete " , "

Column 31, line 4 - after "The" and before "output" insert -- Q --

Column 31, line 45 - after "condition" delete "for" insert -- of --

Column 32, line 13 - before "output" delete "the"

Column 33, line 61 - delete "Each" and insert therefor -- For --

Column 34, line 31 - "Rx" should be --"RX" --

Column 36, line 60 after "signal" insert -- on --

Column 40, line 9 - "latch" should be "latches"

Column 42, line 25 - after "TX" (second occurrence) insert -- 3 --

UNITED STATES PATENT AND TRADEMARK OFFICE
CERTIFICATE OF CORRECTION

PATENT NO. : 4,160,131  
DATED : July 3, 1979  
INVENTOR(S) : Pradeep P. KAUL et al Page 5 of 5

It is certified that error appears in the above-identified patent and that said Letters Patent are hereby corrected as shown below:

Column 44, line 53 delete "Before" insert -- , the four --

Column 45, line 60 - after "receiving" delete "is"

Column 46, line 18 - after "connected" insert -- to --

Column 48, line 37 after "decode" delete "it" insert -- its --

Column 48, line 44 - after "back" delete "to"

Column 50, line 64 - after "via" insert -- data --

Column 51, line 12 - delete "loose" insert -- lose --

Column 60, line 19 - insert - ; - after "controller"

Signed and Sealed this

Fourth Day of December 1979

[SEAL]

Attest:

SIDNEY A. DIAMOND

Attesting Officer

Commissioner of Patents and Trademarks

UNITED STATES PATENT OFFICE
CERTIFICATE OF CORRECTION

Patent No. 4,160,131        Dated July 3, 1979

Inventor(s) Pradeep P. KAUL et al

It is certified that error appears in the above-identified patent and that said Letters Patent are hereby corrected as shown below:

Column 19, line 11 - delete "01010101010101" and insert

--0101010101010101--

Signed and Sealed this

Tenth Day of June 1980

[SEAL]

Attest:

SIDNEY A. DIAMOND

Attesting Officer      Commissioner of Patents and Trademarks